United States Patent
Publicover et al.

(10) Patent No.: US 9,289,637 B2
(45) Date of Patent: Mar. 22, 2016

(54) REBOUNDING APPARATUS WITH TENSIONED ELASTIC CORDS

(71) Applicants: Mark W. Publicover, Saratoga, CA (US); Jon P. Hylbert, Los Gatos, CA (US); Donald Strasser, Rocklin, CA (US); Kevin B. Charles, Millbrae, CA (US)

(72) Inventors: Mark W. Publicover, Saratoga, CA (US); Jon P. Hylbert, Los Gatos, CA (US); Donald Strasser, Rocklin, CA (US); Kevin B. Charles, Millbrae, CA (US)

( * ) Notice: Subject to any disclaimer, the term of this patent is extended or adjusted under 35 U.S.C. 154(b) by 159 days.

(21) Appl. No.: 13/776,704

(22) Filed: Feb. 26, 2013

(65) Prior Publication Data
US 2013/0316876 A1 Nov. 28, 2013

Related U.S. Application Data

(63) Continuation-in-part of application No. 13/562,240, filed on Jul. 30, 2012, now abandoned, which is a continuation-in-part of application No. 13/420,519, filed on Mar. 14, 2012, now abandoned, which is a (Continued)

(51) Int. Cl.
*A63B 5/11* (2006.01)
*A63B 5/16* (2006.01)
(Continued)

(52) U.S. Cl.
CPC ............... *A63B 5/11* (2013.01); *A63B 21/0414* (2013.01); *A63B 21/0552* (2013.01);
(Continued)

(58) Field of Classification Search
CPC .. A63B 5/11; A63B 21/0555; A63B 2225/30; A63B 21/0552; A63B 2225/09; A63B 21/0557; F16B 5/0692
USPC ......... 482/26–29; 403/220, 241; 24/17 B, 18, 24/115 H, 129 A, 129 B, 129 R; 182/139
See application file for complete search history.

(56) References Cited

U.S. PATENT DOCUMENTS

| | | |
|---|---|---|
| 1,050,442 A | 1/1913 | Friswell |
| 2,916,746 A | 12/1959 | Pease |

(Continued)

FOREIGN PATENT DOCUMENTS

| | | |
|---|---|---|
| CN | 200995024 Y | 12/2007 |
| DE | 2504875 A1 | 8/1976 |

(Continued)

OTHER PUBLICATIONS

International Search Report and Written Opinion, dated May 18, 2011, issued in PCT/US2010/048820.

(Continued)

*Primary Examiner* — Oren Ginsberg
*Assistant Examiner* — Joshua Lee
(74) *Attorney, Agent, or Firm* — Klarquist Sparkman, LLP

(57) ABSTRACT

A trampoline with a frame has a rebounding mat that is tensioned to the frame with a plurality of flexible and cordlike linear elastic members. Preferably each cordlike elastic member is connected to the frame and the rebounding mat at one of two alternative positions to alter the tension. The alternative positions permit a tensioning process that extends the lifetime of elastic cords having a fabric sheath. This independent tension of each elastic member is via connector member that grips the rebounding mat but also grasps opposing ends of the elastic members as well as central portion thereof so that two segment of the cord between each end and the central portion are preferably wrapped around the trampoline frame.

33 Claims, 52 Drawing Sheets

Related U.S. Application Data continuation-in-part of application No. PCT/US2010/048820, filed on Sep. 14, 2010, now abandoned, which is a continuation-in-part of application No. 12/881,105, filed on Sep. 14, 2009, now abandoned, application No. 13/776,704, which is a continuation-in-part of application No. 13/562,240, filed on Jul. 30, 2012, now abandoned, which is a continuation-in-part of application No. 13/420,519, filed on Mar. 14, 2012, now abandoned, which is a continuation-in-part of application No. PCT/US2010/048820, filed on Sep. 14, 2010, now abandoned, which is a continuation-in-part of application No. 12/881,486, filed on Sep. 29, 2009, now abandoned, application No. 13/776,704, which is a continuation-in-part of application No. 13/562,240, filed on Jul. 30, 2012, now abandoned, which is a continuation-in-part of application No. 13/420,519, filed on Mar. 14, 2012, now abandoned, which is a continuation-in-part of application No. PCT/US2010/048820, filed on Sep. 14, 2010, now abandoned, application No. 13/776,704, which is a continuation-in-part of application No. 13/562,240, filed on Jul. 30, 2012, now abandoned, which is a continuation-in-part of application No. 13/403,973, filed on Feb. 23, 2012, now abandoned, which is a continuation-in-part of application No. 13/068,855, filed on May 18, 2010, now abandoned, application No. 13/776,704, which is a continuation-in-part of application No. 13/562,240, filed on Jul. 30, 2012, now abandoned, which is a continuation-in-part of application No. 13/403,973, filed on Feb. 23, 2012, now abandoned, application No. 13/776,704, which is a continuation-in-part of application No. 13/562,240, filed on Jul. 30, 2012, now abandoned, application No. 13/776,704, which is a continuation-in-part of application No. 13/562,240, filed on Jul. 30, 2012, now abandoned, which is a continuation-in-part of application No. 13/420,519, filed on Mar. 14, 2012, now abandoned, which is a continuation-in-part of application No. 13/403,973, filed on Feb. 23, 2012, now abandoned.

(60) Provisional application No. 61/321,571, filed on Apr. 7, 2010, provisional application No. 61/446,035, filed on Feb. 23, 2011, provisional application No. 61/598,869, filed on Feb. 14, 2012, provisional application No. 61/751,240, filed on Jan. 10, 2013.

(51) Int. Cl.
  *A63B 21/055* (2006.01)
  *F16B 5/06* (2006.01)
  *A63B 21/04* (2006.01)

(52) U.S. Cl.
  CPC ........ *A63B 21/0555* (2013.01); *A63B 21/0557* (2013.01); *A63B 2225/09* (2013.01); *A63B 2225/30* (2013.01); *F16B 5/0692* (2013.01)

(56) References Cited

U.S. PATENT DOCUMENTS

| | | | |
|---|---|---|---|
| 2,991,841 A | 7/1961 | Sampson et al. | |
| 3,130,630 A | 4/1964 | Dawes | |
| 4,162,063 A | 7/1979 | Nissen et al. | |
| 4,331,329 A | 5/1982 | Mirkovich et al. | |
| 4,513,063 A | 4/1985 | Hashi et al. | |
| 5,033,169 A * | 7/1991 | Bindon | 24/129 R |
| 5,343,639 A | 9/1994 | Kilgore et al. | |
| 5,607,736 A | 3/1997 | Williams | |
| 5,967,943 A | 10/1999 | Rich | |
| 6,129,649 A | 10/2000 | Yang | |
| D440,415 S | 4/2001 | Bellini | |
| 6,543,094 B2 * | 4/2003 | D'Addario | 24/16 PB |
| 7,033,666 B2 | 4/2006 | Skaja | |
| 7,060,001 B2 | 6/2006 | Publicover | |
| 7,094,181 B2 | 8/2006 | Hall | |
| D560,082 S | 1/2008 | Theemann | |
| 7,494,445 B1 | 2/2009 | Chen | |
| 7,686,744 B2 | 3/2010 | Middleton | |
| D625,986 S * | 10/2010 | Kolasa | D8/356 |
| 8,038,580 B2 | 10/2011 | Schmauck | |
| 2003/0036460 A1 | 2/2003 | Publicover | |
| 2003/0223808 A1* | 12/2003 | Kuo et al. | 403/220 |
| 2005/0113213 A1* | 5/2005 | Alexander | 482/27 |
| 2008/0076638 A1 | 3/2008 | Publicover | |
| 2008/0132384 A1 | 6/2008 | Publicover | |
| 2009/0206621 A1 | 8/2009 | Payne | |

FOREIGN PATENT DOCUMENTS

| | | |
|---|---|---|
| DE | 8805500 U1 | 7/1988 |
| DE | 29919912 U1 | 1/2000 |
| DE | 10226707 A1 | 1/2004 |
| DE | 102006028363 B3 | 8/2007 |
| EP | 0791375 A1 | 8/1997 |
| FR | 2541099 A1 | 8/1986 |
| GB | 2123280 A | 2/1984 |
| JP | 33-002734 U | 2/1958 |
| JP | 63-146666 U | 9/1988 |
| KR | 20-0418020 Y1 | 6/2006 |
| KR | 10-2008-0066183 | 7/2008 |
| WO | WO 2007/147534 A1 | 12/2007 |
| WO | WO 2008/083614 A1 | 7/2008 |
| WO | WO 2011/032173 A2 | 3/2011 |

OTHER PUBLICATIONS

Japan Patent Office, First Office Action, dated Jan. 5, 2015, issued in Japan Patent Application No. 2012-528999.

European Patent Office, Extended European Search Report, Feb. 20, 2015, issued in European Patent Application No. 10816290.0.

\* cited by examiner

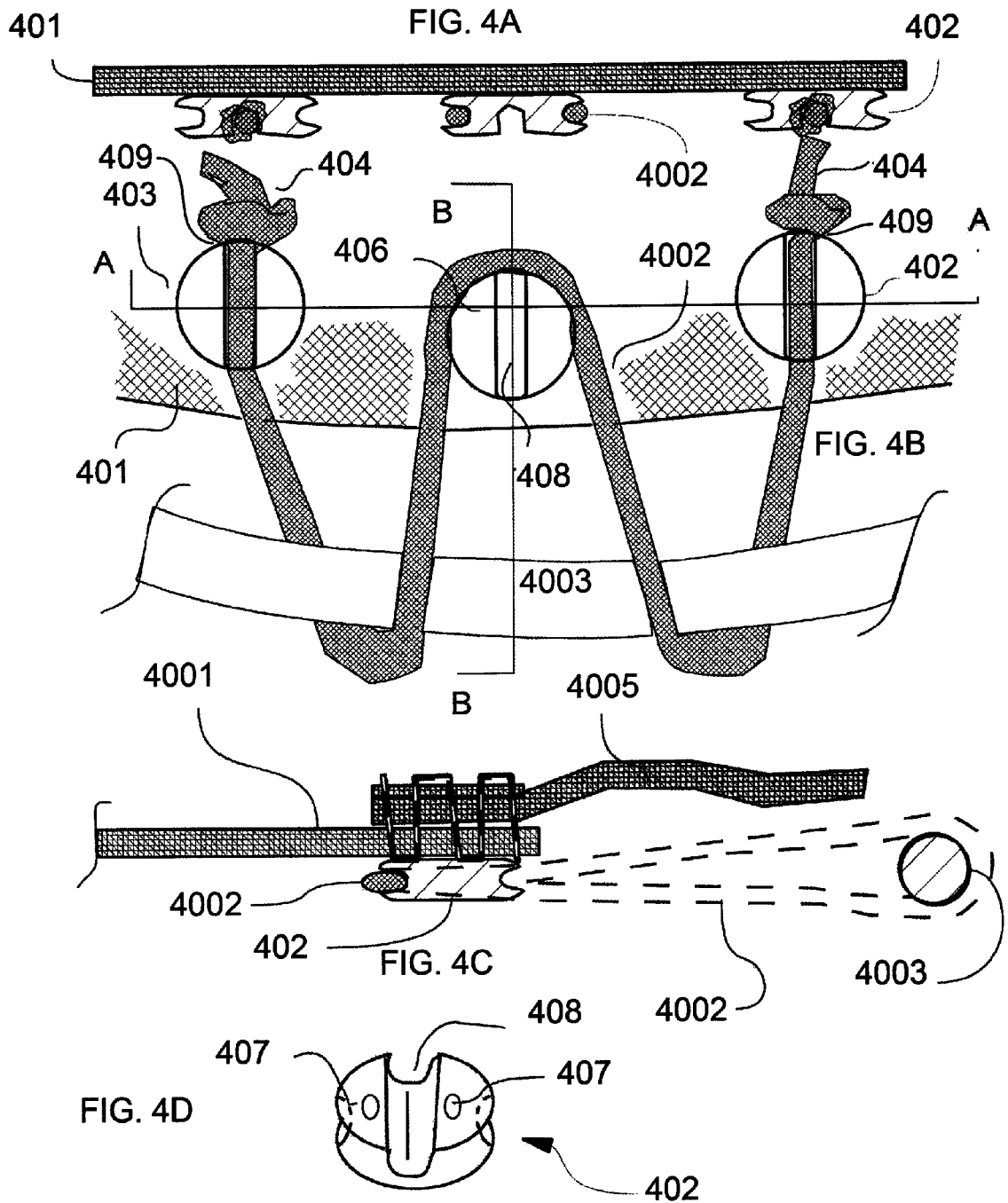

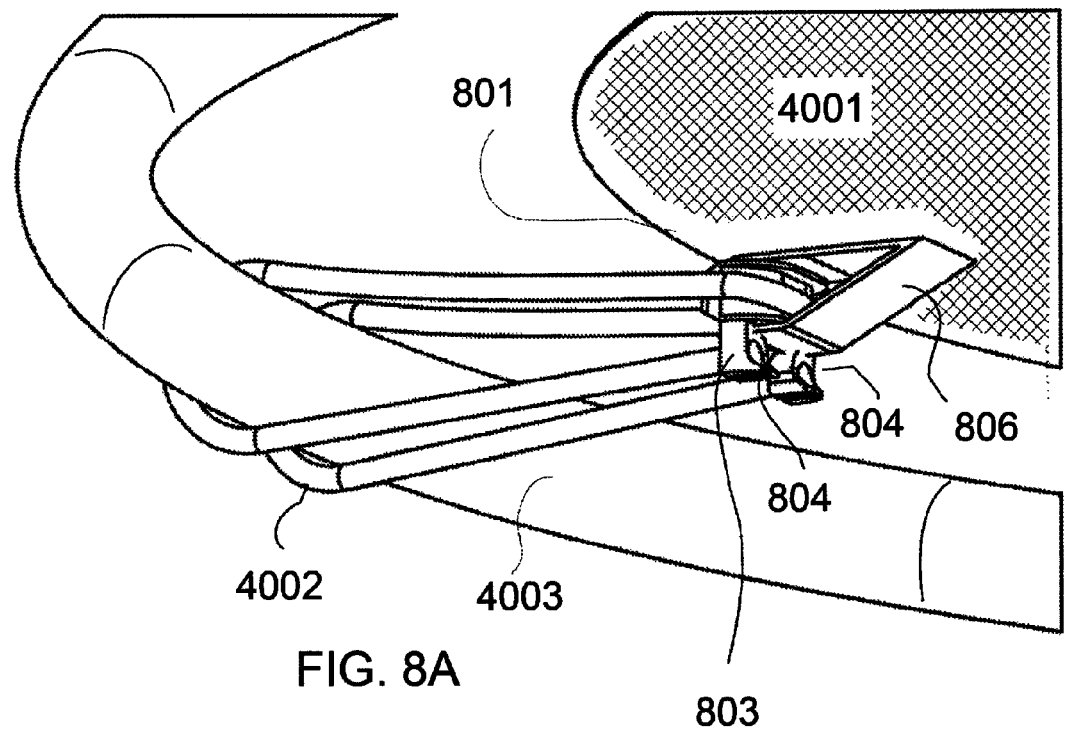
FIG. 8A
FIG. 8B
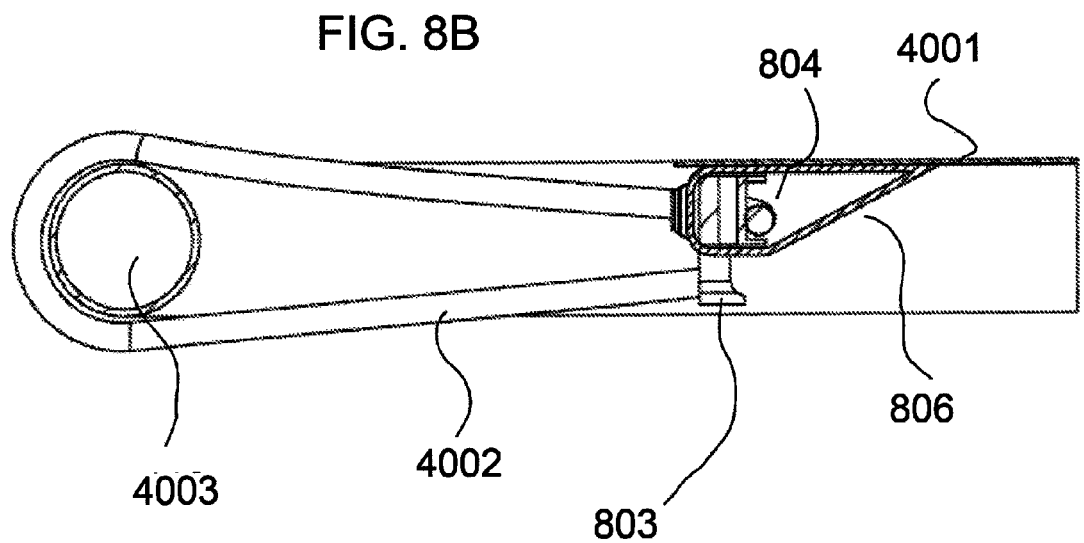

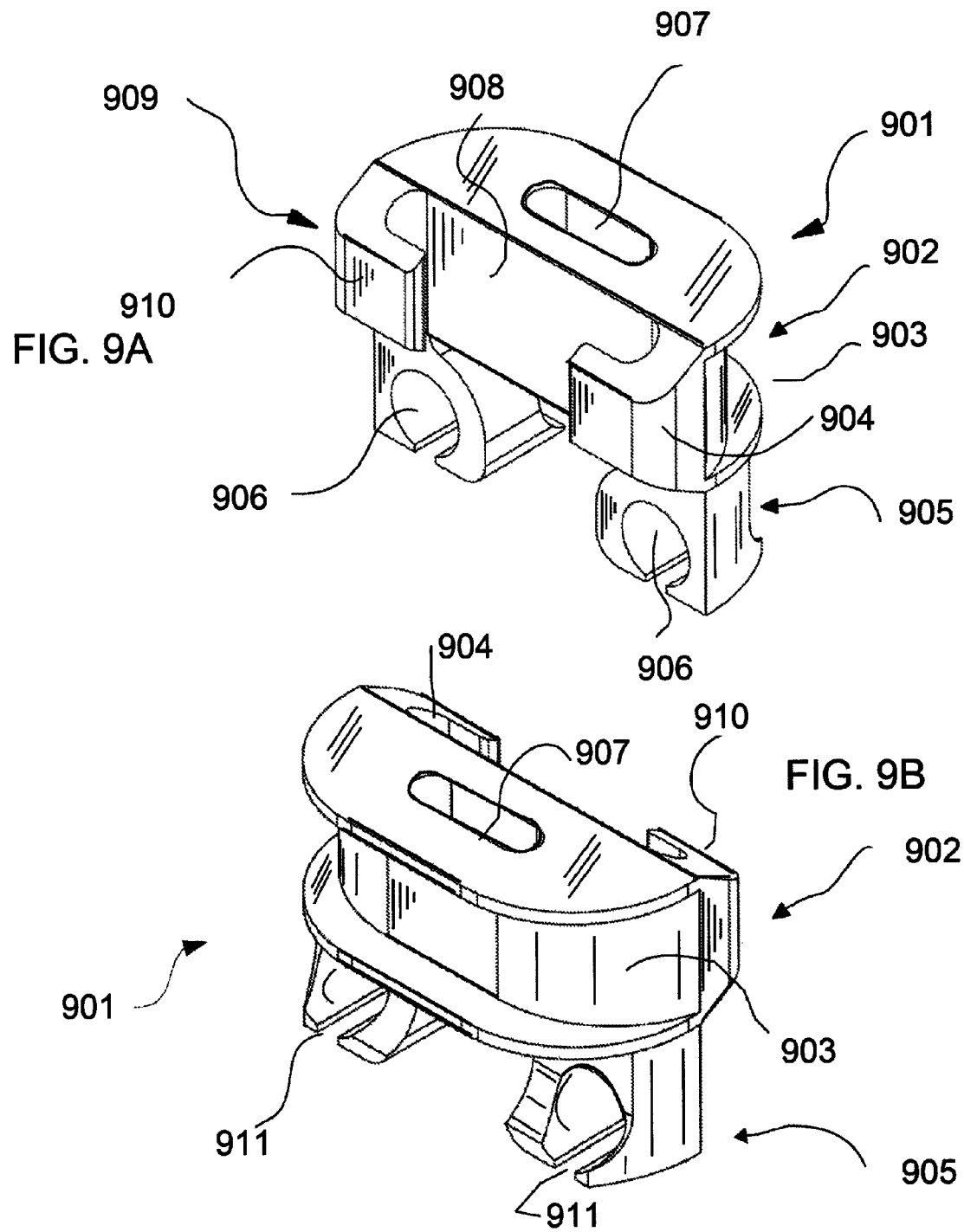

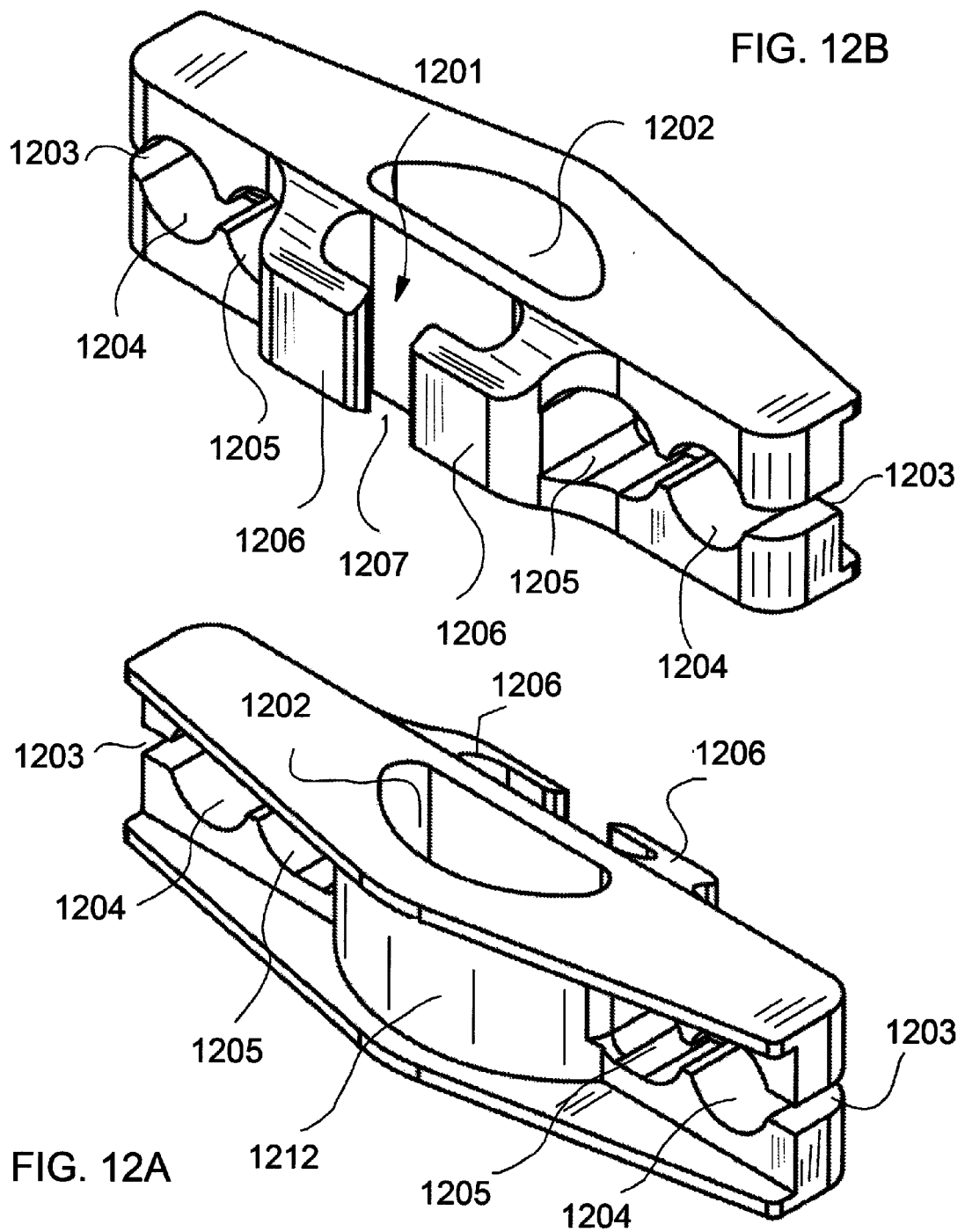

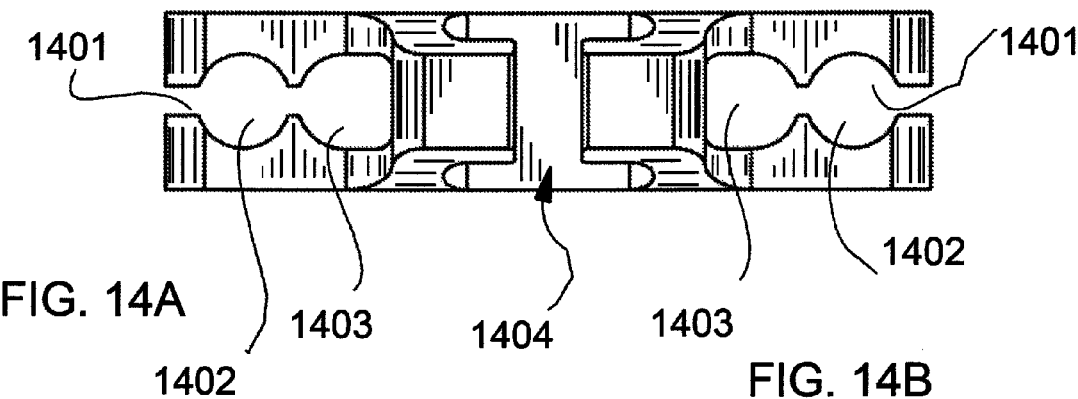
FIG. 14A
FIG. 14B
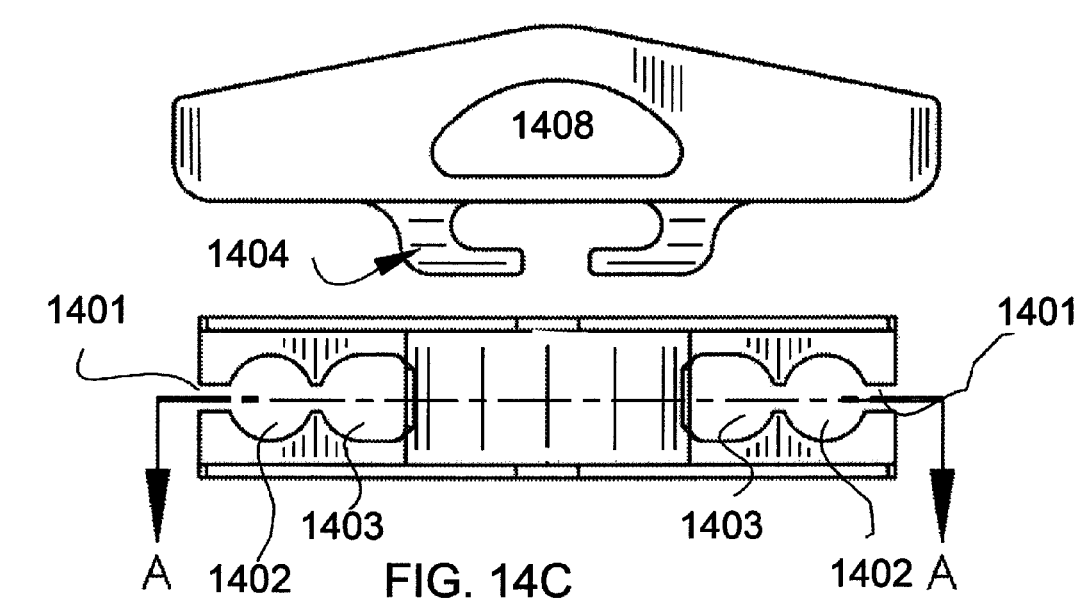
FIG. 14C
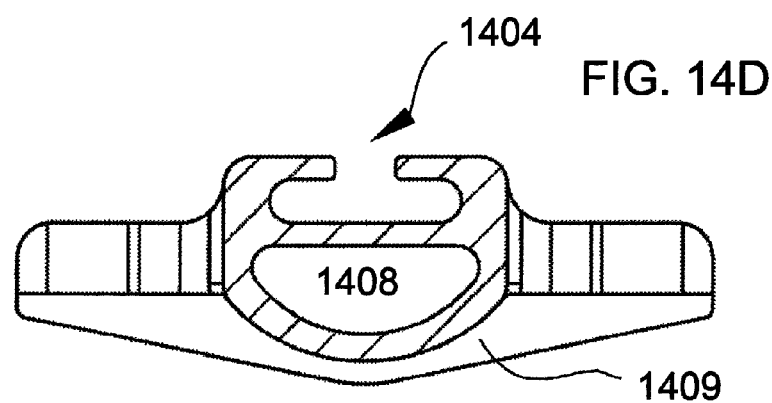
FIG. 14D

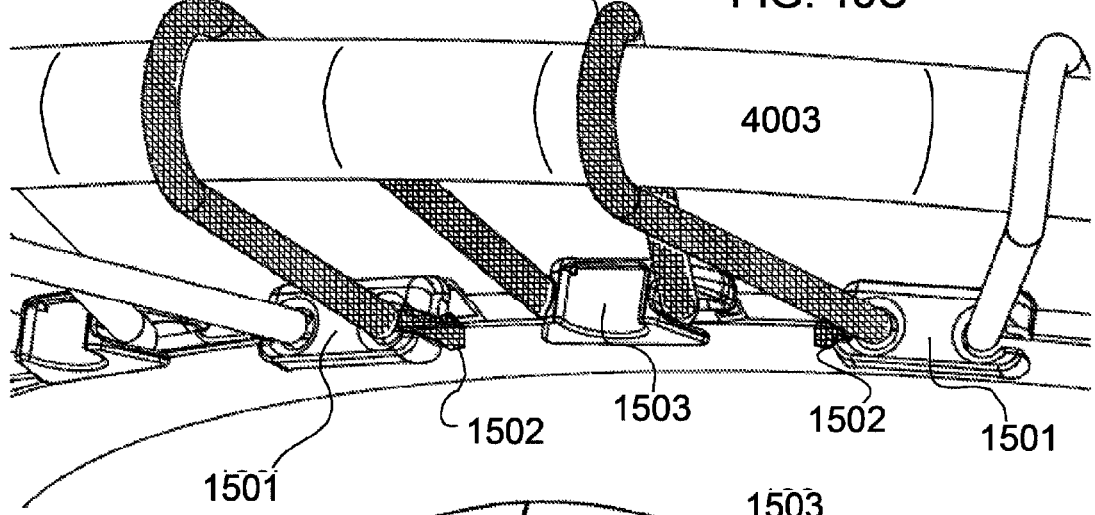
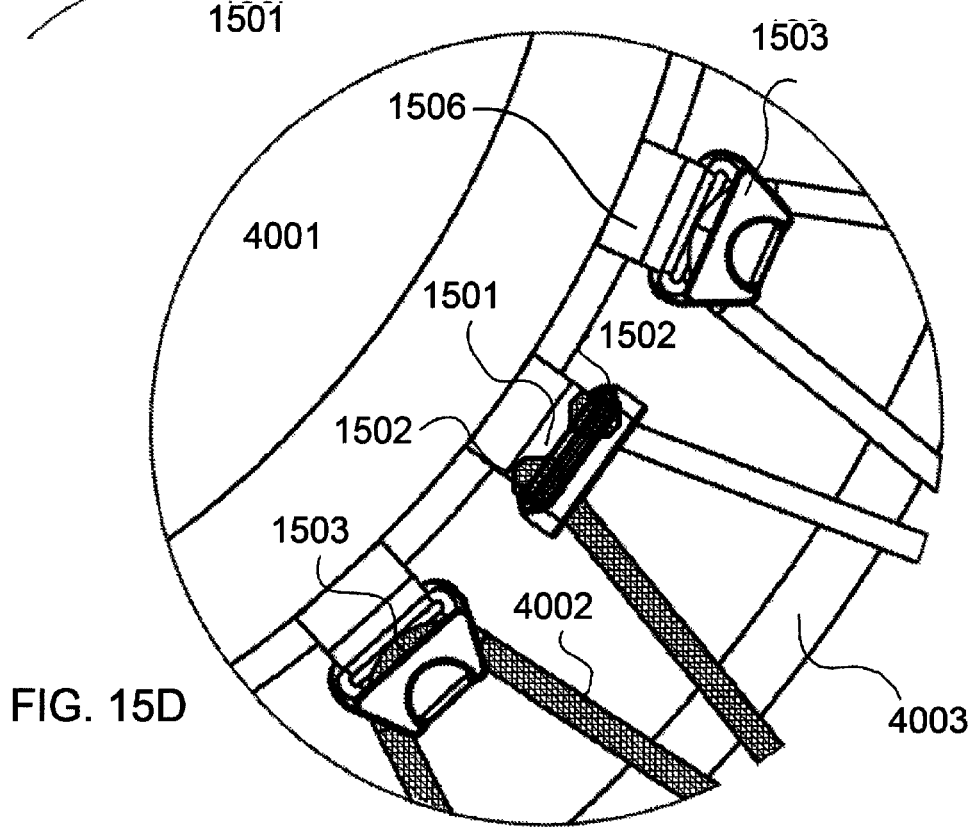

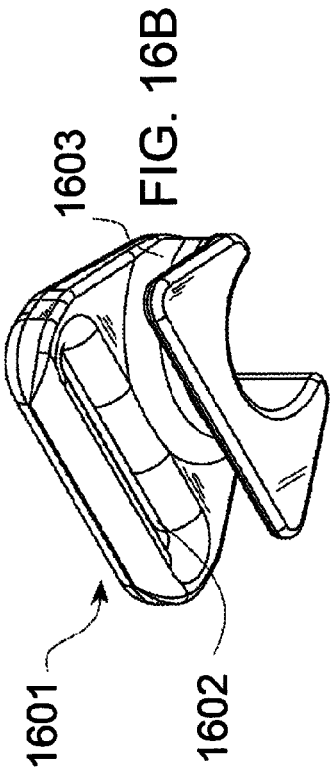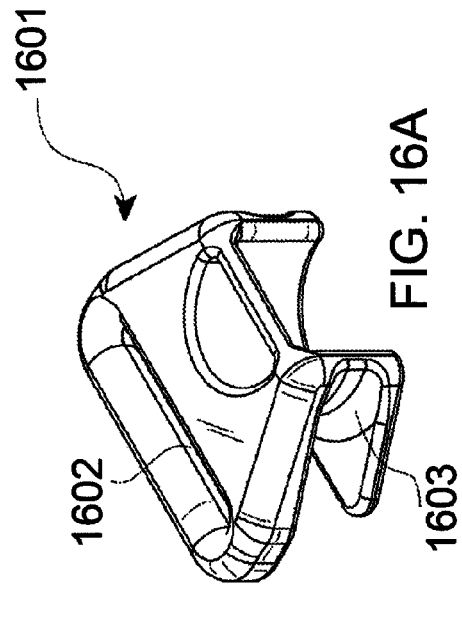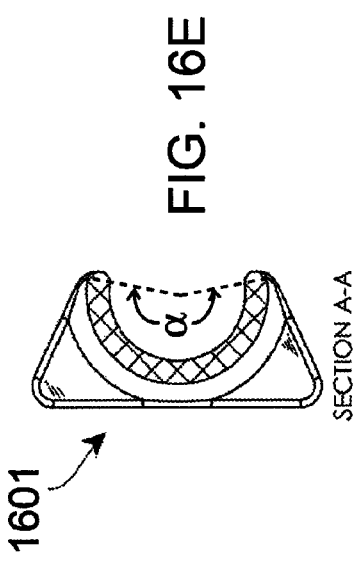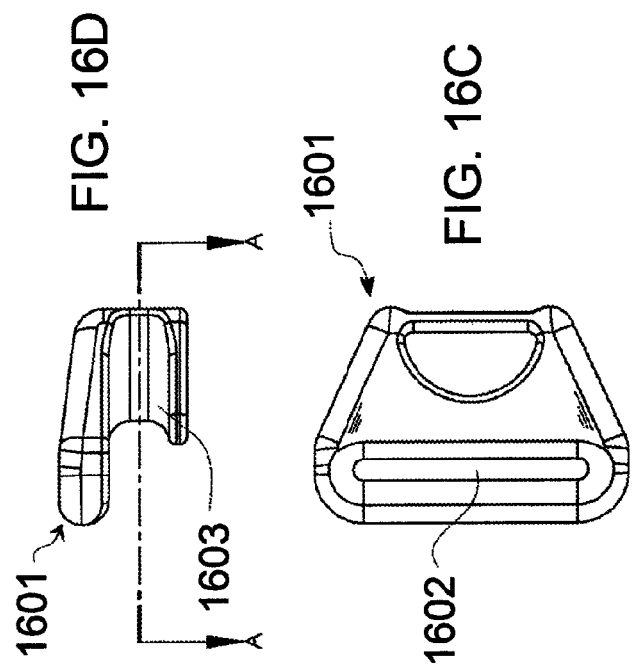

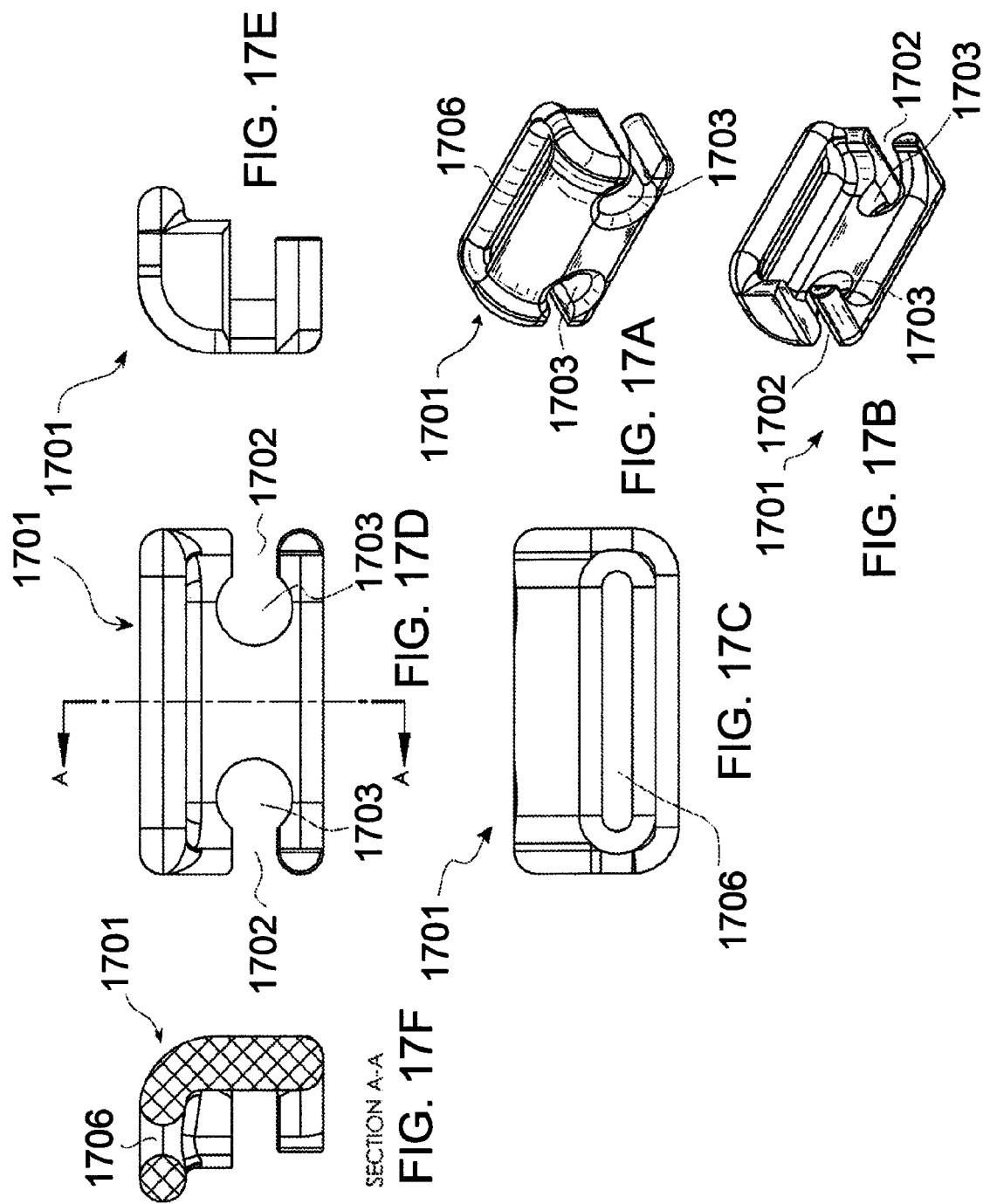

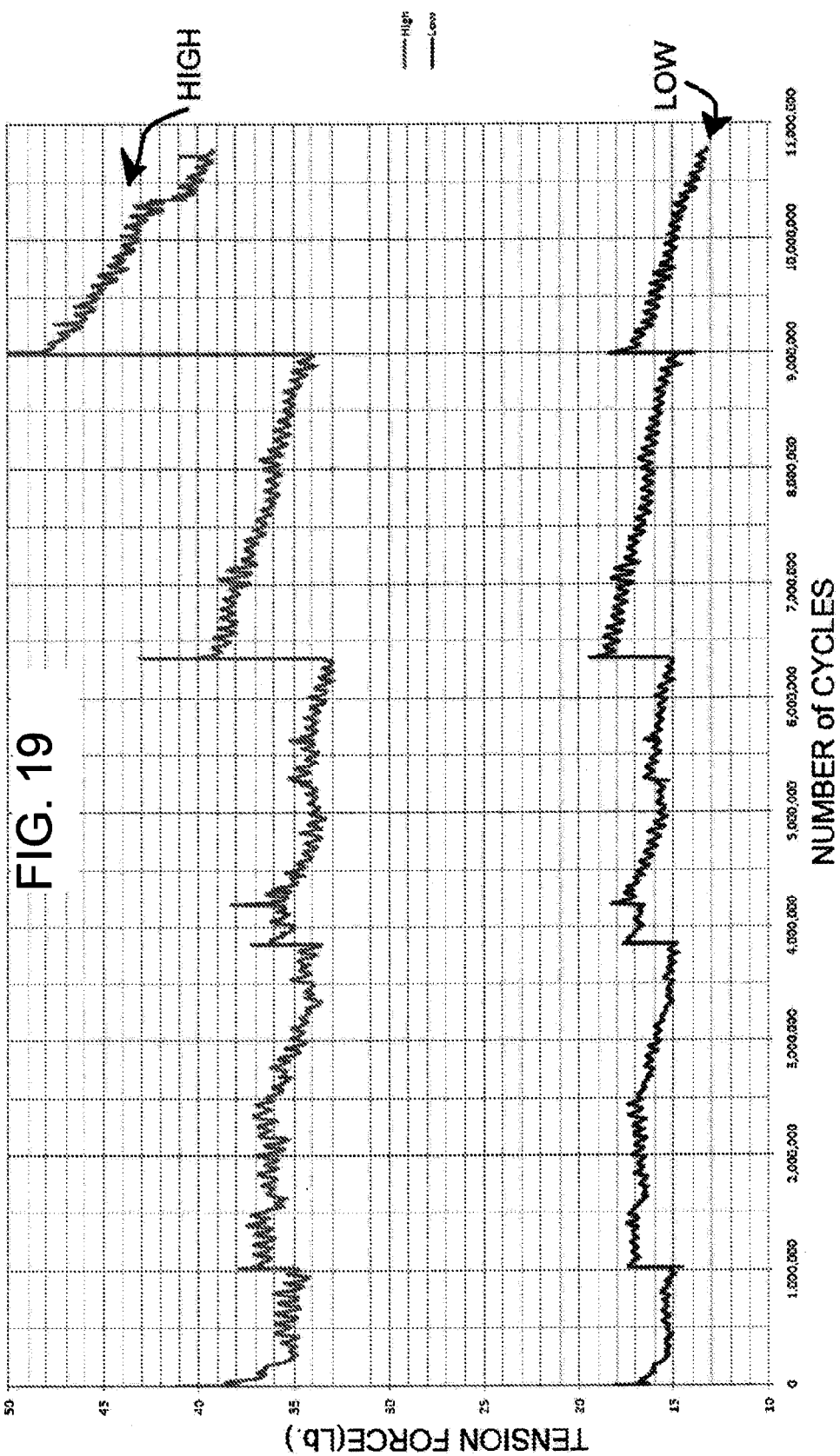

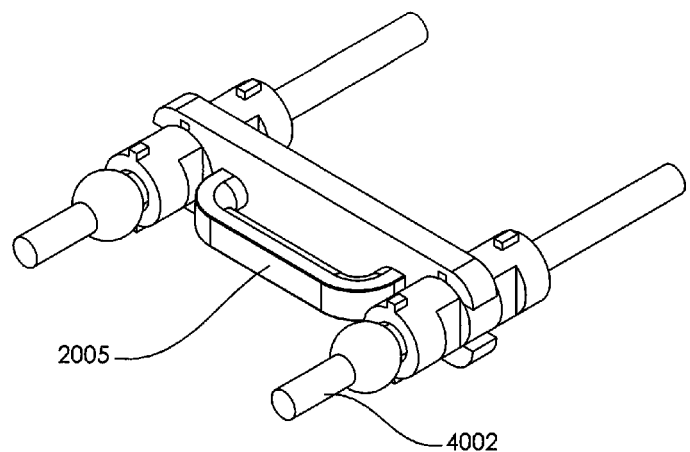
Fig. 20A
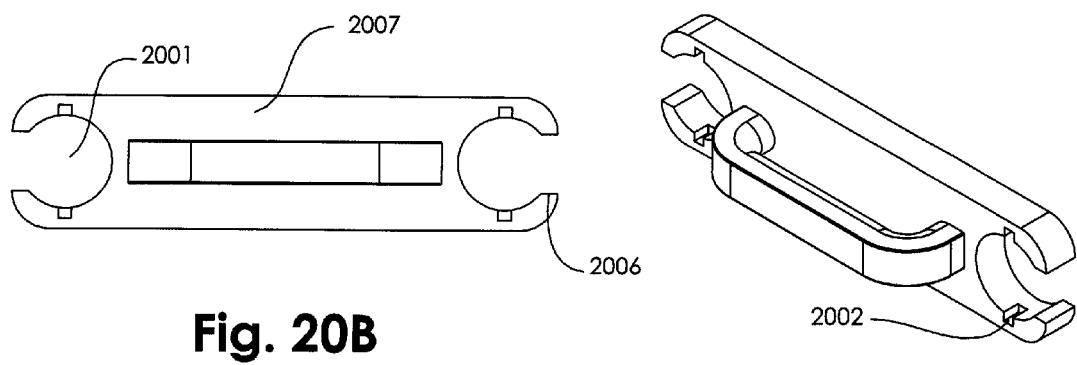
Fig. 20B
Fig. 20C
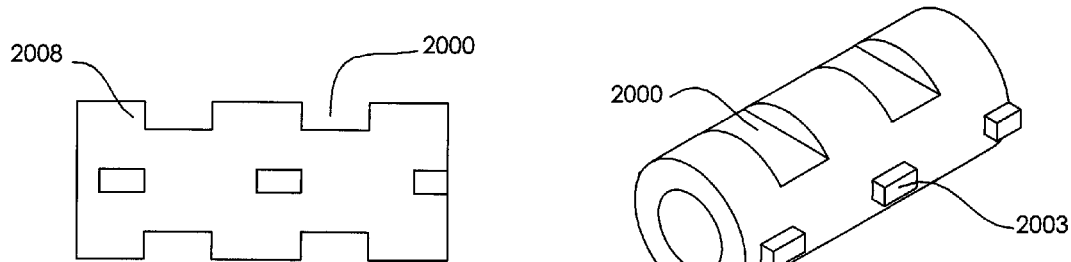
Fig. 20D
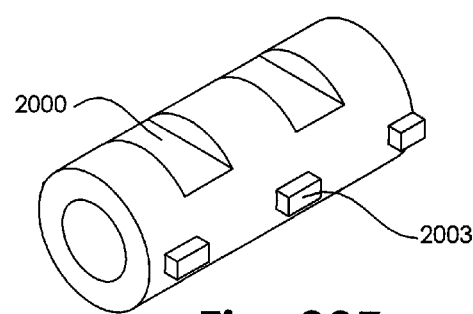
Fig. 20E

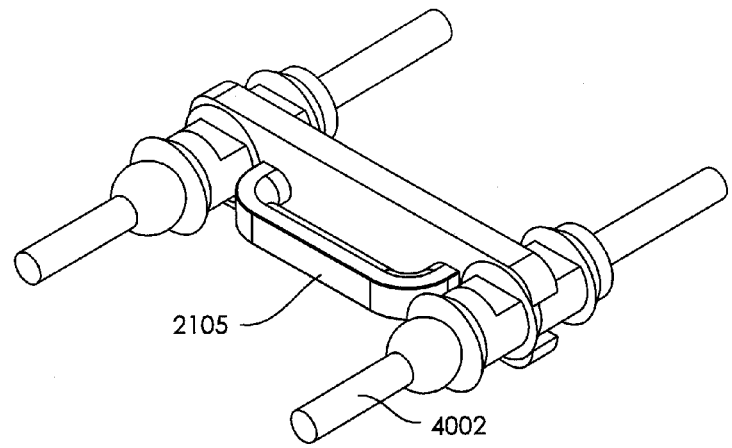
Fig. 21A
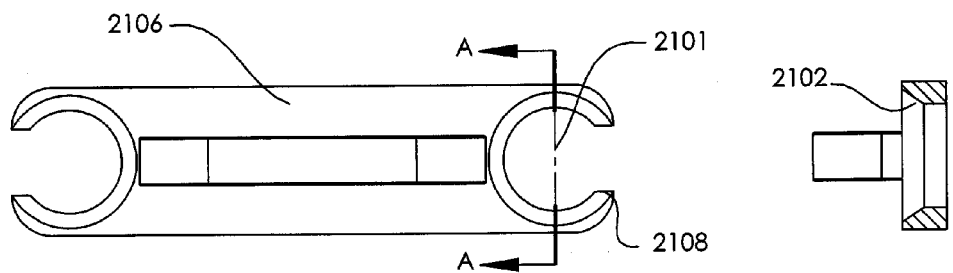
Fig. 21B   Fig. 21C
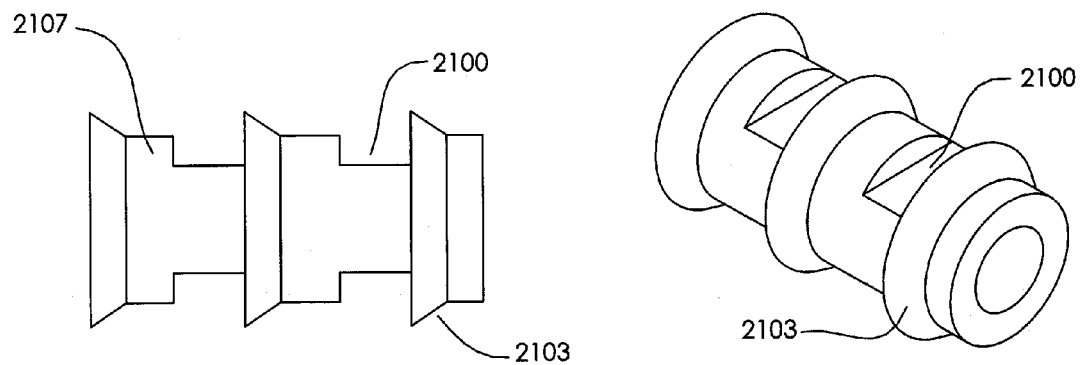
Fig. 21D   Fig. 21E

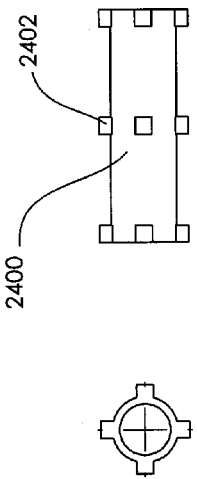
Fig. 24C
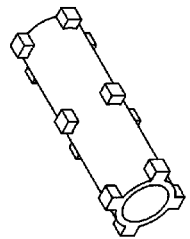
Fig. 24B
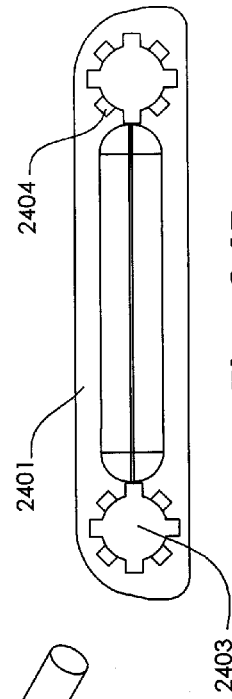
Fig. 24E
Fig. 24F
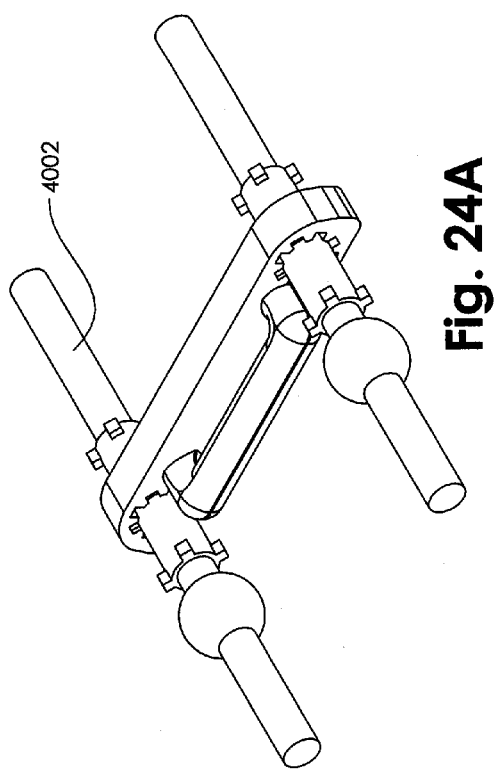
Fig. 24A
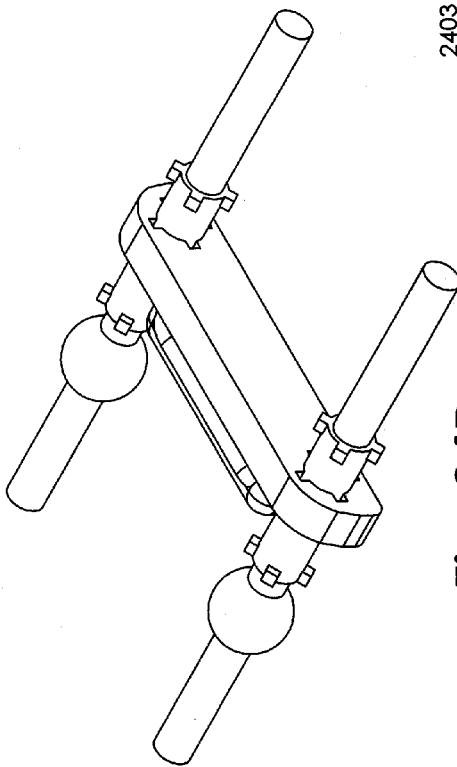
Fig. 24D

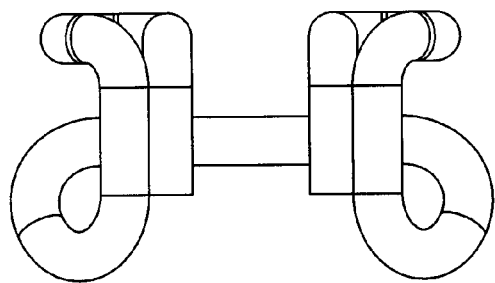
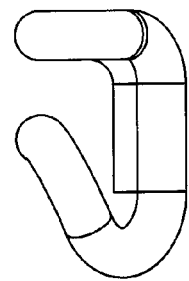
Fig. 25A  Fig. 25B
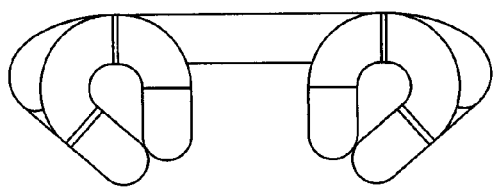
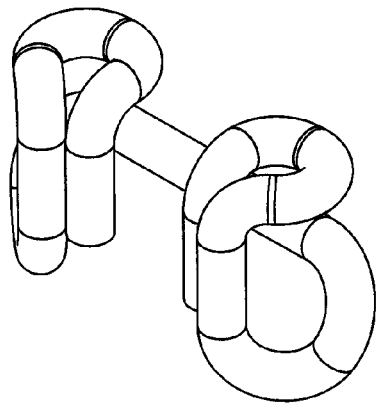
Fig. 25C  Fig. 25D
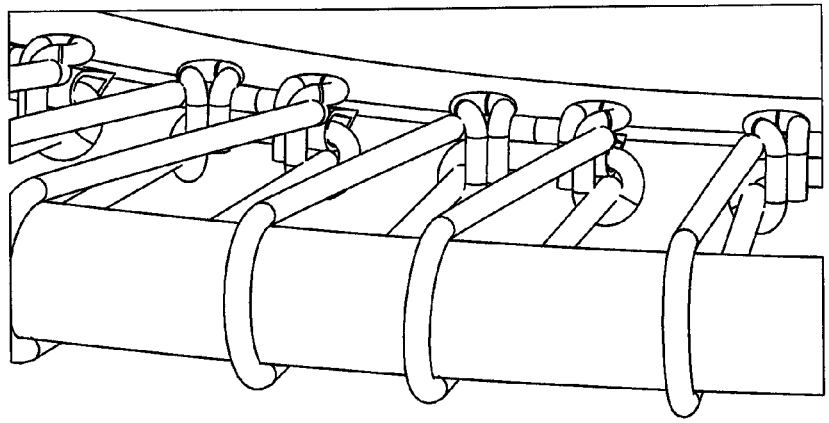
Fig. 25E

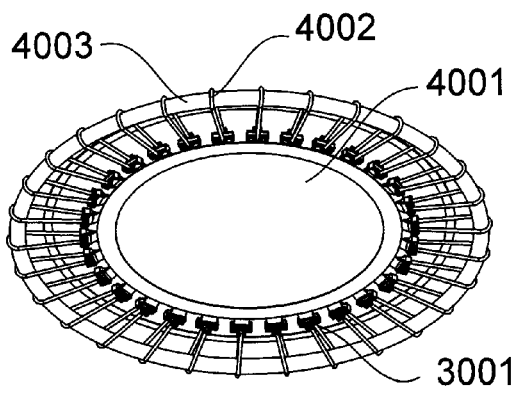
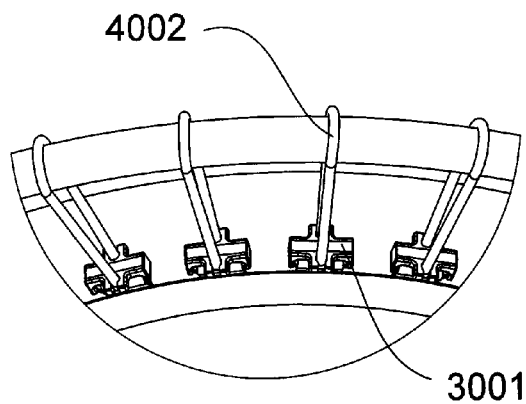
Fig. 30A
Fig. 30B
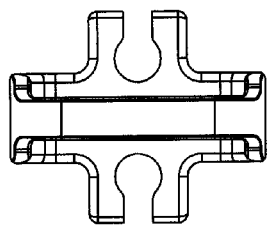
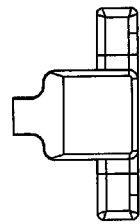
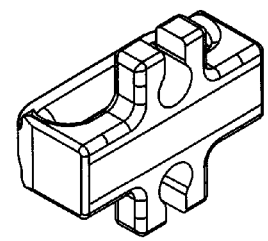
Fig. 30C
Fig. 30D
Fig. 30E
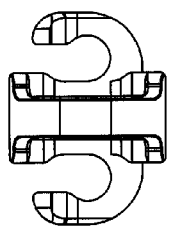
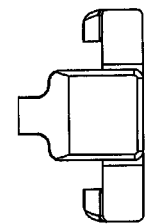
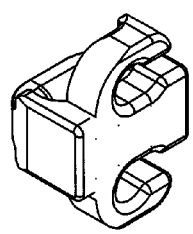
Fig. 30F
Fig. 30G
Fig. 30H

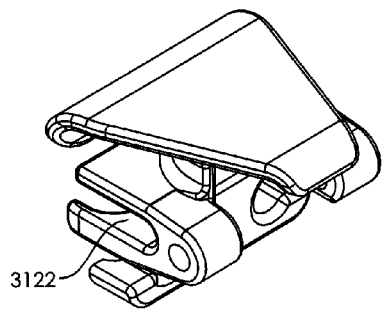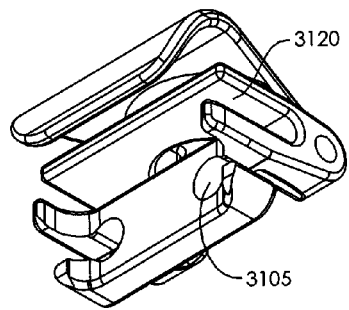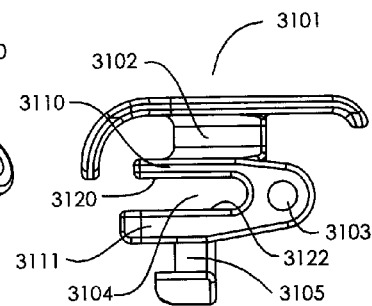
Fig. 31A  Fig. 31B  Fig. 31C
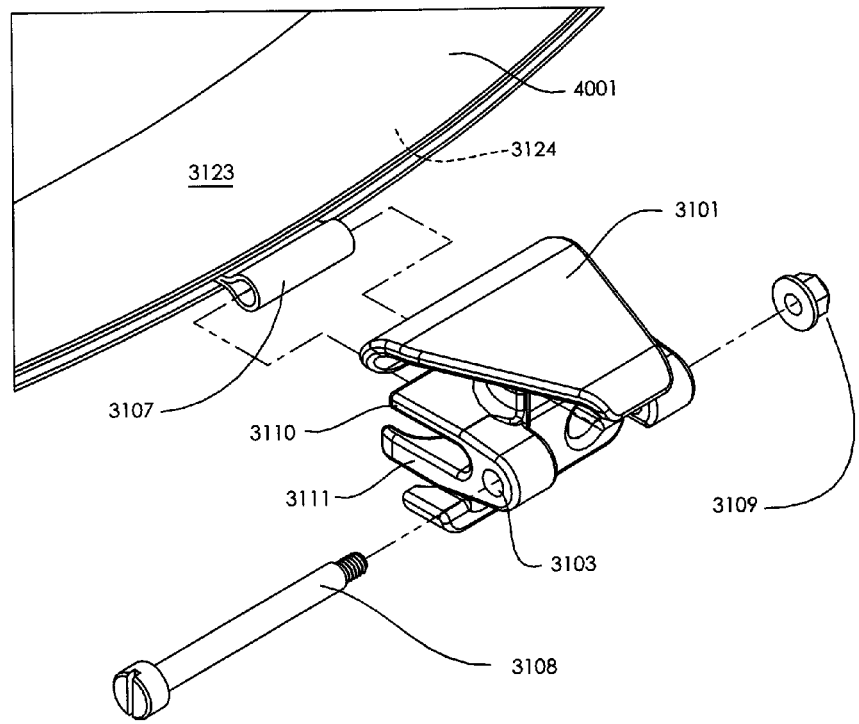
Fig. 31D

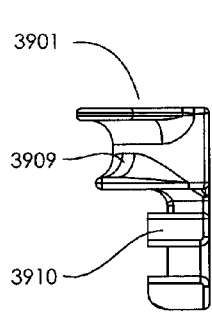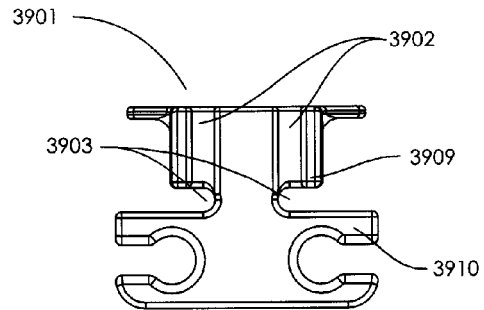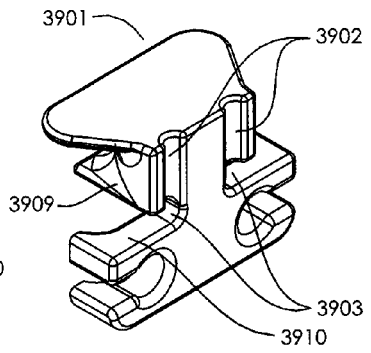
Fig. 39A  Fig. 39B  Fig. 39C
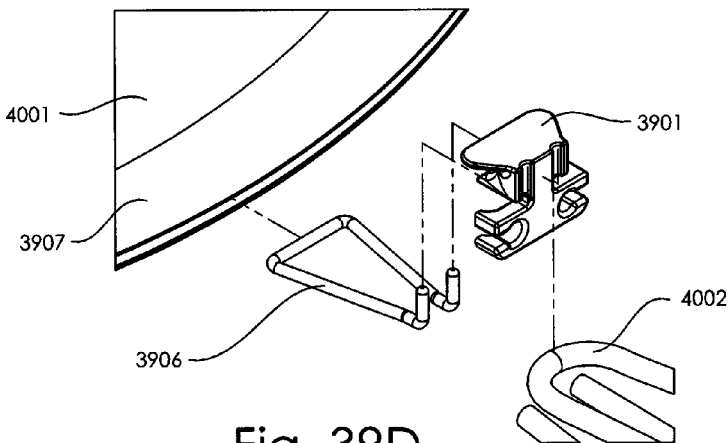
Fig. 39D
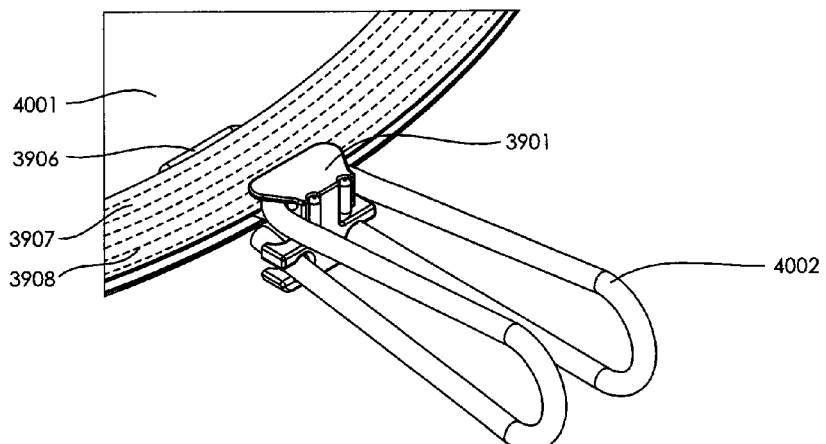
Fig. 39E

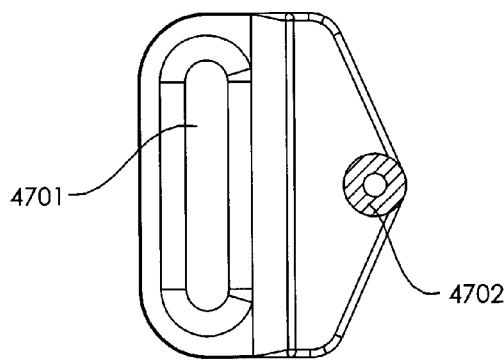
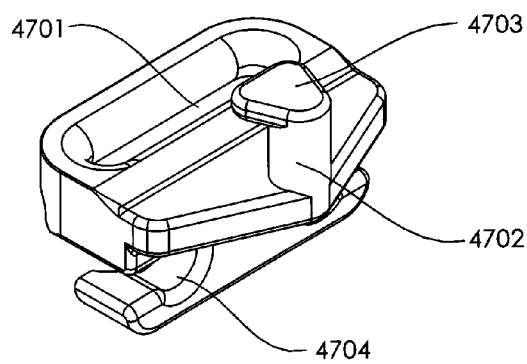
Fig. 47A    Fig. 47B
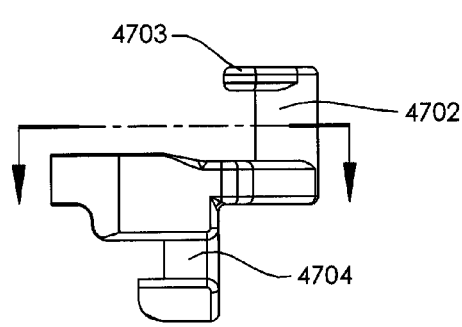
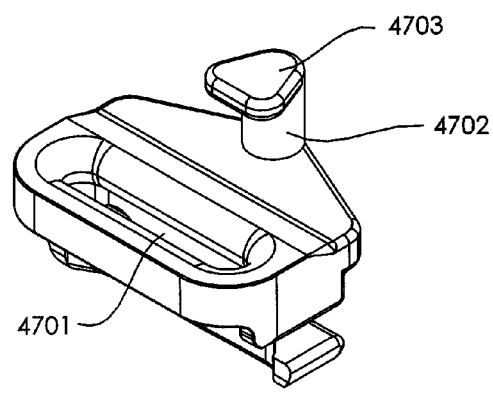
Fig. 47C    Fig. 47D
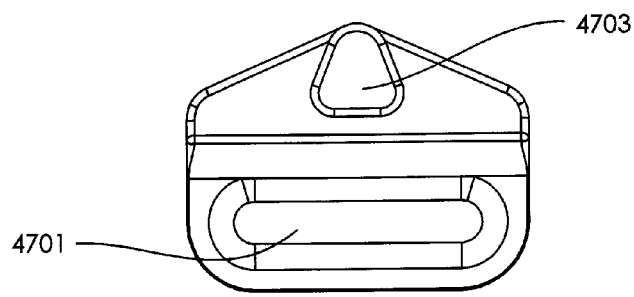
Fig. 47E

US 9,289,637 B2

REBOUNDING APPARATUS WITH TENSIONED ELASTIC CORDS

CROSS REFERENCE TO RELATED APPLICATIONS

This is a continuation-in-part of application Ser. No. 13/562,240, filed Jul. 30, 2012, which is a continuation-in-part of application Ser. No. 13/420,519, filed Mar. 14, 2012, which is a continuation-in-part of International Application No. PCT/US10/48820, filed Sep. 14, 2010, which is a continuation-in-part of application Ser. No. 12/881,105, filed Sep. 14, 2009.

This is a continuation-in-part of application Ser. No. 13/562,240, filed Jul. 30, 2012, which is a continuation-in-part of application Ser. No. 13/420,519, filed Mar. 14, 2012, which is a continuation-in-part of International Application No. PCT/US10/48820, filed Sep. 14, 2010, which is a continuation-in-part of application Ser. No. 12/881,486, filed Sep. 29, 2009.

This is a continuation-in-part of application Ser. No. 13/562,240, filed Jul. 30, 2012, which is a continuation-in-part of application Ser. No. 13/420,519, filed Mar. 14, 2012, which is a continuation-in-part of International Application No. PCT/US10/48820, filed Sep. 14, 2010, which claims the benefit of the U.S. Provisional Application No. 61/321,571, filed Apr. 7, 2010.

This is a continuation-in-part of application Ser. No. 13/562,240, filed Jul. 30, 2012, which is a continuation-in-part of application Ser. No. 13/403,973, filed Feb. 23, 2012, which is a continuation-in-part of application Ser. No. 13/068,855, filed May 18, 2010.

This is a continuation-in-part of application Ser. No. 13/562,240, filed Jul. 30, 2012, which is a continuation-in-part of application Ser. No. 13/403,973, filed Feb. 23, 2012, which claims the benefit of U.S. Provisional Application No. 61/446,035, filed Feb. 23, 2011.

This is a continuation-in-part of application Ser. No. 13/562,240, filed Jul. 30, 2012, which claims the benefit of U.S. Provisional Application No. 61/598,869, filed Feb. 14, 2012.

This is a continuation-in-part of application Ser. No. 13/562,240, filed Jul. 30, 2012, which is a continuation-in-part of application Ser. No. 13/420,519, filed Mar. 14, 2012, which is a continuation-in-part of application Ser. No. 13/403,973, filed Feb. 23, 2012.

This claims the benefit of U.S. Provisional Application No. 61/751,240, filed Jan. 10, 2013.

All of the above-referenced applications are incorporated herein by reference in their entireties.

BACKGROUND

This disclosure relates to rebounding apparatus that are relatively small trampoline-type devices for physical exercise. Such devices, commonly referred to as "rebounders," typically are circular, and sometimes rectangular, and have a relatively small diameter of approximately 50 inches or less with the frame encompassing an area of approximately 2,000 square inches or less. Such devices have a relatively small diameter flexible surface area available for jumping of about 1,250 square inches or less, but could be as much as 2,000 square inches or approximately equal to the frame area by using an atypical rebounder spring member arrangement. Examples of such device are shown in U.S. Pat. No. 7,094,181 (to Hall, Aug. 22, 2006) and U.S. Pat. No. 4,331,329 (to Mirkovich et al., May 25, 1982), both of which are incorporated herein by reference. The frames described herein are usually fabricated from a metal such as steel, aluminum, or other metal alloy. Such frames usually define a central opening that supports a flat or planar rebounding mat or jumping surface that is elastically suspended within the central opening. At least one or more of elastic spring members couple the rebounding mat to the frame in elastic suspension. The spring members each have an elongated body that extends between the jumping mat and the frame. The frame can be of several configurations and is not limited by shape in any dimension beyond its need to support a flat rebounding surface at any angle.

The described apparatus may also be fabricated with other materials, such as plastics of various types, fiberglass, Kevlar or other aramid fibers may be used, or other composites of a suitable material, or some combination of any of these materials capable of providing sufficient structural support for a trampoline and its typical usage. The adult and adult sized users of such devices are individual persons generally over 16 years old, and between a height of 4 feet 7 inches and 6 feet 7 inches, with a weight range between 70 lbs to 400 lbs. Children between the ages of 4 to 8 may also use these trampolines for fitness and fun, but their bodyweight is generally lighter, between 30 to 80 lbs. Young people between the ages of 8 and 16 can vary greatly in weight and size, from 50 lbs to in excess of 300 lbs. The instant invention is configurable to support each of individuals in these weight ranges and within these age groups.

Such devices, like larger backyard trampolines, have a bed that is made of flexible fabric attached to an encompassing frame by spring elements. A plurality of legs supports the frame at a distance above the ground. The height of the rebounding surface above the ground surface can range from a few inches to approximately 18 inches. The height may be greater, but generally not higher than 24 inches above the ground surface. Any higher than 24 inches, and safety concerns are raised as a user would be higher off the ground surface on a smaller platform (jump surface) that is unstable. Hence, a device higher than 24 inches above the ground surface generally needs to be of a greater diameter than what's been described, and tends towards being more properly defined as a large trampoline or full size trampoline, and not a fitness rebounder or mini trampoline. The spring members or elements may be of any kind of rope or cord which has elastic qualities which permits the spring member to stretch when extended or compress when extension is reversed or shortened. The spring members may be any type of elastic cords or may be made of a natural or synthetic rubber or other man made elastic material, or include the type of cords known as bungee or shock cords composed of one or more elastic strands forming a core and commonly covered in a sheath of woven material such as cotton, polypropylene, or other suitable material. Also, the spring member may include any other types of metal or composite springs or other type of cords that may function with the indicated embodiments or that may be configured for use with a rebounder described herein.

In a typical prior art trampoline and rebounder configuration, the mat is tensioned by such previously described elastic or spring elements generally arranged radially between the mat outer diameter and the inner diameter of the frame. This area is sometimes covered by a static pad which is attached to the frame, and prevents the user from stepping directly onto the elastic elements or springs.

It is an object of the invention to allow for adjustable spring members which allow for tension adjustments according to a user's weight or athletic ability. Up until this innovation, the only way tension has been changed or adjusted for mini-trampoline spring members, especially elastic cords, has been to remove an existing cord, and then replace it with an entirely different elastic cord member of a different tension; generally achieved by the replacing cord being of a lesser or greater diameter. Such "swapping out" of cords can be very time consuming, and results in added expense for a consumer due to the requirement to purchase, store, and then locate, additional cords. These requirements and limitations are substantially reduced with the current invention because the same cord is used to change the tension for multiple users. With the current device, the user may adjust the existing cord to alter tension, resulting in a significant gain in utility, as well as reduction in costs and expenses. Additionally, users of different weights and abilities may use the same trampoline and cord members even though they vary greatly in body weight, or athletic ability.

Disclosed herein are trampoline-type devices that comprise an encompassing frame supported by plural legs that contains adjustable bungee (or elastic member) connectors and extenders. Also disclosed are new cord configurations and embodiments of the type disclosed in PCT/US2010/048820. Also disclosed is a cross over elastic cord configuration of the type disclosed in U.S. Provisional Patent Application 61/52,130, filed May 25, 2012. Also, disclosed are additional connector configurations for cord attachment shown in U.S. Provisional Patent Application 61/52,130, filed May 25, 2012.

Also disclosed are cord and elastic spring member connectors which permit a significant increase in the usable surface area of the rebounding mat without any corresponding loss or reduction of elastic spring member length. These connectors shown are called a Through Pin Connector; a Snap Pin Connector; a Through Pin Compression Connector; a Snap Pin Compression Connector; a Clamping Compression Connector; and a Two Part Clamping Compression Connector. These connectors result in a measurably larger usable jump surface, yet without any corresponding loss in spring performance because the original spring length does not need to be altered to accommodate the larger jump surface or mat. This is a significant improvement over current art, and is achieved without an additional need to adjust the height of the jump surface relative to the ground surface.

Also disclosed is a unique clip in connector, that also allows for slightly more usable jump surface though not as significantly and the previously described connectors. Also disclosed is a unique crossover elastic cord member connector.

Also disclosed are various connector and cord covers that may be attached to the jump surface via the connectors that serve to protect those same connectors, and also to further expand the useable surface area of the jump mat.

It is another object to provide such an improved trampoline which is easy to assemble.

SUMMARY

In the present invention, the first object is achieved by providing a rebounding surface comprising a closed frame that is horizontally disposed, a rebounding mat having at least a central portion thereof elastically suspended within the closed frame, at least one cordlike flexible elastic member, each having a first end and an opposing end for coupling the central portion of the rebounding mat in elastic suspension to the frame, a plurality of connectors attached to the perimeter of the central portion of the rebounding mat, each connector connecting a cordlike flexible elastic member to the rebounding mat, wherein at least one of the frame, and at least one cordlike elastic member and a connector of the plurality are adapted to dispose at least one of the first end and opposing end of the at least one cordlike elastic member at least two alternative positions to provide at least two alternative levels of tension to the rebounding mat.

Another way of describing the adjustability of the spring members is that at least one of the connectors couples a cordlike elastic member in a manner such that the tension of the "tensioned portion" of the elastic member can be adjusted by moving a portion of the body of the member relative to the connector. The "tensioned portion" is defined as that portion of the elastic member that extends between the two most distant places where the cord is connected where the tensioned part of the cord member terminates. It can be possible for parts of the cord to extend beyond the tensioned part. As one example, if an elastic bungee were to be knotted, the excess material would be part of the cord, but not part of the tensioned portion of the cord. This is shown in FIG. 4A, 409. 409 represent the nexus between the tensioned and non-tensioned portion of the cordlike elastic member. The knot of the cord and some additional cord material are part of the same cord but are not under tension.

An additional aspect of the invention is characterized in that several described connectors, clips, or couplers (interchangeable descriptors) is comprised of no less than three connection location points or positions for retaining an elastic cord member that is capable of multiple tension adjustment positions. One attachment (or mated engagement) position occurs where one segment or length of the cord is directly adjacent and seated such that it fastens or holds along a curve segment of the connector whose angle α is always greater than 180 degrees; preferably at or greater than 200 degrees. Note that "mated engagement" can also refer to a cord segment or bulbous portion being attached or inserted in or to an aperture at a 90 degree angle in the aperture. However, this angle can be greater than 90 degrees. It has been found that 200 degrees optimally minimizes unwanted cord friction along the curved attachment position. This angle is described visually in FIG. 16E where the angle α is always greater than 180 degrees for the curvilinear surface shown, and duplicated at all other curvilinear surfaces of the other connectors shown. This cord loop attachment position or retaining feature, see FIG. 5, 502, holds a central segment of the elastic cord at some location between two additional attachment positions. The second and third attachment positions consist of apertures, apertures or sockets (which are interchangeable terms) that retain the two ends of the elastic cord. Sometimes additional material of the elastic spring member may be present at a distance further from an attachment aperture than the bulbous protrusion secured at an aperture location on a connector, or elsewhere. For example, the cord may be knotted such the terminal end of the cord is not part of the knot, but rather constitutes non functioning excess material. This is defined as the tensioned portion of the cord segment, FIG. 4A, 409. The attachable ends of the bungee or elastic cords are of a larger diameter than the apertures or sockets such that they will not slip back through the apertures. These attachable ends may be configured to do this any number of ways; however one preferred method is to knot the cord at or near the end, and at one or more additional locations along the length of the elastic cord so that multiple tension adjustments may be achieved. The remainder of the same cord encircles the frame rail opposite the connector and then returns to be connected at a third tensioned position, which is that portion of the elastic member that is furthest from where the first tensioned coupling occurs. So the elastic cord extends between the two most distant tensioned locations where the cord is connected. Other ways of ensuring that the coupled or connected ends of the cords are larger than the diameter of the cords themselves may be conceived, some of which are disclosed herein. Knots are a preferred method due to the simplicity and ease of adjustability. Of no less importance is the advantage of knots taking up very little space when compared to other attachments that serve to enlarge the end of a cord member.

Another aspect of the invention is characterized in that the rebounding surface further comprises a plurality of cord-like elastic members, wherein at least some of the plurality of cord-like elastic member are folded at the center thereof, with the folded center thereof wrapped around the connector and each of the two portion thereof between the center and the first and opposing end returning to wraparound an adjacent portion of the frame such that the first and opposing ends are tensioned on return to connect at the periphery of the rebounding mat to provide tension thereto.

In another aspect of the invention, it has been discovered that the service life and utility of fabric containing cord-like elastic members can be greatly extended by a process of re-tensioning, provided they are not initially strained to what has been discovered to be an excessive level. As re-tensioning involves extending the cord-like elastic members beyond the length that provided an initial level of tension, still further aspects of the invention include particular methods and apparatus for conveniently extending the length beyond the initial length so as to achieve a level of tension comparable to the level of tension at the first or initial length extension of the cord or spring member.

When considering trampolines, further extending the cords has not been utilized for several reasons. The most important reason has been that such extension was feared to overly weaken the cord segment such that breakage and possible injury to a user was considered; and so prior art teaches away from such capability for use with a device that suffers extreme shock and repetitive use by weighted jumpers. Additionally, with trampoline devices, the elastic members or cords are set in a substantially horizontal position so that whenever a jumper lands on the trampoline surface, the elastic members receive constant and severe lateral impacts during the cord's extension and contraction. The cords therefore do not stretch in a solely linear (up and down; forward or back) direction, but instead are stretched sideways and down. Thus, rebounding and trampolining places a greater perpendicular sheer force against and upon the cords or spring members, in contrast to what would occur if one were to simply pull or extend and contract a cord without additional lateral stress. In response to these concerns, all known trampolines have used cords designed to be replaceable, but not adjustable in themselves. In these designs, tension is adjusted by replacing in its entirety, an existing cord with a heavier or lighter duty cord. The current invention has rejected the evident assumption that trampoline cords should be adjustable only by replacing the existing cord with another, and not by altering the extension and tension level of the existing bungee cord.

Once a bungee has been chosen for its optimum tension based upon its designated use, the entire cord inevitably breaks down over time and usage because the cell structure within the rubber in the individual strands tear and breakdown. It has been assumed in the industry, that an elastic cord would no longer be useful or re-useable for rebounding as it broke down and fatigued in the manner described; that this degradation was not only irreversible physically, but from a performance degradation standpoint as well, due to cord fatigue and the inevitable breakdown of the cord fibers and materials. The industry apparently continues to believe and act on this assumption. So, trampolines with re-adjustable elastic cords are not produced for rebounders of the diameter encompassed prior to the current invention. Rather, manufacturers typically provide multiple versions of different size bungees that are replaceable in their entirety, but are not adjustable by themselves. In contrast, the devices described herein provide for the exact same bungee to be utilized, for both its extended life, and for its ability to transform its tension to adapt to different or heavier users; without the necessity of a complete bungee cord replacement.

It was not predicted that the fatiguing of the cord would not result in a breakdown of lifespan or use-strength of an individual cord. The bounce quality of the cord was unexpectedly restored to its original performance level by the act of re-tensioning. This occurred, even though the cord had fatigued and broken down below the required threshold performance level prior to re-tensioning for the first time. First tension was tested to last approximately 2 million cycles. The next time the cord was adjusted, it unexpectedly lasted for an additional 2 million cycles as well, before re-tensioning or replacement was considered. This result was not foreseen to the expected result.

Finally, the unexpected results continued when we learned that one could re-tension the cord further (three more times) before it would finally breakdown in the manner expected. The expectation was that once a bungee fatigues, it is no longer usable and must be thrown out and replaced with a new cord. And that therefore, a fatigued bungee could no longer be re-tensioned because its performance characteristics would be degraded to the point where it would no longer perform at the previous level. It was additionally expected that the fatigued cord would break down even more quickly than before the first adjustment. It seemed self evident that a worn out cord is no longer useful or perhaps, even safe. So the question has always presented in the industry, "why bother with re-tensioning a cord for continued use when one need only swap out the existing "broken down" cord for a new one?" Those skilled in the art apparently assume, as we did, that re-tensioning an already fatigued bungee served no useful purpose or utility.

This inventor's engineers believed this; that re-tensioning would give the results that the known art at the time expected; namely that replacement was the only option for bungees once elasticity started to degrade for the purposes of rebounding on a trampoline. The current lifespan of bungees and the fact that bungees are replaced and not re-used currently is evidence of this. However, each time this inventor's engineers re-tensioned a cord, it was found that the original performance standards had not dramatically degraded as expected, but in fact, only minimally or very slightly degraded; such that the user would not be able to notice the change.

Therefore, additional test cycles were added, allowing the bungee to fatigue until its performance fell below performance criteria, until up to the point that three re-tensioning events had occurred. This is shown in the cycle test data appearing in FIGS. 18-19 and in Appendix A. After the third tensioning event, the limit of elasticity of the cord was reached, and it was no longer possible for the cord to stretch far enough to perform an entire rebound cycle a desired manner As a result of this new data, it was realized that we could therefore re-tension cords, not just for the sole purpose of extending the life of the cords, but we now understood that we had the wherewithal to also increase the overall static tension of the jumping surface using the exact same bungee, in order that a heavier user in particular, could optimize the bounce performance for their own use; without dramatically reducing the cycle life of the bungee at the increased tension necessary to support that heavier/larger user Prior to this, it was assumed that one would purchase a bungee and optimize the performance by selecting the right amount of rubber to achieve certain performance characteristics. It was therefore expected that in order to have a bungee designed for a heavier user, that heavier or more substantial bungees would also be required; bungees with more rubber, and/or heavier sheathing, etc.; in short, a heavier bungee for a heavier user. This, in fact, is the current practice in the industry. A manufacturer might have various, lighter or heavier bungees that must replace their standard bungees, in order to accommodate different users by weight or due to the increase in downward force performed by a lighter, but a particularly athletic user. This concept is discussed further in these specifications.

The above and other objects, effects, features, and advantages of the present invention will become more apparent from the following description of the embodiments thereof taken in conjunction with the accompanying drawings.

BRIEF DESCRIPTION OF THE DRAWINGS

The accompanying drawings, incorporated in and forming a part of the specification, illustrate several trampoline and rebounder arrangements. Some embodiments of the invention are described in the following description. Other embodiments are contained in the cross referenced applications that have been incorporated by reference.

In the drawings:

FIG. 4A is a cross-sectional elevation at section line A-A of FIG. 4B of a portion of the underside of a trampoline showing another arrangement for attaching a connector to the elastic cord in a serpentine arrangement.

FIG. 4B is a plan view from below the trampoline of FIG. 4A showing a portion thereof deploying several of the connectors.

FIG. 4C is a partial radial cross-sectional elevation at section line B-B of FIG. 4B.

FIG. 4D is a perspective view of the connector of FIGS. 4A-4C.

FIG. 8A is a perspective view of another alternative connector.

FIG. 8B is a cross-sectional elevation of the connector of FIG. 8A.

FIG. 9A is a front perspective view of another alternative connector.

FIG. 9B is a rear is a perspective view of the connector of FIG. 9A.

FIG. 12A is a front perspective view of another alternative connector.

FIG. 12B is a rear perspective view of the connector of FIG. 12A.

FIG. 14A is a front elevation of the connector of FIGS. 12A-13.

FIG. 14B is a top plan view of the connector of FIG. 14A.

FIG. 14C is a rear elevation view of the connector of FIG. 14A.

FIG. 14D is a cross-sectional view at section line A-A in FIG. 14C.

FIG. 15C is an enlarged perspective view of a portion of the underside of the rebounder of FIG. 15A.

FIG. 15D is an enlarged plan view of the detailed portion "A" in FIG. 15B.

FIG. 16A is a front perspective view of a connector of FIG. 15B-15D.

FIG. 16B is a rear perspective view of the connector of FIG. 16A.

FIG. 16C is a top plan view of the connector of FIG. 16A.

FIG. 16D is a side elevation view of the connector of FIG. 16A.

FIG. 16E is a cross-section view at section line A-A in FIG. 16D.

FIG. 17A is a front perspective view of an alternative connector suitable for use with the rebounder of FIGS. 15A-D.

FIG. 17B is a rear perspective view of the connector of FIG. 17A.

FIG. 17C is a top plan view of the connector of FIG. 17A.

FIG. 17D is a rear elevation view of the connector of FIG. 17A.

FIG. 17E is a side elevation view of the connector of FIG. 17A.

FIG. 17F is a cross-sectional elevation view at section line A-A in FIG. 17D.

FIG. 19 is a graph of the cyclic stress level recorded when an elastic covered fabric cord is repeated cycled with repeated re-tensioning.

FIGS. 20A-20E are views of an adjustable slotted clover bungee connector and its components.

FIGS. 21A-21E are views of an adjustable cone clover bungee connector and its components.

FIGS. 24A-24F are views of an adjustable through-hole clover assembly and its components.

FIGS. 25A-E and FIGS. 26A-26B are views of a rebounder system with elastic members or bungee cords utilizing a wireform connector for adjustable bungees or cords.

FIG. 30A is a lower isometric view of a rebounder with two point connectors.

FIG. 30B is a close up lower view of a rebounder with four point connectors.

FIG. 30C is a front view of a two point connector.

FIG. 30D is a side view of a two point connector.

FIG. 30E is an isometric view of a two point connector.

FIG. 30F is a front view of an alternate two point connector.

FIG. 30G is a side view of an alternate two point connector.

FIG. 30H is an isometric view of an alternate two point connector.

FIG. 31A is an isometric view of a through pin compression connector.

FIG. 31B is a lower isometric view of a through pin compression connector.

FIG. 31C is a side view of a through pin compression connector.

FIG. 31D is an exploded assembly view of the through pin compression connector.

FIG. 38B is an isometric exploded view of a two part clamping compression connector with two screws.

FIG. 38C is a side view of a two part clamping compression connector where the two parts are attached.

FIG. 38D is an isometric view of a two part clamping compression connector where the two parts are attached.

FIG. 39A is a side view of a clip in connector.

FIG. 39B is a front view of a clip in connector.

FIG. 39C is an isometric view of a clip in connector.

FIG. 39D is an exploded isometric view of a clip in connector assembly.

FIG. 39E is an isometric view of a clip in connector assembly.

FIG. 40 is a general view of key parts of the described mini trampoline.

FIG. 41A is an isometric view of a side by side pin connector.

FIG. 41B is a rear isometric view of a side by side pin connector.

FIG. 41C is a side view of a side by side pin connector.

Figure 41A:
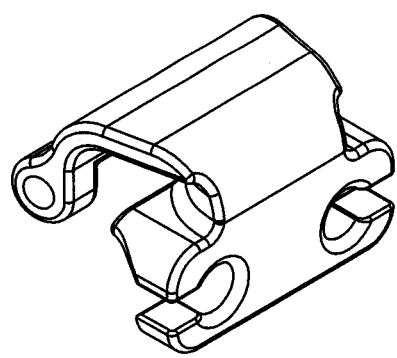
Figure 41B:
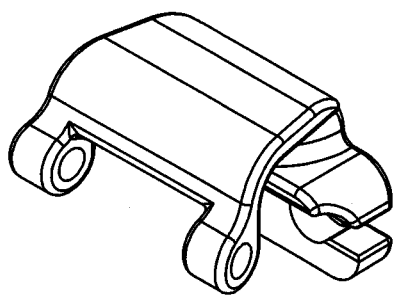
Figure 41C:
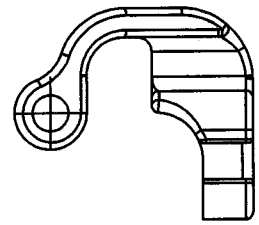
Figure 41D:
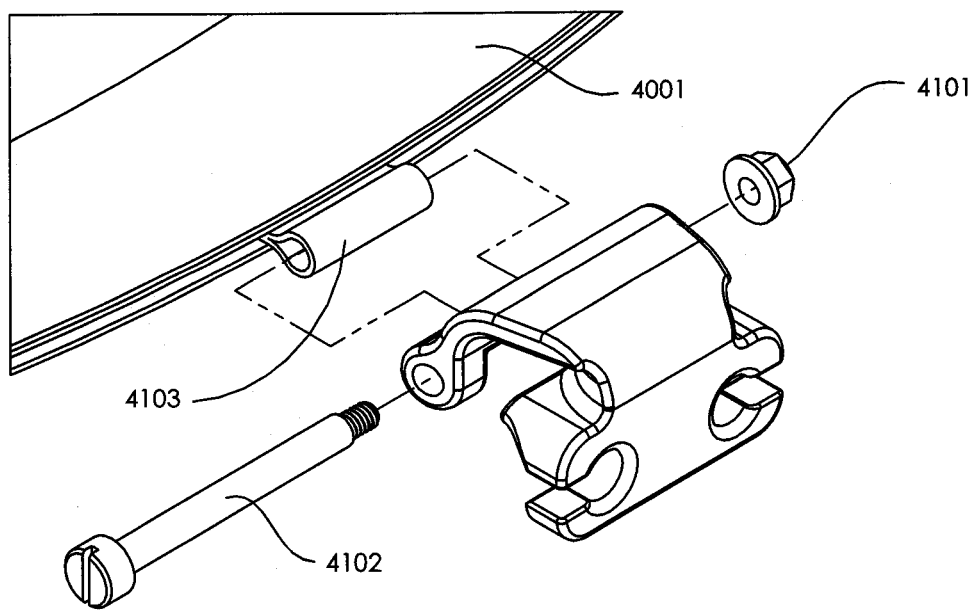

FIG. 41D is an exploded assembly view of a side by side pin connector.

Figure 42A:
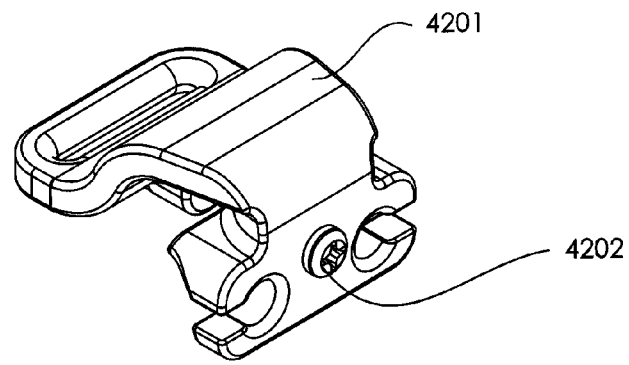

FIG. 42A is an isometric view of a reinforced side by side connector.

Figure 42B:
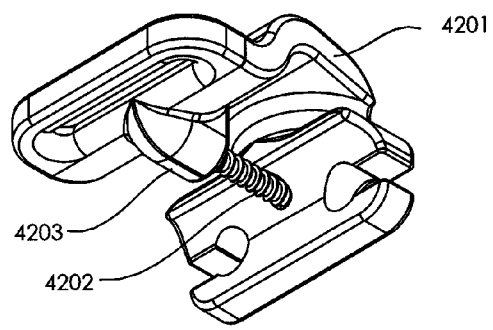

FIG. 42B is a lower isometric view of a reinforced side by side connector.

Figure 42C:
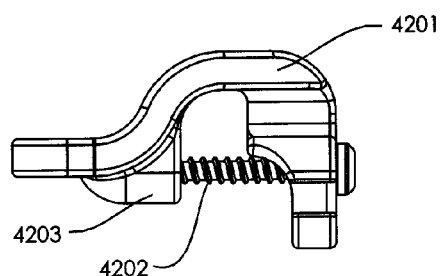

FIG. 42C is a side view of a reinforced side by side connector.

Figure 42D:
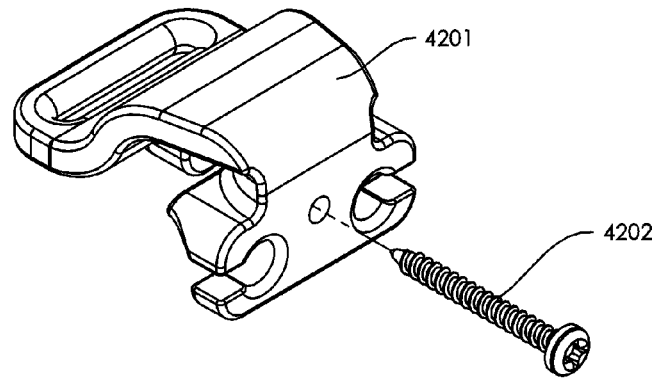

FIG. 42D is an exploded isometric view of a reinforced side by side connector.

Figure 43A:
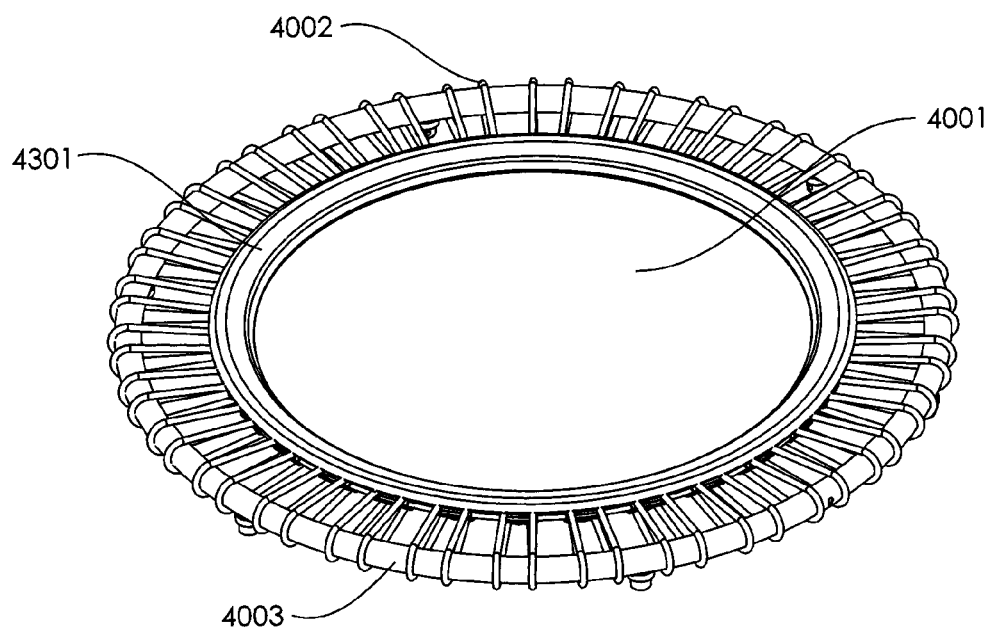

FIG. 43A is a compression connector mat with a connector cover installed.

Figure 43B:

FIG. 43B is a side section view of the compression connector mat assembly.

Figure 43C:
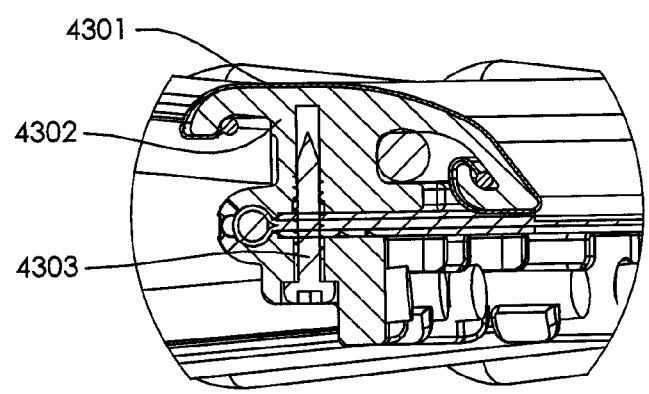

FIG. 43C is a close up side section view of the compression connector mat assembly.

Figure 44A:
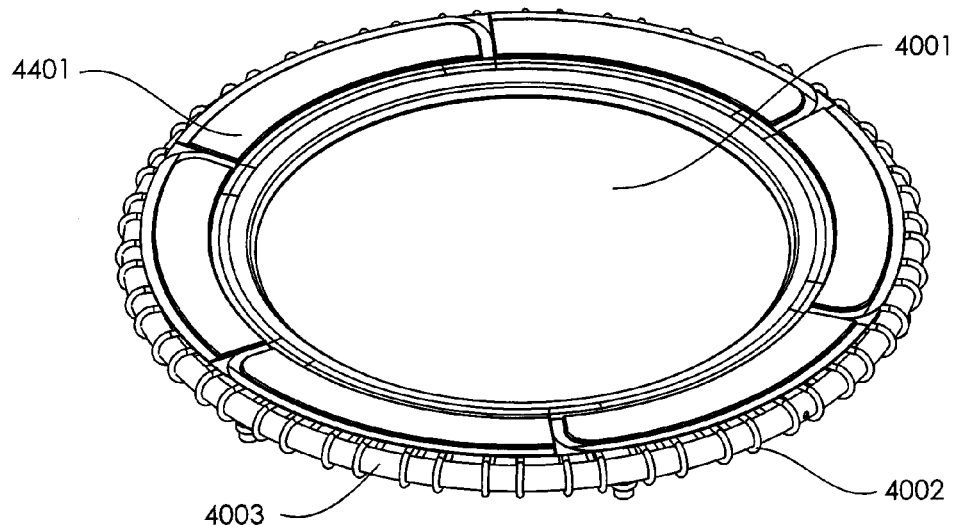

FIG. 44A is a compression connector mat with a connector petal cover installed.

Figure 44B:
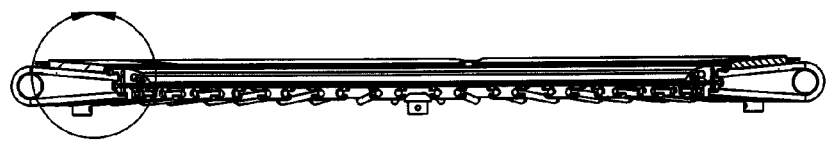

FIG. 44B is a side section view of the compression connector mat assembly.

Figure 44C:
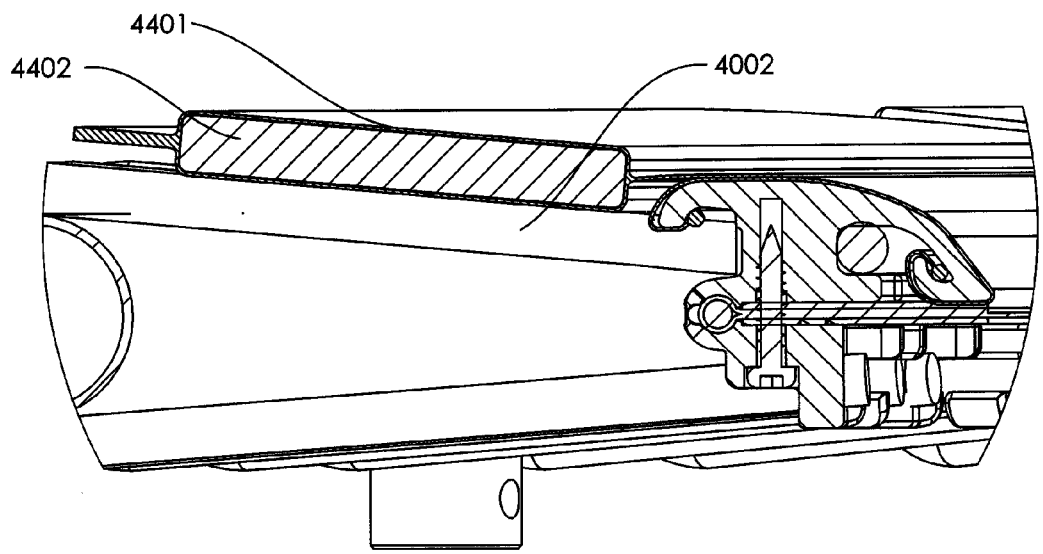

FIG. 44C is a close up side section view of the compression connector mat assembly.

Figure 45A:
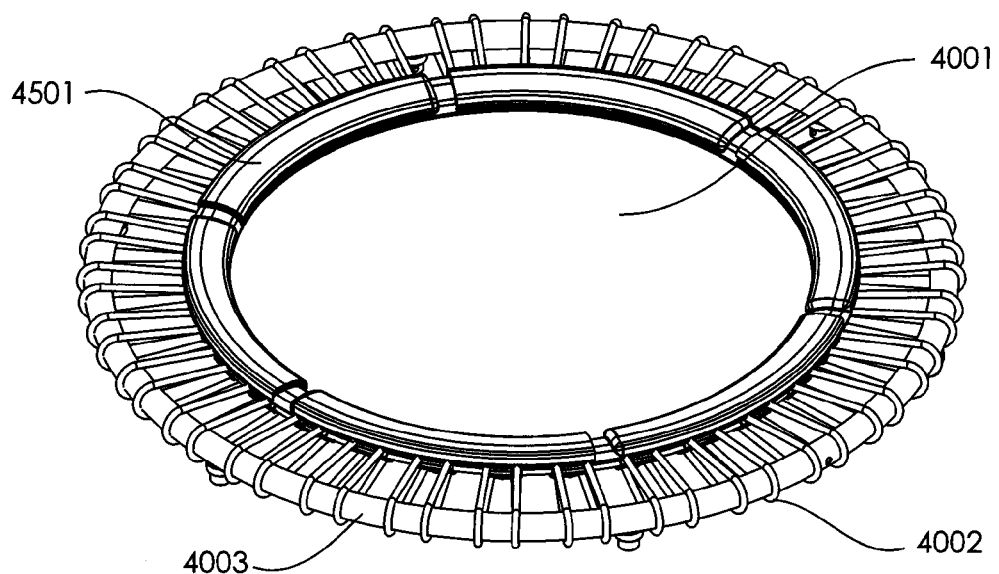

FIG. 45A is a compression connector mat with a padded connector cover installed.

Figure 45B:
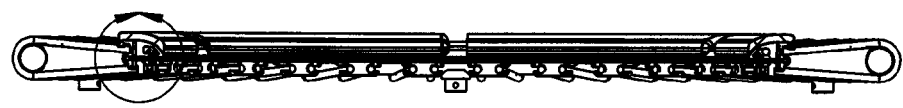

FIG. 45B is a side section view of the compression connector mat assembly.

Figure 45C:
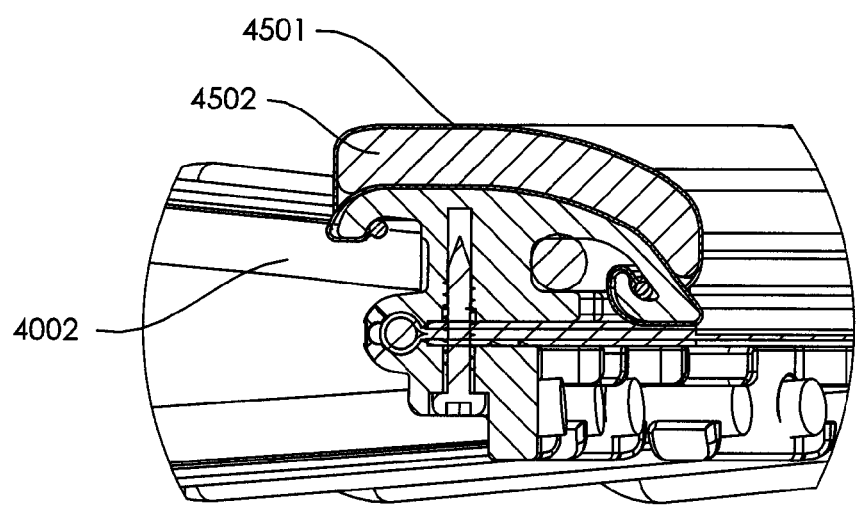

FIG. 45C is a close up side section view of the compression connector mat assembly.

Figure 46A:
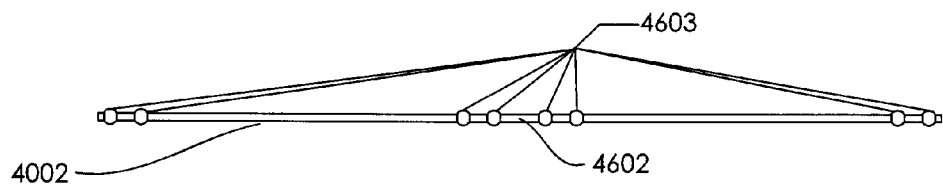

FIG. 46A is a front view diagram of a connected cord on a rebounding apparatus with a plurality of connectors where a single connected elastic cord is attached to two adjacent connectors.

Figure 46B:
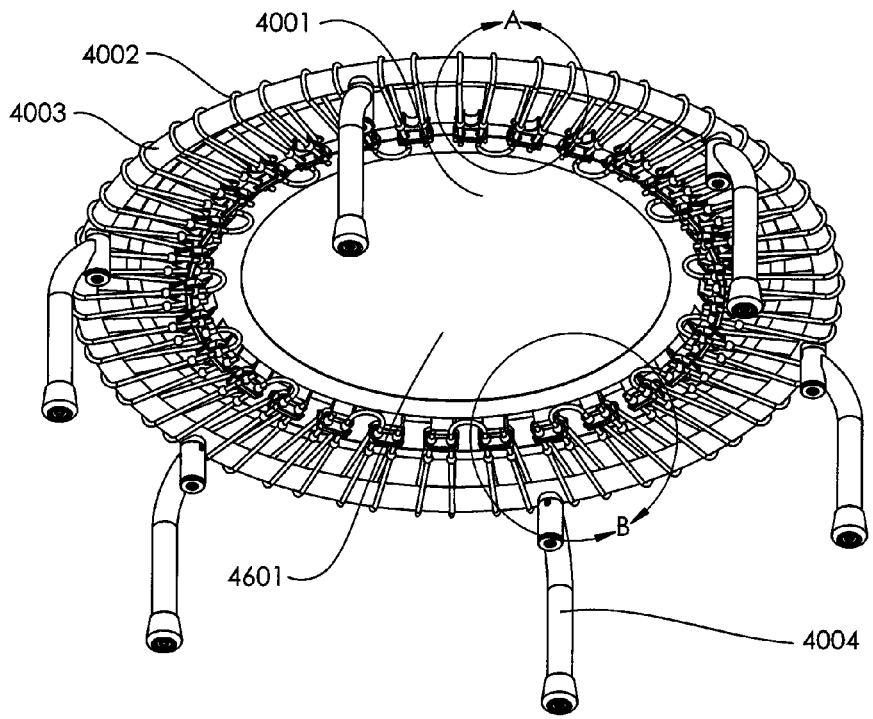

FIG. 46B is a lower view of the rebounder connections diagramed in FIG. 46A where a single elastic cord is attached to two adjacent connectors.

Figure 46C:
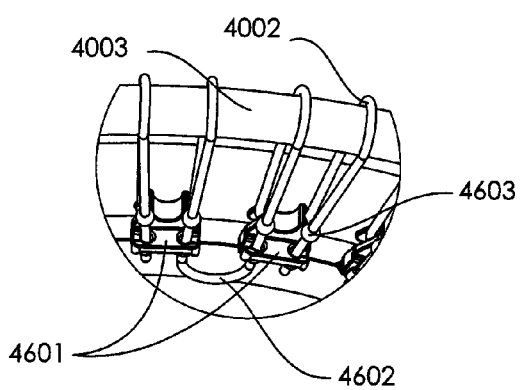

FIG. 46C is a close up lower outside view of attached connected elastic cords.

Figure 46D:
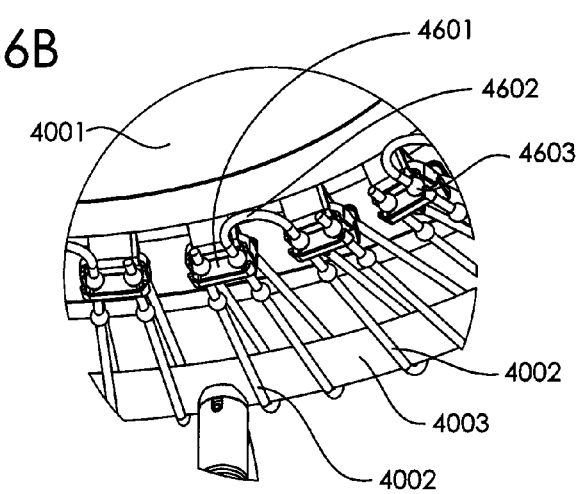

FIG. 46D is a close up lower inside view of attached connected elastic cords.

FIG. 47A is a top section view of a post connector with an overhang that creates an indentation below where an elastic cord may be coupled.

FIG. 47B is an upper isometric view of a post connector.

FIG. 47C is a side view of a post connector.

FIG. 47D is a rear isometric view of a post connector

FIG. 47E is a top view of a post connector.

Figure 48A:
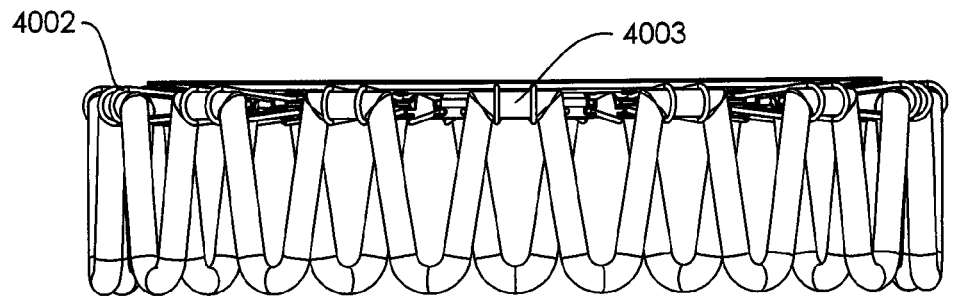

FIG. 48A is a front view of a V frame rebounder.

Figure 48B:
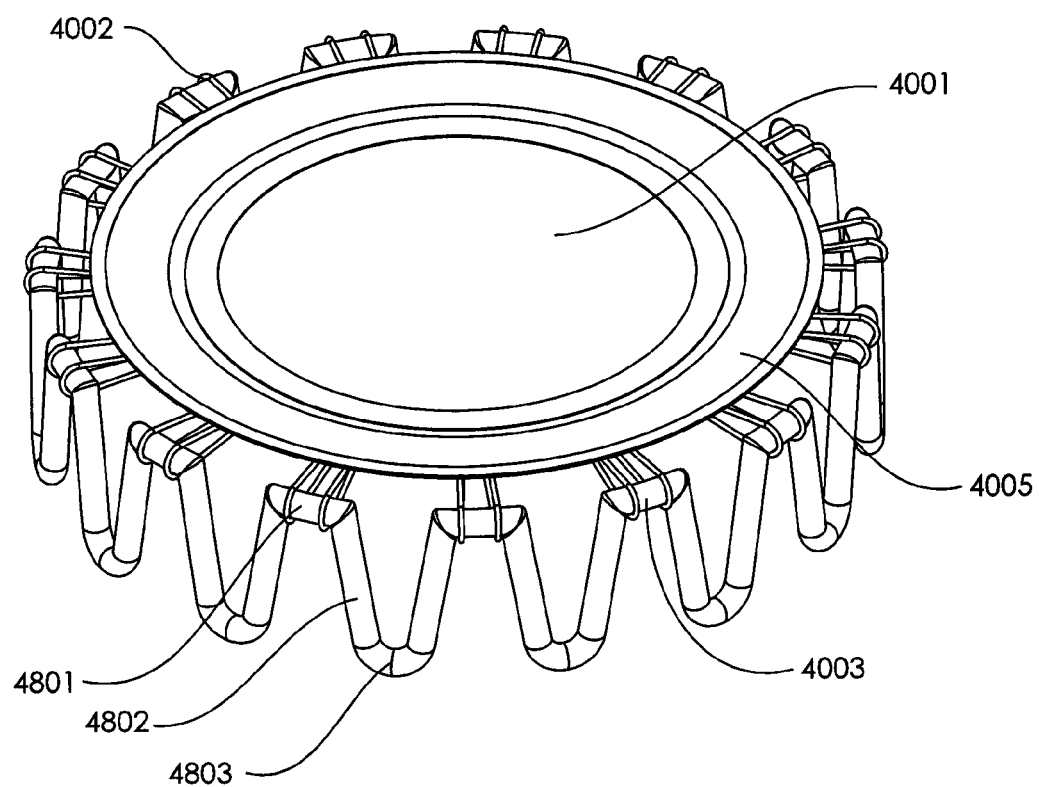

FIG. 48B is an upper isometric view of a V frame rebounder.

Figure 49:
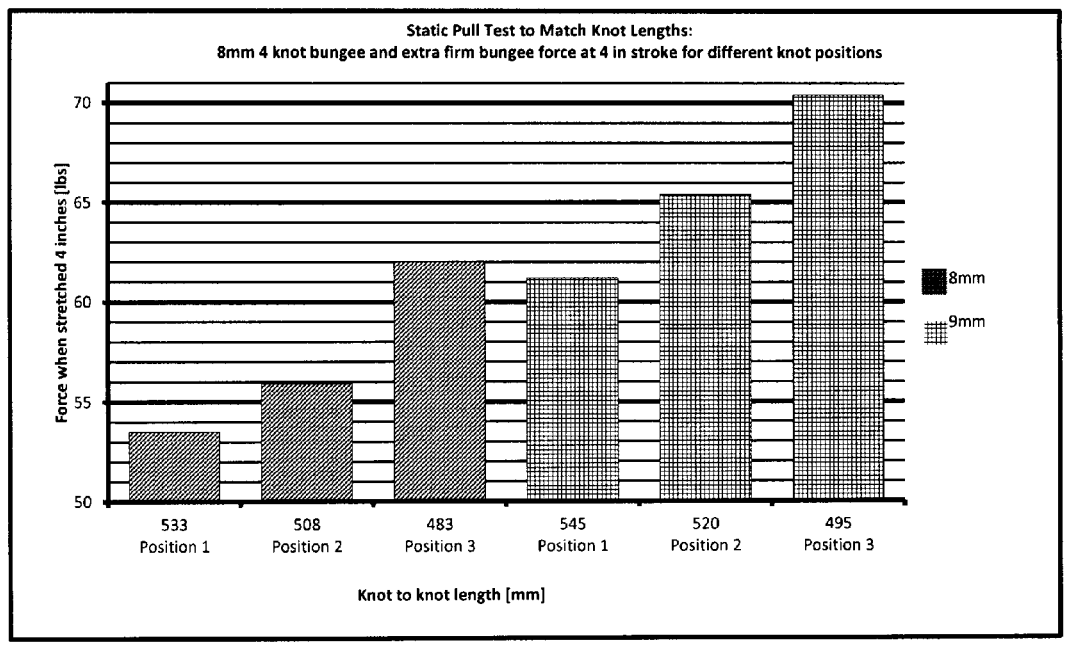

FIG. 49 is chart showing the force against an elastic member for a distance shift of approximately 4 inches versus the knot position of the elastic member.

DETAILED DESCRIPTION

Figure 40:
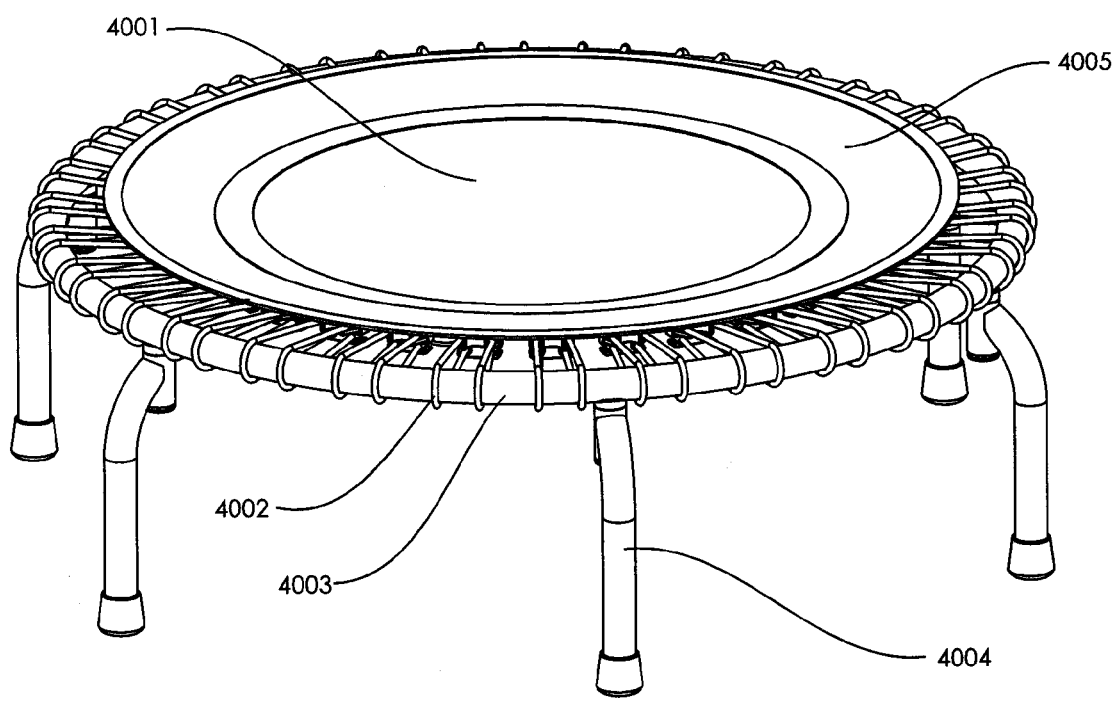

Referring to FIGS. 1 through 45C, there is illustrated therein a new and improved trampoline with adjustable spring members and attachments. In accordance with the present invention trampoline, FIG. 40 shows a general view of the type of rebounder described herein. It has a closed frame 4003, a rebounding mat 4001 with a central portion having connectors and a surrounding outer portion, 4005, to cover the connectors. Generally, such a trampoline shown in FIG. 40 will also have legs 4004 descending downward from the frame 4003 for supporting the trampoline above the ground. The shape of frame 4003 and rebounding mat 4001 are usually roughly the same and can be circular, elliptical, rectangular, hexagonal or other polygonal shapes.

Elastic members are attached to the connectors or clips or couplers (interchangeable terms) to the closed frame and are often covered by a surrounding outer portion 4005 is not attached to or constrained by the closed frame 4003. Prior art trampolines connect some portion of an annular or peripheral member that cover the springs (or a similar tensioning device that support the rebounding mat) to the frame, even when this peripheral member or cover is attached to the rebounding mat.

In the preferred embodiments described more fully below, the elastic members 4002 are soft and deploy rubber or synthetic elastomeric resins and the like. In more preferable embodiments, the elastic members that tension the mat 4001 are cordlike flexible elastic members, such as "Bungee" cords, and similar elastic cords such as those described in U.S. Pat. Nos. 1,050,442 9 (to Friswell, Jan. 14, 1913); 3,130,630 (to Dawes, Oct. 2, 1964); 4,513,063 (to Hashi et al., Apr. 23, 1985) and 5,607,736 (to Williams, Mar. 4, 1997) which are all incorporated herein by reference. Such cord-like elastic members generally compose or more continuous strand or tubes of rubber or an elastomer, covered or otherwise integrated to include one or more layers of woven fabric. Alternatively, the elastic member need not always deploy exterior surrounding fabric sheath as elastic material can be co-woven into a fabric members. In addition, an elastic member 4002 can have a relatively non-elastic cord of cable that is attached to one or more shorter elastic members. The cross-section of the elastic member 4002, while preferably round, can also be oval or rectangular and the like.

In more preferred embodiments, the closed rebounder frame, FIG. 40, is circular, and the outer surrounding portion 4005 of the rebounding mat 4001 has an annular shape and extends above the connectors of the various kinds described herein at the edge of the circular central region. One or more elastic cords 4002 can connect the frame 4003 to the rebounding mat 4001 in various configurations that are compatible with the various embodiments for the outer surrounding portion or peripheral region 4005. Hence, every such combination need not be explicitly described to be appreciated by one of ordinary skill in the art in light of this disclosure. Further, although the invention provides significant benefits to smaller rebounder style trampolines, no intent is made to limit the scope of the claims to any particular style or size trampoline. Although not described in any detail here, a larger trampoline, even greater than 20 feet in diameter could also benefit from adjustable elastic spring members. Such device would be described in more detail in subsequent applications. The focus of the current invention is to utilize this technology for exercise rebounders of the type described herein.

A plurality of elastic cords can each be relatively short, that is only about 2-3 times the gap between the frame 4003 and the point of connection to the rebounding mat 4001 and can be directly connected to the frame 4003, but are more preferably wrapped around it, with the ends of each cord 4002 returning to be connected proximal to the rebounding mat 4001. The connector or coupler that connect the mat 4001 to the frame 4003 via elastic cords 4002 can be simple loops of tough fabric, and may include an intermediate connector or coupler body that is preferably, but not necessary covered by the outer portion 4005 of the rebounding mat 4001, as shown in FIG. 4D. The central 4001 and outer 4005 portions of the rebounding mat 4001 can be integral or stitched together, or attached with other means such as hook and loop fasteners, rivets, button, snaps and the like.

Figure 1A:
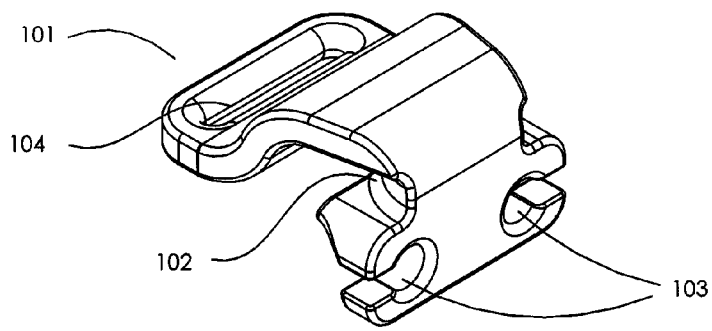
FIG. 1A is an isometric view of a side by side elastic spring member connector.
Figure 1B:
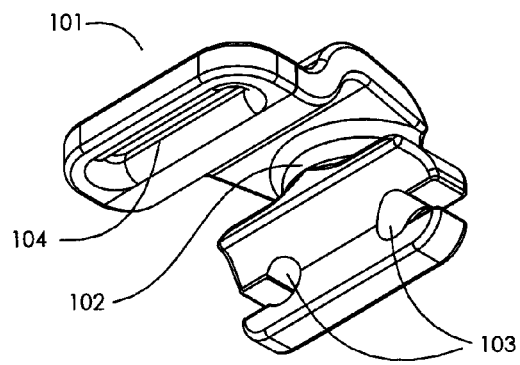
FIG. 1B is a lower isometric view of a side by side elastic spring member connector.
Figure 1C:
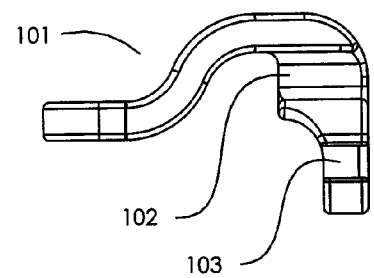
FIG. 1C is a side view of a side by side elastic spring member connector.
Figure 1D:
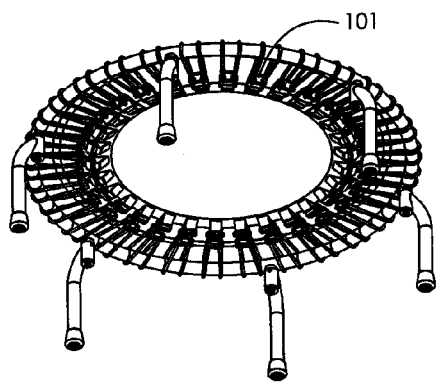
FIG. 1D shows a rebounder with a mat using side by side elastic spring member connectors.
Figure 1E:
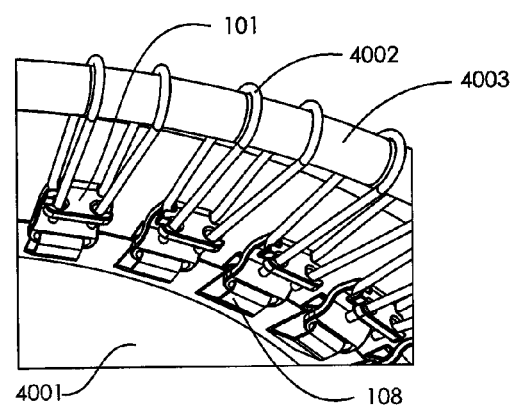
FIG. 1E is a close up isometric view of the rebounder using side by side elastic spring member connectors.

FIGS. 1A-1E describe a connector that contains three separate attachment locations or positions when holding an elastic member or bungee cord. FIG. 1A is an isometric view of a side by side elastic cord or bungee connector, 101. 102 is the curved area for the bungee loop to go around, and 103 are two apertures or sockets for the bungee knots to terminate. 104 is the mat loop slot for the webbing which is sewn to the mat. FIG. 1B is a lower isometric view of a side by side bungee connector. FIG. 1C is a side view of a side by side bungee connector. FIG. 1D shows a rebounder with a mat using side by side bungee connectors, 101. FIG. 1E is a close up isometric view of the rebounder using side by side bungee connectors. 105 is the bungee cord, 106 is the rebounder frame which the bungee wraps around, 107 is the rebounder mat, and 108 is the mat loop which is sewn to the mat. All three attachment positions reside below the connector part that secures the part to the rebounding surface. The utility of this connector is improved because it better protects the horizontally extended cords from footfalls or any other contact from above; thus reducing the chance of dislodgment or wearing beyond that caused by standard usage.

The connector shown in FIGS. 1A-1E is comprised of no less than three connection location points or positions for retaining an elastic cord member that is capable of multiple tension adjustment positions. One attachment position occurs where one segment or length of the cord is directly adjacent and seated such that it fastens or holds along a curve segment of the connector whose angle is always greater than 185 degrees; preferably at or greater than 200 degrees. It has been found that 200 degrees optimally minimizes unwanted cord friction along the curved attachment position. This cord loop attachment position or retaining feature, 102, holds a central segment of the elastic cord at some location between two additional attachment positions. The second and third attachment positions consist of apertures or sockets with openings or apertures that retain the two connectable ends of the elastic cord, 103. The attachable or connectable or coup-able ends of the bungee or elastic cords are of a larger diameter than the apertures or sockets such that they will not slip back through the apertures or openings. The ends may be configured to do this any number of ways; however one preferred method is to knot the cord at its furthest connectable end and at one or more additional locations along the length of the same elastic cord so that multiple tension adjustments may be achieved. The remainder of the same cord encircles the frame rail opposite the connector and then returns to be connected at a third position which is the other furthest connectable portion of the elastic cord. Other ways of ensuring that the ends of the cords are larger than the diameter of the cords themselves may be conceived, some of which are disclosed herein. Knots are a preferred method due to the simplicity and ease of adjustability. Of no less importance is the advantage of knots taking up very little space when compared to other attachments that serve to enlarge the connectable or attachable end of a cord member.

Figure 2A:
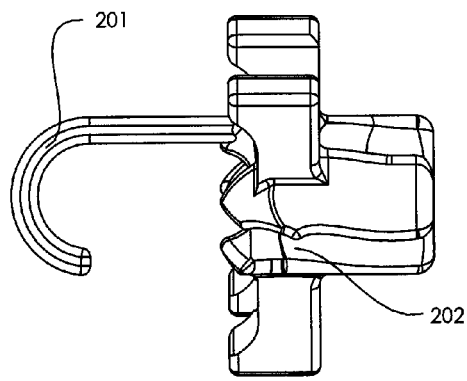
FIG. 2A is a side view of a knotted elastic spring member crossing connector.
Figure 2B:
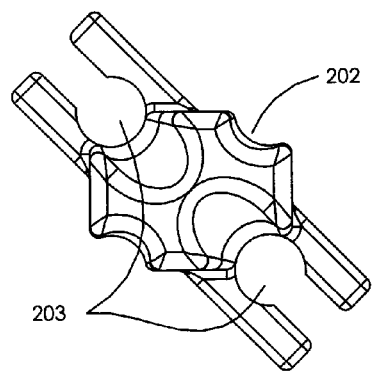
FIG. 2B is a front view of a knotted elastic spring member crossing connector.
Figure 2C:
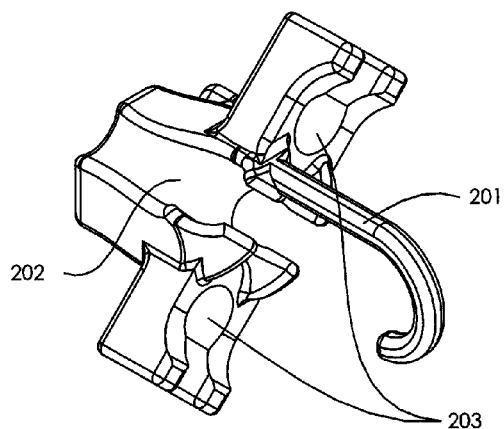
FIG. 2C is a rear isometric view of a knotted elastic spring member crossing connector.
Figure 2D:
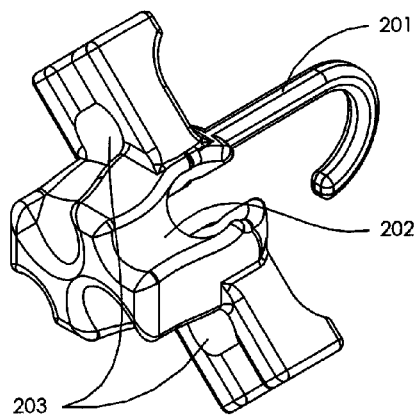
FIG. 2D is a front isometric view of a knotted elastic spring member crossing connector.
Figure 3A:
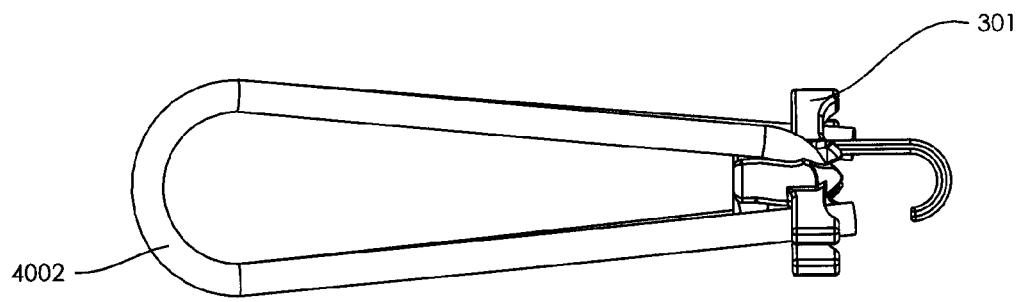
FIG. 3A is a side view of a knotted elastic spring member crossing connector with an elastic spring member installed.
Figure 3B:
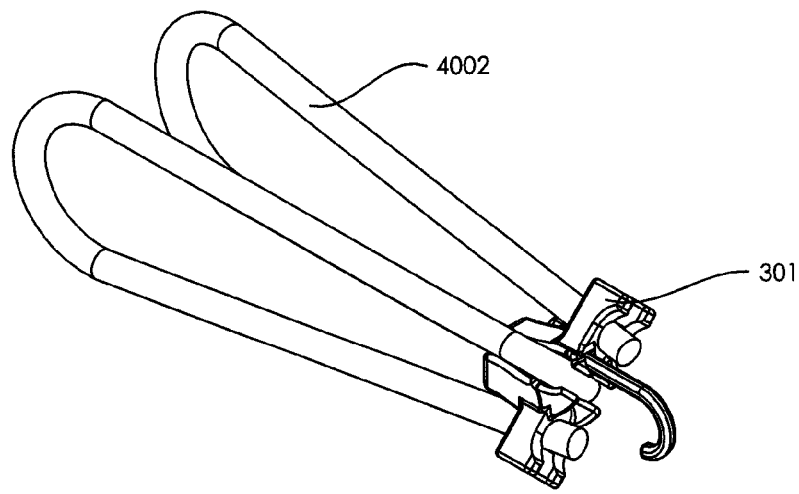
FIG. 3B is an isometric view of a knotted elastic spring member crossing connector with an elastic spring member installed.
Figure 3C:
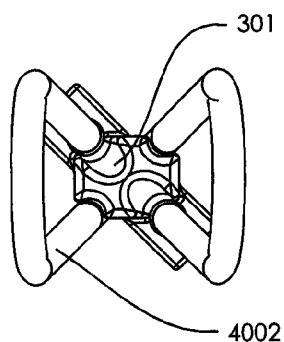
FIG. 3C is a front view of a knotted elastic spring member crossing connector with an elastic spring member installed.
Figure 3D:
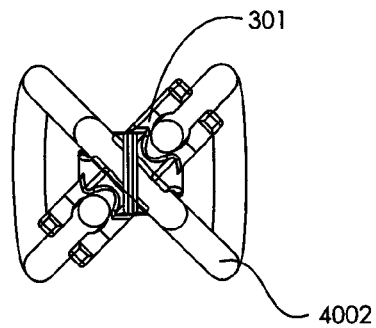
FIG. 3D is a rear view of a knotted elastic spring member crossing connector with an elastic spring member installed.

FIGS. 2A-3D show a very unique connector design that permits the elastic cords or bungees' first attachment position to cross over between the other two terminus attachment positions (or coupling locations), 203, that secure the two ends of the bungee cord dedicated to that connector, FIG. 3D, 301. This cord loop retaining feature holds a central segment of the elastic cord, 4002. The cross-over portion of the bungee cord, 4002, is one segment or portion of the cord at a location between the opposing ends. This central segment fastens along a curve of the connector at an angle greater than 180 degrees. The preferred embodiments have an angle at or greater than 200 degrees as it has been found to reduce friction against the cord. As a result of this greater angle, the friction against the cord segment is significantly reduced than would occur with an angle at or below 185 degrees.

FIG. 2A is a side view of a knotted bungee crossing connector. 201 is the jump surface/mat hook and 202 is the bungee loop groove. FIG. 2B is a front view of a knotted bungee crossing connector. 202 is the bungee loop groove, and 203 are the two apertures or sockets for the bungee knot termination. FIG. 2C is a rear isometric view of a knotted bungee crossing connector. This connector is a modified version of the continuous bungee crossing connector that replaces one of the bungee grooves with two bungee termination positions, 203. FIG. 2D is a front isometric view of a knotted bungee crossing connector.

FIG. 3A is a side view of a knotted bungee crossing connector, 301, with a bungee, 4002, installed. FIG. 3B is an isometric view of a knotted bungee crossing connector, 301, with a bungee, 4002, installed. This shows how the two knotted ends are attached to the bungee termination positions and the middle of the bungee loops around the connector. FIG. 3C is a front view of a knotted bungee crossing connector, 301, with a bungee, 4002, installed. FIG. 3D is a rear view of a knotted bungee crossing connector, 301, with a bungee, 4002, installed. The drawing shows an open hook for coupling the connector to the jump mat. However, other connections that are not shown, may be used, such as a locking mechanism similar to a carabineer as one example, where the cord may be inserted and removed, but cannot be dislodged when the locking mechanism is closed.

In FIG. 4A-4D the connector or coupler 4D comprises a disk that has sculpted annular concave depression around the periphery to support the elastic cord 4002 of the same or smaller cross-section and shape. The connector disk 406 also has a transverse slot 408 that extends to bisect the disk 408 through an upper or lower half thereof. On the opposite side of the transverse slot 408 the disk 408 may include holes that extend from the top to the bottom thereof 409 and 409' for receiving fastener for connecting to the rebounding mat. It should be appreciated from FIG. 4B, that a single elastic cord 4002 is used to connect the rebounding mat 401 via three such connectors 408 by wrapping around the central of the three, 408, with the end on opposite side of coupler 408 extending outward to wrap around the frame 4003, before returning to be secured by the surrounding connectors 120 and 408. The ends 404 of elastic cords 4002 have knots or bulbous protrusions that are grasped by the edge of connector 408 and 408 when the cord portion just before the knots is placed in the transverse slot 408. The connectable or attachable ends 404 of elastic cords 4002 are grasped by the edge of connector 408 and 408 when the cord portion just before the knots is placed in the transverse slot 408.

It should be noted that the term bulbous protrusion refers to that portion along the elastic cord which has a diameter that is greater than the diameter of the elastic cord member along its length. It may constitute a knot in the cord itself or, it may represent a molded, cast, or extruded member attached to the cord at one or more locations along the length of the cord member. The material of the molded member may be made of plastic, metal, or other composite which serves the same purpose. It may be of any number of polygonal or polyhedral shapes.

FIGS. 5A-14E illustrate alternative embodiments in which a single connector 501 is simultaneously wrapped along a 180 to 200 degree curvilinear surface at one position by the elastic cord 4002; and extends between the two most distant locations where the tensioned portion of the cord is connectable. The two additional connectable tensioned ends are positioned at each opposing connectable end of the cord, 607 as examples of the attachable ends being described. An attachable tensioned end is that portion of the elastic member that begins the tensioned portion of the cord, see 4A, 409. It is possible to have excess cord extending beyond the attachable end that is not under tension. At least one of the connectors couples a cordlike elastic member in a manner such that the tension of the tensioned portion of the member can be adjusted by moving a portion of the body of the member relative to the connector.

Figure 5A:
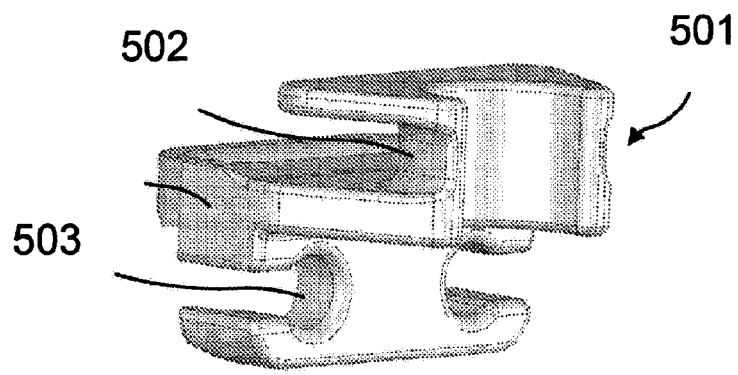
FIG. 5A is a perspective view from the front corner of an alternative connector.
Figure 5B:
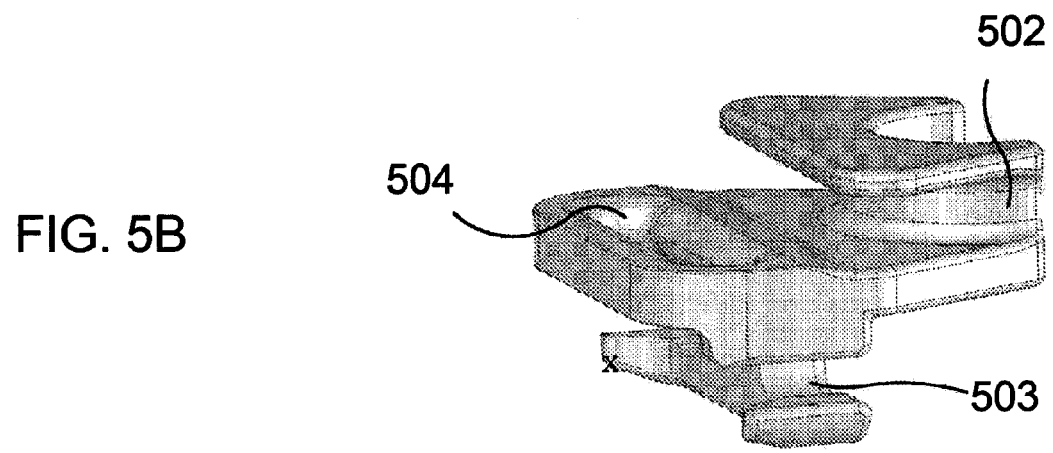
FIG. 5B is a perspective view from the back corner of the connector of FIG. 5A.
Figure 5C:
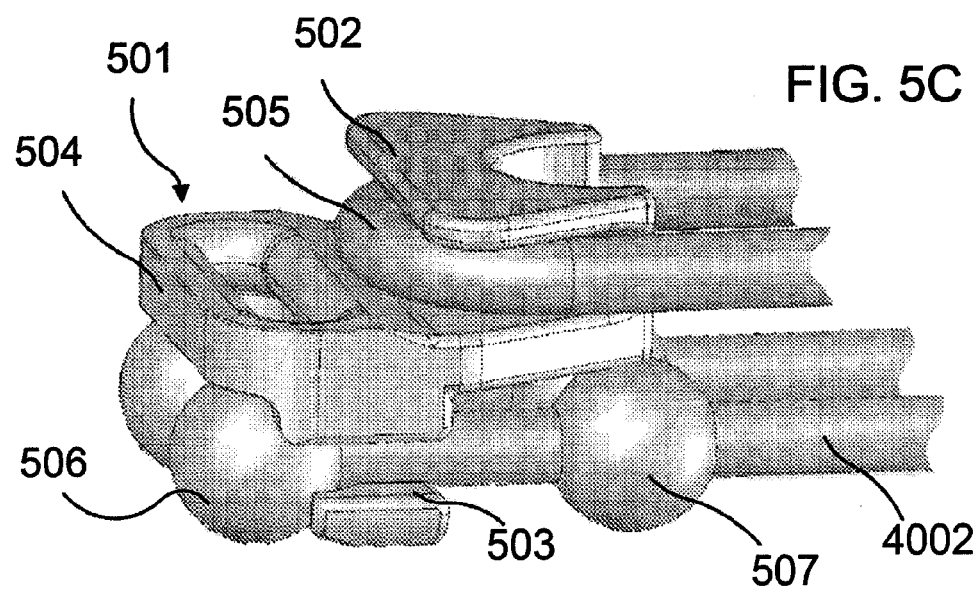
FIG. 5C is a perspective view from the side of the connector of FIGS. 5A-5B including an attached elastic cord.

One such alternative embodiment to the bungee connector or connector is seen in FIG. 5. The coupler or bungee connector 501 has a middle attachment position, which is a loop retaining feature or indentation that is a curvilinear surface 502 for supporting a segment of the elastic cord 4002, nominally a bungee cord or other elastic cord-like member, near mid distance between a second and third attachment positions each comprising a aperture or socket 503 with side openings for retaining and extracting the two attachable or connectable ends of the bungee or elastic member. A webbing attachment feature 504 is a handle or flat slot is for securing flat webbing that is preferably deployed as the connector. In FIG. 5C connector/bungee clip 501 is shown as installed with a central portion of the bungee between the ends formed into a loop 505 that is seated in the loop retaining feature 502. The indentation or loop retaining feature comprises a curvilinear surface 502 and is preferably a smooth sculpted annular concave indentation along a portion of the curvilinear surface with an angle greater than 180 degrees, and more optimally 200 degrees. As indicated previously, it has been found that an approximate 200 degree angle minimizes cord friction with the connector at the middle curvilinear surface; middle simply meaning that portion of the elongated cord member that is between the furthest attachable portion of the cord ends Also shown is bungee 4002 with an attachable end which is a enlarged terminator 506, which is optionally either a knot or the bulbous protrusion, and is secured to a fixed location on the elastic cord member 4002 as shown. Optionally, a second bulbous protrusion 507 secured to the bungee or elastic member 4002 inward of the first terminator 506 may also be used to attach the bungee 4002 to the connector 501, providing a second adjustment position to the length of the active bungee section. Engaging this additional adjustment position serves to shorten the tensioned or active portion of the elastic cord/bungee. The result is a stiffer, less soft elasticity for the jumper. This adjustment position may be engaged for a more athletic user who jumps with more vigor, force and speed; or, it may be engaged because the user is heavier in weight, regardless of his or hers athleticism.

As the elastic cord or bungee tension decreases over time due to use, it may be incrementally adjusted to maintain the tension within the desired range, greatly extending the useful life of the elastic cords and avoiding the time and expense to replace these components. A further benefit is that the tension of the bungee 4002 may be adjusted to the weight and jumping preference of the user. This capability is explained further in these specifications.

Figure 6A:
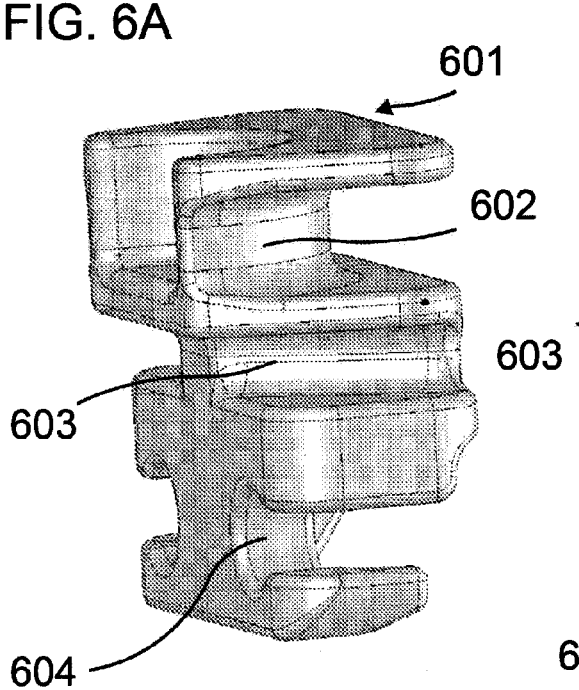
FIG. 6A is a perspective view from the back corner of another alternative connector.
Figure 6B:
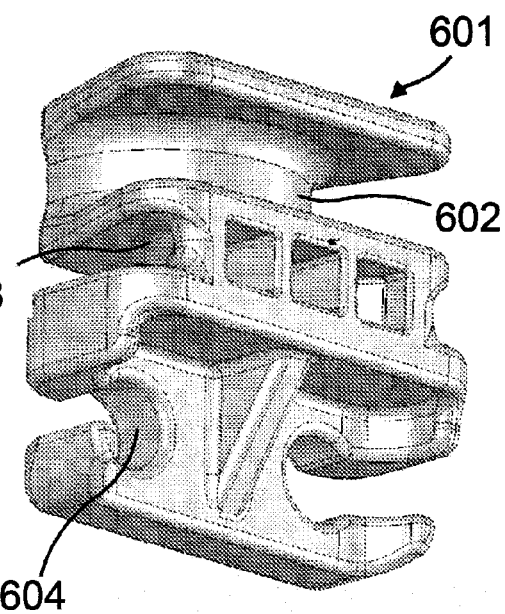
FIG. 6B is a perspective view from the front corner of the connector of FIG. 6A.
Figure 6C:
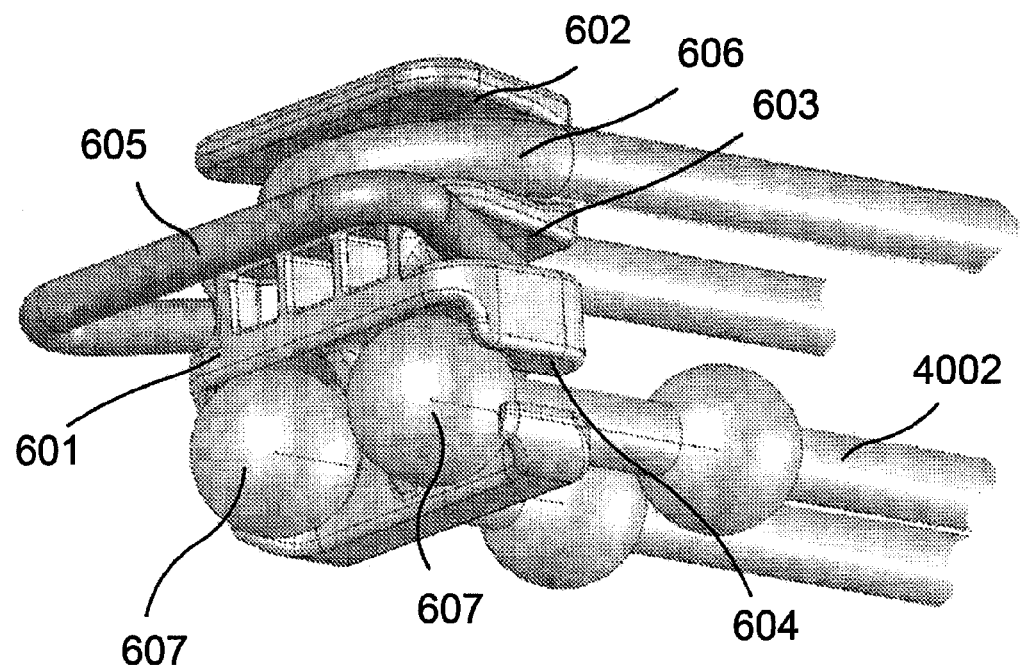
FIG. 6C is another perspective view of the connector of FIG. 6A that also illustrates a tensioned elastic cord and metal V ring installed.

FIGS. 6A-C shows a bungee connector or coupler 601 capable of being attached to the triangular or V-ring 605 of a typical trampoline, to allow for the use of bungee 4002 instead of the typical metal spring. In this embodiment, the V-ring 605 and any webbing holding it to the periphery of the central portion 4001 of the rebounding mat would be considered a connector. The elastic cord connector or coupler 601 includes a curvilinear cord retaining feature 602, a V-ring retaining slot of having V-shaped indentation 603 to receive two sides of the ring 605, as well as the elastic cord terminator 607 comprising a bulbous knot or other object that secures the tensioned portion of the cord, see 4A, 409 showing the tensioned portion of a cord. FIG. 6C shows the elastic cord/bungee connector 601 with the central looped portion of bungee or elastic cord 606 seated against a curvilinear surface retaining indentation 602. Also shown is bungee 4002 with bungee end 607 inserted into retaining feature or aperture 604. V-ring 605 is shown in V-ring retaining feature 603. In a typical installation, the V-ring 605 is sewn into a loop of webbing attached to the trampoline mat, such as 4001 in FIG. 40.

Figure 7A:
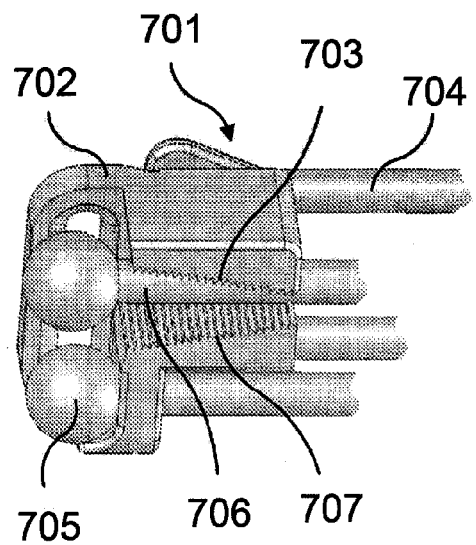
FIGS. 7A-D are perspective views of other alternative connectors.

FIGS. 7A-7D illustrate additional embodiments of a coupler or connector 701 similar to that shown in FIGS. 5A-6C, and which provide the user with the ability to adjust the active length of the bungee or similar cord-like elastic members 4002. FIG. 7A illustrates a connector 701 which has surfaces 703 and 707 which form a serrated V, which forcibly secures the connected end 705 of the bungee or cord at the desired length. It's method of operation is similar to that of a cleat as used in a sailboat. In such an embodiment, the cord-like elastic member may be grasped at two or more alternative positions at either or both opposing ends by a corresponding chevron shaped appendage attached to or surrounding the member 4002, which the chevron (s) pointing to the center of the cord.

Figure 7B:
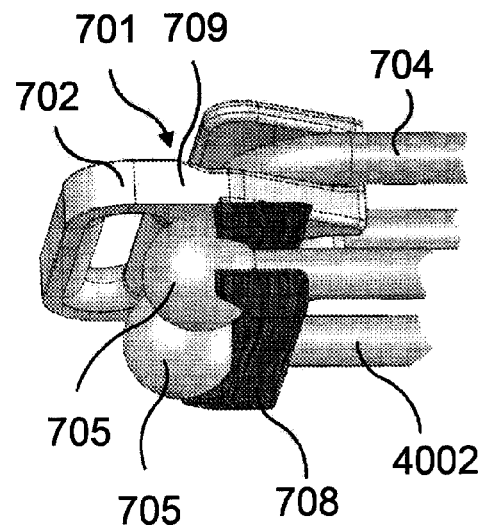
Figure 7C:
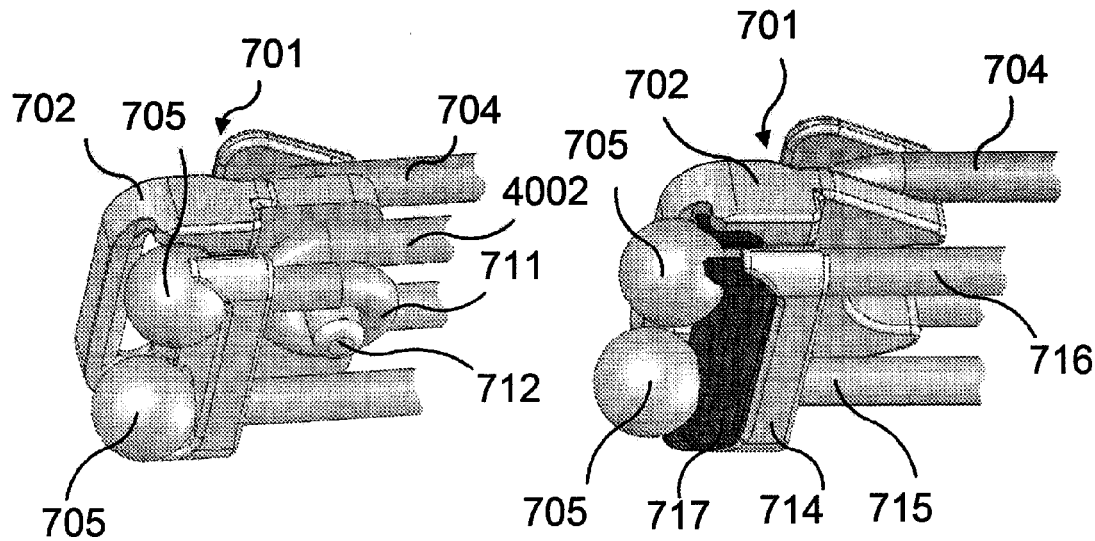
Figure 7D:
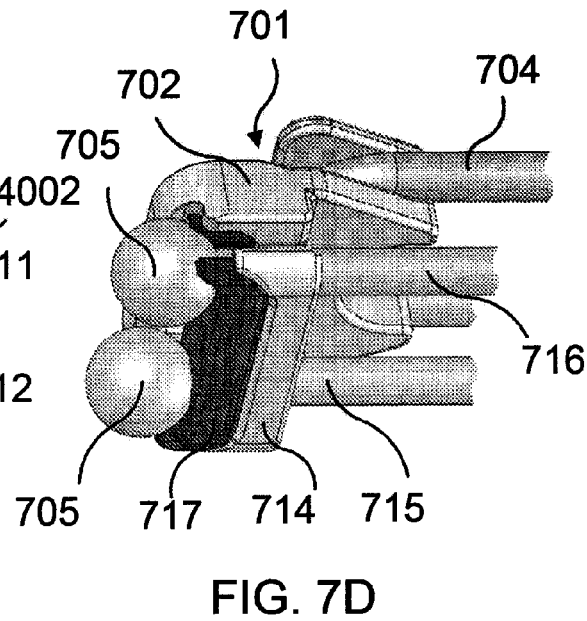

FIG. 7B shows a clip 701 having lower body 708 which may be adjusted relative to upper body 709 so as to vary the position of the two cord coupling ends 705 of bungee or cord 4002, and thereby adjust the tension of the bungee or cord. At least one of the connectors couples a cordlike elastic member or bungee in a manner such that the tension of the tensioned portion, see 4A, 409, of the member can be adjusted by moving a portion of the body of the member relative to the connector. The method of adjustment may utilize a ratcheting mechanism, a rail, or a track which provides for the movement of lower body 708 relative to upper body 709 and may be locked in the desired position. An alternative embodiment of a connector 701 allowing for the adjustment of bungee or elastic member tension is shown in FIG. 7C. As shown, connector assembly 701 allows additional bungee tension to be added by wrapping a portion of the bungee 4002 in a loop 711 about post 712. The post 712 descends from the portion of the clip 701 that forms the loop retaining feature. In the last of these embodiments shown in FIG. 7D, the connector 701 includes a nesting spacer 717 that engages into apertures, extending the ends thereof such that the location of bungee terminators 705 are moved distal from the end of the apertures that they would normally engage. The effect of inserting this nesting spacer 717 is to increase the stretched length of the bungee and thus increase bungee tension. In the embodiment of FIG. 7A deploying a cleat, the nesting spacer may be a chevron shaped cleat that is inset into the first cleat, 707.

Figure 8C:
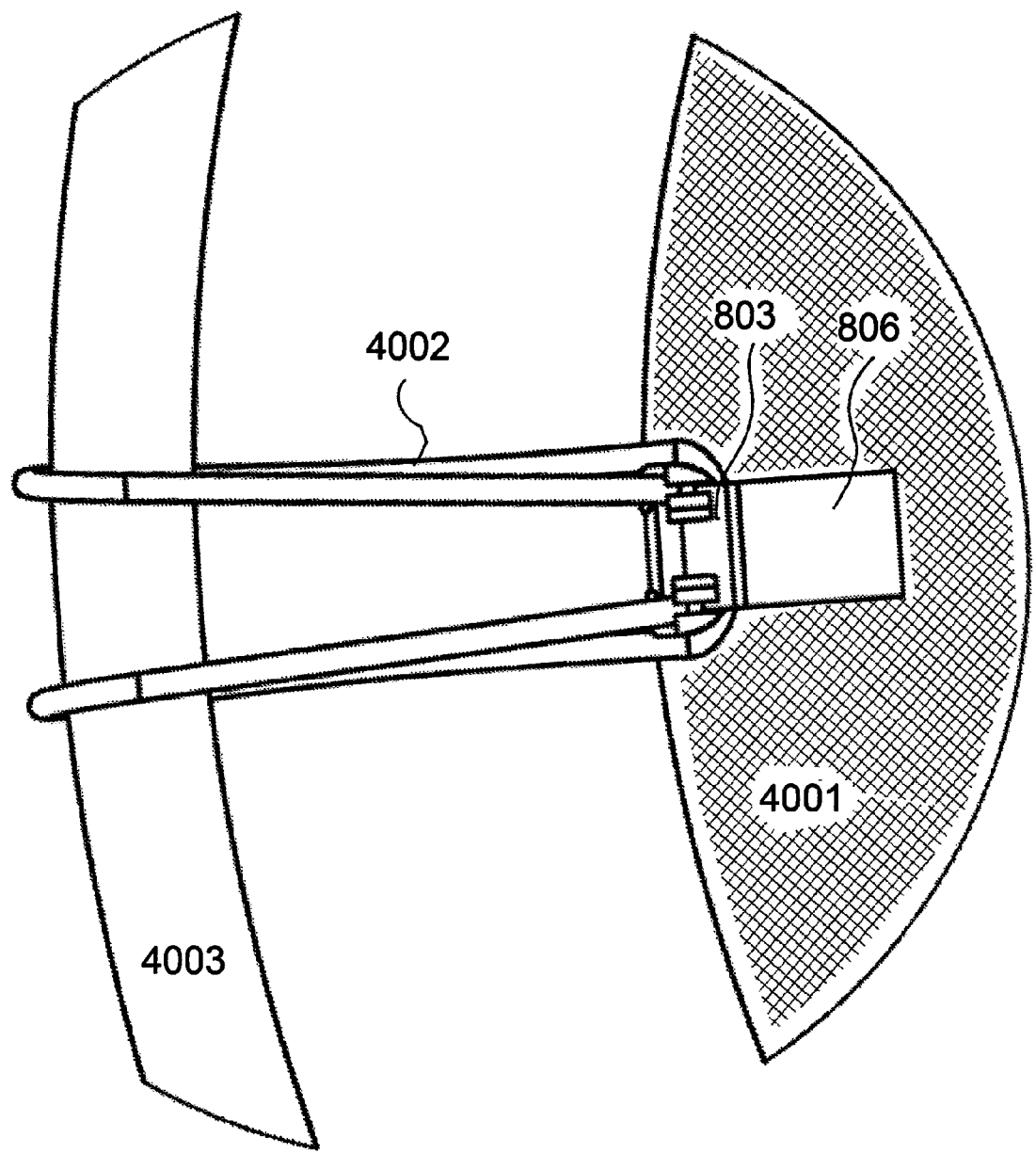
FIG. 8C is a plan view of the underside of the trampoline of FIGS. 8A-8B.

FIGS. 8A to 11B illustrate another embodiment of a connector or coupler 803 and its means for attachment beneath and to the perimeter of the trampoline rebounding mat by an additional portion attached beneath the surface of the jump mat, 806. As shown in FIG. 8A, connector 803 is attached to below the periphery of the mat's outer portion 801, via a tab or flap loop of strap, 806 that is stitched to this outer periphery; which may also be made of rigid or semi-rigid material As illustrated in more detail in FIG. 9B, the connector 801 has one coupling location that is a rounded or curvilinear surface or channel 903 on the front surface of the upper portion 902 to receive that portion of the elastic cord 4002 that is between the most distant connection of the cord ends. The second and third coupling locations 906 receive the connectable or attachable ends of the elastic cord member. Openings 911 allow for the cords to be inserted and removed for adjustment of the cord.

Figure 10A:
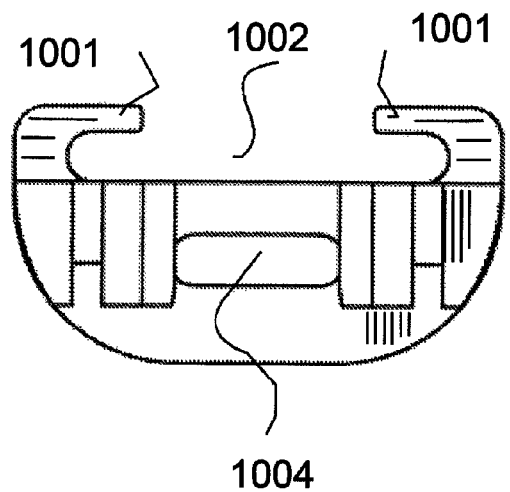
FIGS. 10A-10C are top plan, front elevation and side elevation views respectively of the connector of FIGS. 9A-9B.
Figure 10B:
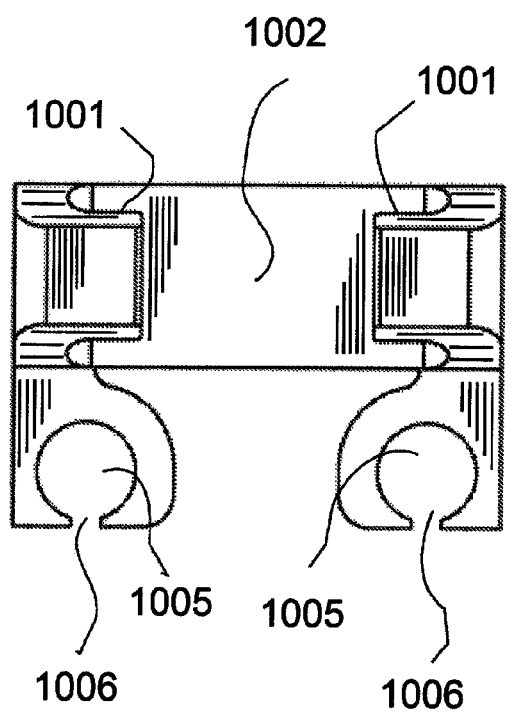
Figure 10C:
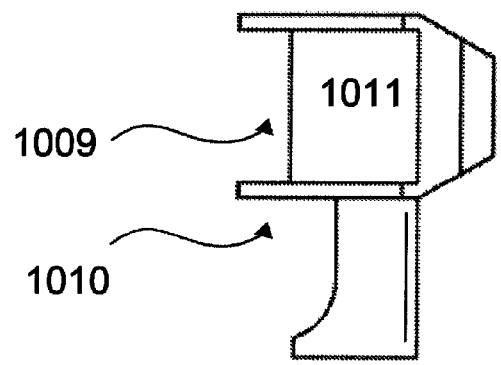
Figure 11A:
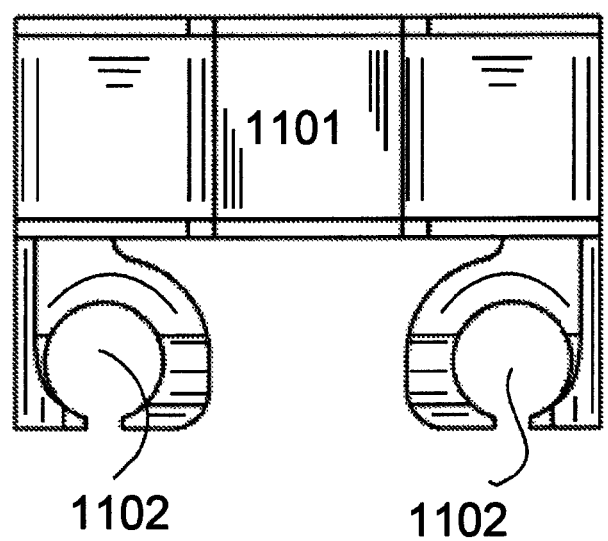
FIG. 11A is a rear elevation view of the connector of FIGS. 9-10.
Figure 11B:
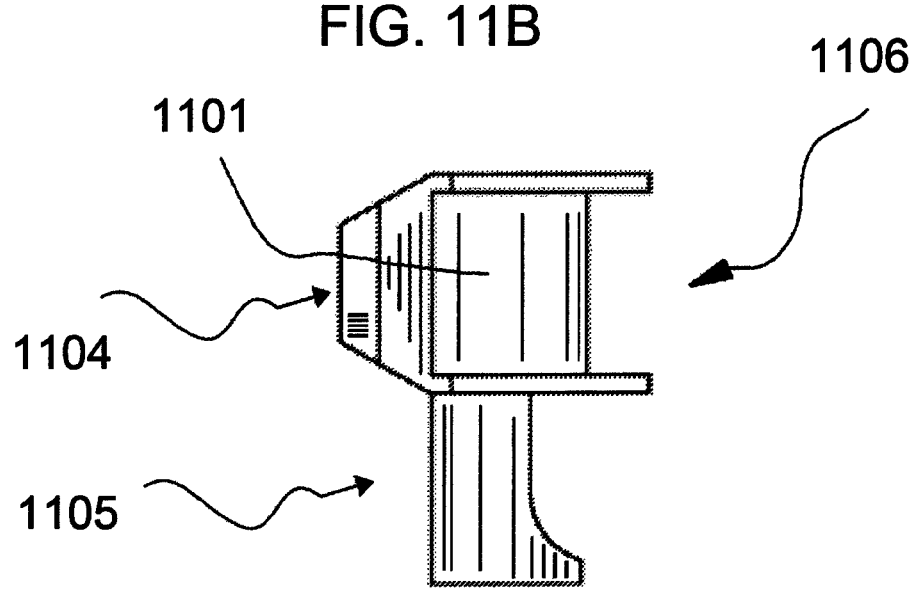
FIG. 11B is a side elevation view of the connector of FIGS. 9-10.
Figure 13:
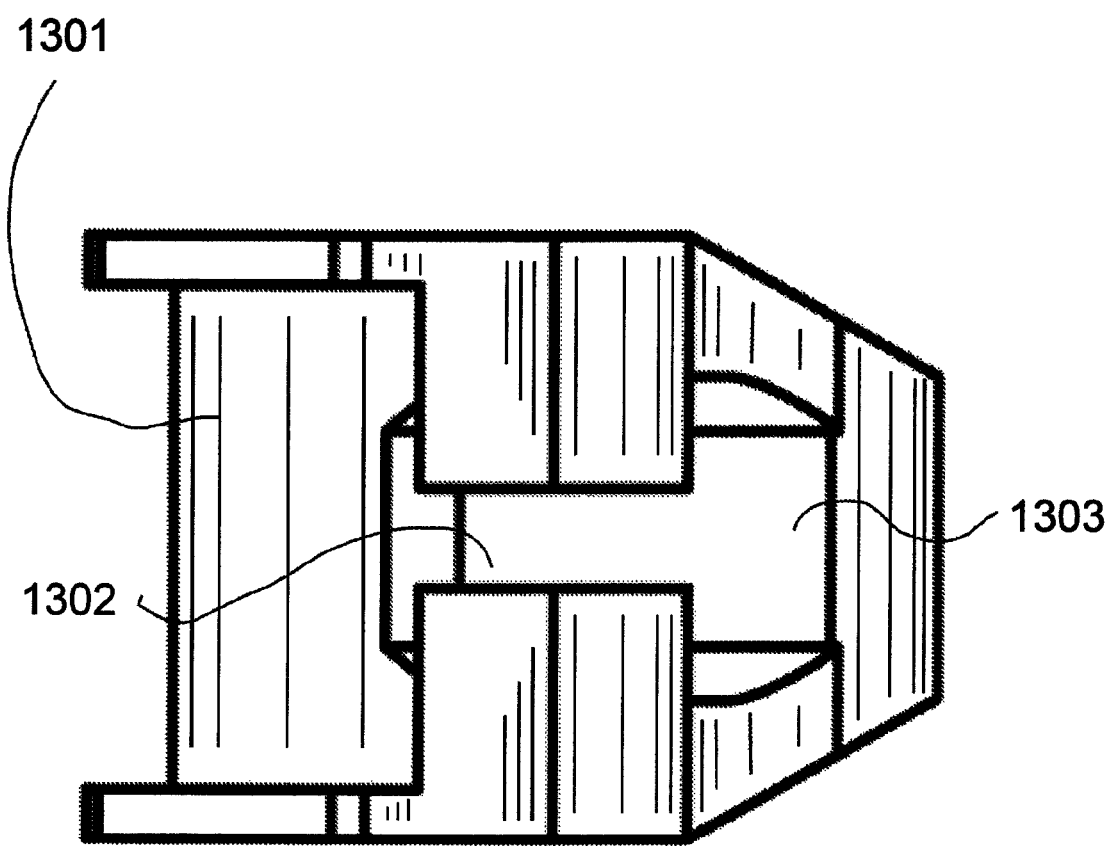
FIG. 13 is a side elevation of the connector of FIGS. 12A-12B.

In FIG. 10A-C, shows the lower part 1010 of the same connector receives the opposing ends of the elastic cord that are at opposite sides of this central portion. The ends of the elastic cords 804 are held in the spaced apart apertures 1005 formed in the lower portion of the connector 1010. The elastic cord 4002 may be inserted or removed from each aperture 1005 from the respective side openings, 1006, also formed in the lower portion 1010. On the opposite and back side of the upper part 1009 is a grasping member or opening having opposing arms 1001 that form a partially open slot 1002 to resealably secure an attachment point to the jump surface. The hole 1004 that extends vertical between the upper and lower portion 1009 and 1010 is preferred when the connector is made of injection molded plastic to provide even shrinkage of material in the solidification process after molding to consistently provide the same exterior dimension of the connector as the mold shape. FIGS. 11A and 11B shows the reverse view of 10B and 10C.

FIGS. 12A to 14E illustrate a different embodiment of a connector having means for attachment to the perimeter of the trampoline rebounding mat. Disposed in the horizontal center of the front side of connector, shown in FIG. 12A, a first coupling location, which is the rounded or curvilinear surface or channel 1212 that receives the central portion of the looped elastic cord 4002. However, in this embodiment of connector the two additional attachment ends of the elastic cords are held in the spaced apart apertures 1204 on the same horizontal plane or portion of the connector as the rounded channel 1212 being separated from the rounded channel 1212 by inner apertures 1205. The outer apertures are the two additional coupling points or locations that receive the two most distant portions of the elastic member or bungee, see FIG. 14E, 1410. The inner apertures 1205 receive the portions of the elastic cord 4002 that are supported along the curvilinear surface or channel 1212. The inner and outer apertures are shown as optionally connected by an open channel. On the back side of connector or connector is a grasping member 1201 having opposing arms 1206 and 1208 that form a partially open slot 1207 to provide a location to releasably secure the jump surface to the connector.

In FIGS. 14A-14D the two most separated attachable portions of the elastic cords 1410, which constitute the second and third coupling points for the elastic cord, are held in the spaced apart apertures or sockets 1402 formed in the end of the connector most distal from the opposing arms 1404, which are disposed farthest from the horizontal center of the connector. The elastic cord 4002 may be inserted or removed from each aperture 1402 from their respective side openings 1401 which are in formed narrow vertical sides of the connector itself.

Figure 14E:
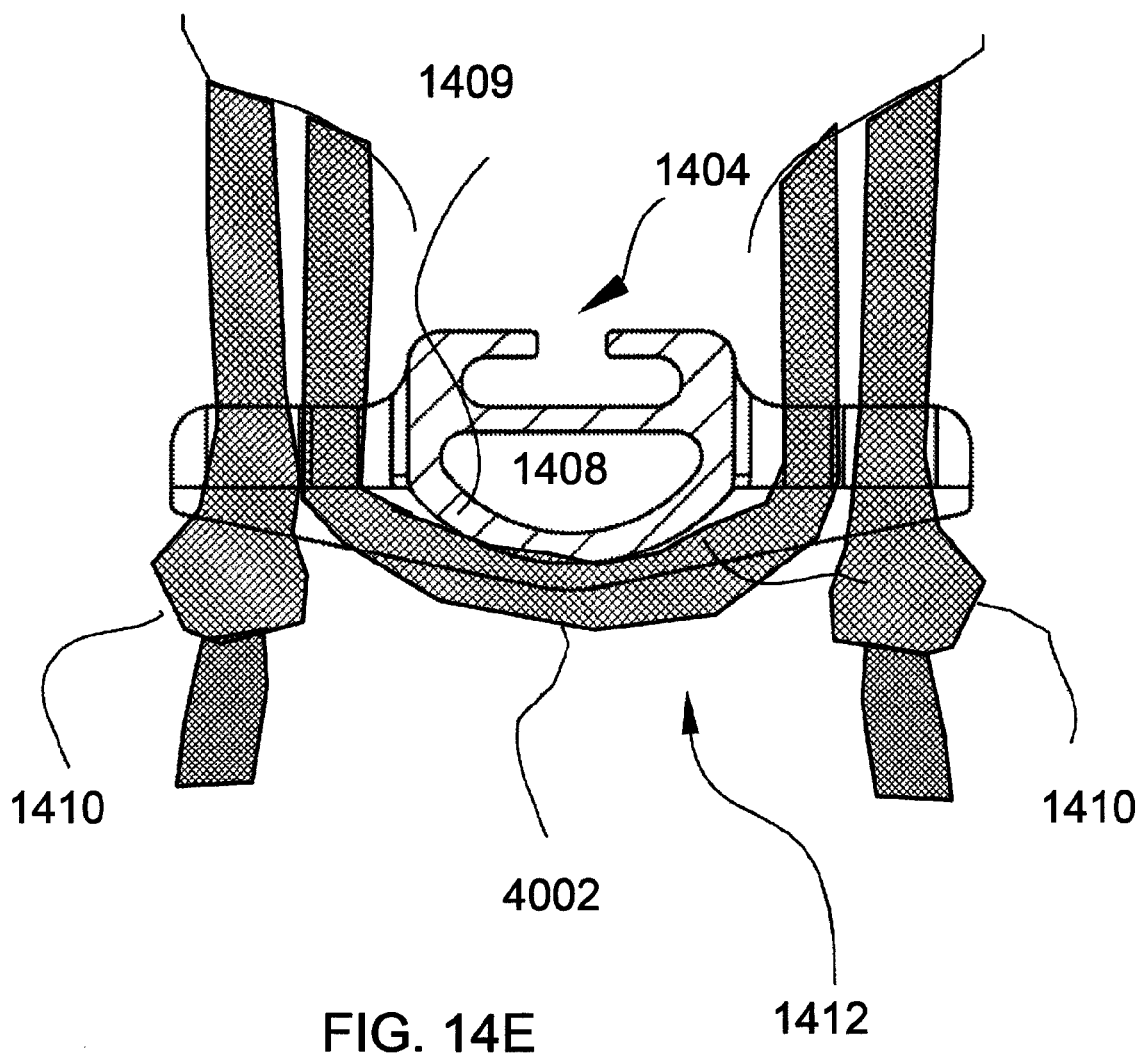
FIG. 14E is a cross-sectional view of a portion of the trampoline apparatus at section line A-A in FIG. 14C showing the location of the elastic cord when the connector of FIGS. 11A-14E is deployed.

FIG. 14E is a cross-sectional plan view with the elastic cord 4002 installed, showing the connected path of the elastic cord 4002, including ends 1410 as retained by edges around apertures 1402 respectively. When the connector is formed by injection molding plastic it preferably includes the hole 1408 that extends vertically though the center of connector as it ensures even shrinkage of material in the solidification process after molding to achieve exterior dimension of the connector that are consistent with respect to the mold shape.

It should be appreciated that although the application describes a variety of couplers or connectors for use with single wrapped elastic cords, such diverse coupler or connector types can be used together on the periphery of the rebounding mat. The attachable ends of the cords 1410 need not terminate at the frame, but can also terminate in any of the end attachment point of the connectors, which provide for grasping the elastic cord at two alternative positions to vary the tension thereon. Further, a serpentine wrapping configuration may use a plurality of elastic cords to traverse the entire perimeter of the trampoline frame 4003 and rebounding mat's 4001 perimeter.

FIG. 15A-17F illustrate another embodiment of the invention that deploys a plurality of elastic cords 4002 that connect the frame 4003 to the ends, perimeter or central portion of the rebounding mat 4001 using two different type of connectors, specifically a first connector (shown in FIGS. 16A-D) and a second connector (shown in FIGS. 17A-F). The two different connectors FIGS. 16 and 17, alternate in placement around the periphery where they connect to the rebounding mat 4001. Connectors can optionally both deploy the slot 1706 to securely receive flat webbing that is preferably deployed as the connector for connection to the rebounding mat 4001. Preferably, each of connector and are attached to below the periphery of the mat's outer portion, via a tab or flap loop of strap, see FIG. 15D, 1506, that is stitched to this outer periphery before petals that form an outer skirt.

Figure 15A:
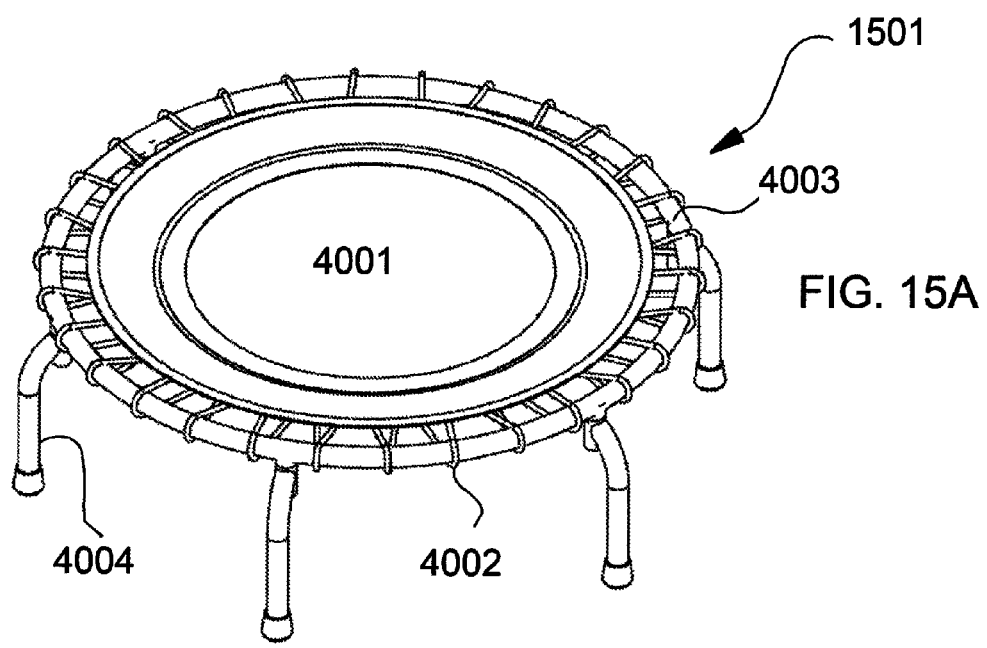
FIG. 15A is a perspective view of a rebounder having tensioned elastic cords.
Figure 15B:
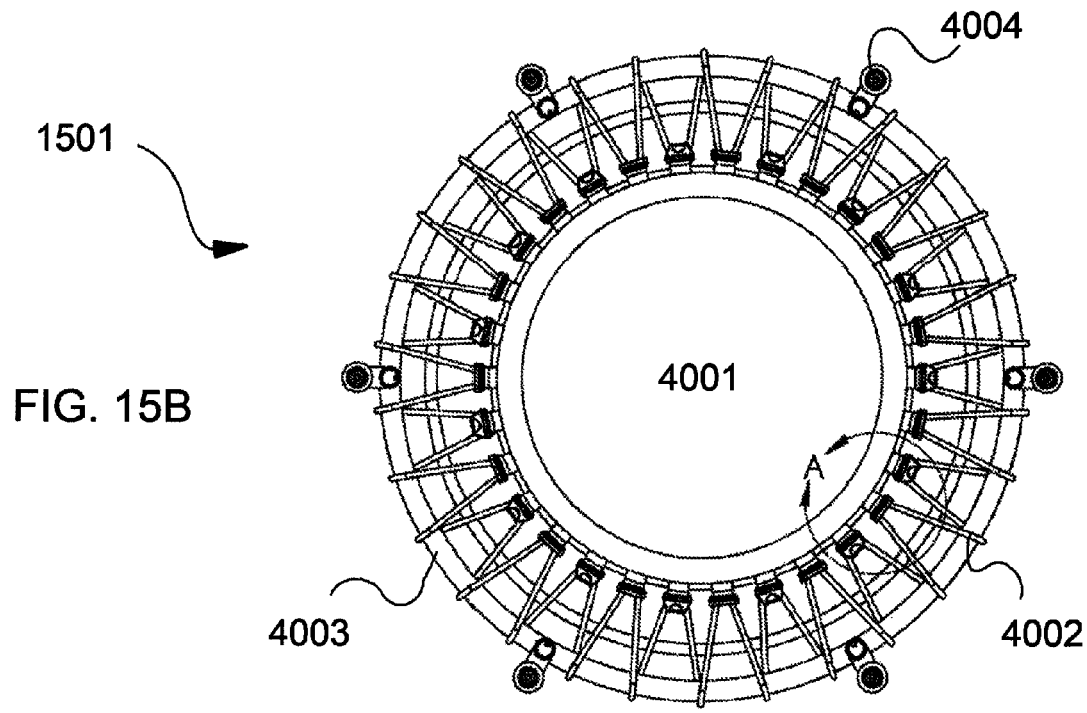
FIG. 15B is an underside plan view of the rebounder of FIG. 15A.

As illustrated in more detail in FIG. 16, the connector has a rounded curvilinear surface or channel 1603 on the back surface to receive the central portion of the elastic cord member 4002. Each cord 4002 is connected to the trampoline mat at two additional coupling points that represent the furthest or most distant attachment ends FIG. 17, 1703, by adjacent first connectors, with a central portion there between again connected to the mat 4001 via the intervening second connector. Again it should be noted that the "attachable end" is that part that retains the tensioned portion of the bungee or cord member. Additional cord may be present but not under tension. It is the terminus of the tensioned portion of the cord that matters and not the un-tensioned portion see 4A, 409. The portion of the tensioned elastic cord 4002 between adjacent connectors is wrapped around the frame 4003, before returning to be secured by the surrounding connectors. The ends FIG. 15D at 1508 and 1504, of elastic cords 4002 have at least one but preferably plural adjacent knots or bulbous protrusions that are grasped by the edge of connector and when the cord portion just before the knots is placed in the transverse slot FIG. 17D, 1702. Thus, connector receives the opposing ends of the elastic cord that are at opposite sides of this central portion. The ends of the elastic cords, see FIG. 15, 1502 and 1504, are held in the spaced apart apertures 1703 formed the edge portions of the connector. The elastic cord 4002 may be inserted or removed from each aperture 1703 from the respective side openings 1702.

It should be appreciated that the connectors disclosed herein while suitable for low cost manufacture by injection molding plastic, can be made by other processes, as well as be formed of wire to provide the same or equivalent function described herein. Further the elastic cords 4002 can terminate in other mating features for connection to the connectors, such as hooks, clips, latches and the like, as well as the knots and bulbous protrusions disclosed in the preferred modes above.

In another aspect of the invention describing three position adjustable cord connectors, it has been discovered that the service life and utility of fabric containing cord-like elastic members can be greatly extended by a process of re-tensioning, provided they are not initially strained to what has been discovered to be an excessive level. When used for trampolines, further extending the cords has not been utilized for several reasons. The most important reason has been that such extension was feared to overly weaken the cord segment. In response to this concern, all known trampolines have used cords designed to be replaceable but not adjustable. In these designs, tension is adjusted by replacing an existing cord with a heavier or lighter duty cord. The current invention has rejected the industry standard that trampoline cords should be simply replaced when fatigued, and not be adjustable by altering the extension and tension level of the existing bungee cord.

Once a bungee has been chosen for its optimum tension based upon its designated use, the entire cord inevitably breaks down over time and usage because the cell structure within the rubber in the individual strands tear and breakdown. It has been determined prior to the current devices that an elastic cord would no longer be useful or re-useable as it broke down and fatigued in the manner described; that this degradation was irreversible physically. Also, that performance of the cord degrades due to cord fatigue and the inevitable breakdown of the cord fibers and other materials that constitute the cord structure. The industry apparently continues to believe and act on that over extended cords are no longer usable for rebounding. So, trampolines with re-adjustable elastic cords were not produced for rebounders before the devices described herein. To solve the problem of inevitable cord fatigue and breakdown, manufacturers instead have provide multiple versions of different size bungees that are replaceable in their entirety, but are not adjustable in themselves. In contrast, the devices described herein provide for the same bungee to be utilized for both its extended life, and for its ability to transform its tension to adapt to different or heavier users; without the need for a complete bungee cord replacement.

When testing, the ability to reuse a cord that was degraded and broken down from extended use was not expected. It was even more unexpected that re tensioning would restore and extend the lifespan of the existing cord. Additionally, the range of users was relatively unaffected within three adjustment occurrences where re tensioning was initiated. The bounce quality of the cord was restored nearly or to its original performance level by the act of re-tensioning. This occurred, even though the cord had fatigued and broken down below our threshold performance level prior to re-tensioning for the first time. First tension was tested to last 2 million cycles. The next time the cord was adjusted, it lasted for 2 million cycles as well, before re-tensioning or replacement was considered. This result was not expected. It was instead expected that the cord would need to be replaced after elasticity was loss and the cord was worn down from its originally new condition.

Finally, it was learned that one could re-tension the cord further (three more times) before it would finally breakdown such that the cord required replacement. The industry has continued to operate under the theory that once a bungee fatigues, it is no longer usable and must be discarded and replaced with a new cord. And that therefore, a fatigued bungee could no longer be re-tensioned because its performance characteristics would be degraded to the point where it would no longer useful. It was expected that the same cord would be assumed to break down even more quickly than before. It seems self evident that since a worn out cord is no longer useful or perhaps, even safe, that re tensioning was not a solution considered. Why re tension a cord that can simply be replaced with a new, unstrained or fatigued cord? Those skilled in the art apparently assumed, as the inventor initially did, that re-tensioning an already fatigued bungee served no useful purpose or utility.

This inventor's engineers believed that re-tensioning would not serve to extend the life of the cord. So, that replacement was the only option for bungees once elasticity started to degrade for the purposes of rebounding on a trampoline. Re tensioning a cord for adjustability is different from re tensioning a cord to extend the useful life of it. While adjusting for a current user is comprehensible, adjusting just for the purpose of cord life extension is not. The current lifespan of bungees and the fact that bungees are replaced and not re-used currently is evidence of this. Each the inventor's engineers re-tensioned a cord, it was found that the original performance standards were not dramatically degraded as expected, but in fact, only minimally affected; such that the user would not be able to notice any change in bounce performance.

As a result of the first result, additional test cycles were added, allowing the bungee to fatigue until its performance fell below performance criteria, until up to the point that three separate re-tensioning events had occurred. This is shown in the cycle test data included herein [FIGS. 18 & 19]. After the third tensioning event, the limit of elasticity of the cord was in fact reached, and it was no longer possible for the cord to stretch far enough to perform an entire rebound cycle properly.

It was originally expected that re tensioning elastic cords for a heavier user, would shorten the overall life of the cord. As a result of this new data, it was discovered we could re-tension cords such that a heavier user in particular, could optimize the bounce performance for their own use; without reducing the cycle life of the bungee at the increased tension level.

Prior to this, it was assumed that one would purchase a bungee and optimize the performance by selecting the right amount of rubber to achieve certain performance characteristics. Thus, elastic cords or bungees have been designed so that heavier or more substantial bungee material, with more rubber, and/or heavier sheathing, would also be required; bungees with more rubber, and/or heavier sheathing, etc. This, in fact, is the current practice in the industry. A manufacturer might have various, lighter or heavier bungees that must replace their standard bungees, in order to accommodate different users by weight or due to the increase in downward force performed by a lighter, but a particularly athletic user.

Elastic cords covered with a woven fabric, typically referred to as bungee cords, undergo continuous fatigue when stretched between a low and high tension state when deployed as the elastic member in supported the rebounding mat of a trampoline. The low tension state is the minimum strain to tension the rebounding mat at equilibrium position, whereas the maximum tension state is reached by the maximum mat displacement by the user. During this fatigue the cords effectively soften in that the tension applied to the rebounding mat in the equilibrium state decreases.

It has been discovered that such loss in stress can be overcome by repeated re-tensioning, that is re-stretching the fabric covered elastic cord in the equilibrium state. However, in the preferred embodiments of the invention the elastic cord is selected for such repeated re-tensioning according to the criteria that is best appreciated with reference to FIG. 18 that illustrates the stress elongation curves of three different commercial bungee cords, that is elastic cords covered with a woven fabric.

However, in any case it is first generally preferred that the rubber used in the fabric covered elastic cord be of high quality to exhibit by itself an ultimate elongation (before significant strain hardening or failure) of at least about 200%, but more preferably 300%, but most preferably over 350%. When such elastic cords are covered with woven fabric, the apparent modulus (slope of the stress strain curve), referred to as strain hardening, will increase up until when the strain limit of the woven fabric is reached. This strain level is labeled "T" for each of the commercial bungee cords labeled "A", "B" and "C" in FIG. 18.

In so far as the actual tension applied to a rebounding mat of the trampoline, any number of lower modulus elastic cords can be provided to reach the same total tension of fewer elastic cords.

As a non-limiting example, in the case of trampolines sized so that it is preferable that elastic cords are initially tensioned at about 18 Lb-f in the equilibrium state, also reach 35-40 Lb-f, when the rebounding mat almost reaches the floor. This range of force is also indicated on the graph in pounds-force (Lb-f) and Newton (N) units. To accomplish re-tensioning, it is best periodically to stretch and re-secure cords to have a tension of about 15 Lb-f to about 20 Lb-f when at rest. Advantageously, periodic re-tensioning is to about 18 Lb-f. 15 L-f was determined experimentally and selected to be the minimum rest force because anything below that setting resulted in a jump surface that felt loose and unstable to most users tested. 18 Lb-f was selected to be a good starting setting for the 8 mm bungees, but certain users may prefer a firmer feel up to 25 Lb-f. While these ranges were selected from testing data, the individual user makes only subjectively personal choices for their tension adjustments when using the apparatus.

FIG. 19 illustrated the force decrease when such a cord is cycled between strain levels typical of the low and high tension states. After about 1 million (M) cycles, the low tension drops by about 3 lbs to about 15 Lb-f with an almost corresponding drop in the high force level. Each dramatic jump in force represents a re-tensioning in the test apparatus by re-setting a terminal knot position to return the force to the initial level of about 18 Lb-f. It is truly surprisingly and unexpected re-stretching the cord repeated times (after about 1M, 3.8M, 6.4M and 9M cycles) greatly extends the useful life to more than 1000%, as it is only after about 10 M cycles that the high tension level greatly exceed the objective of a maximum force of about 40 Lb-f. These results are fully summarized in the Table below:

| Cycles | Initial Low Force | Initial High Force | Knot Position | Notes |
|---|---|---|---|---|
| 0 | 18 | 38.5 | 1:1 | First Position |
| 1,025,300 | 17.4 | 37.8 | 1:2 | |
| 3,846,700 | 17.6 | 37.2 | 2:2 | |
| 6,351,450 | 19.5 | 41.1 | 2:3 | |
| 8,997,440 | 18.4 | 55.25 | 3:3 | |
| 10,406,041 | 13 | | 3:3 | Failure |

Figure 18:
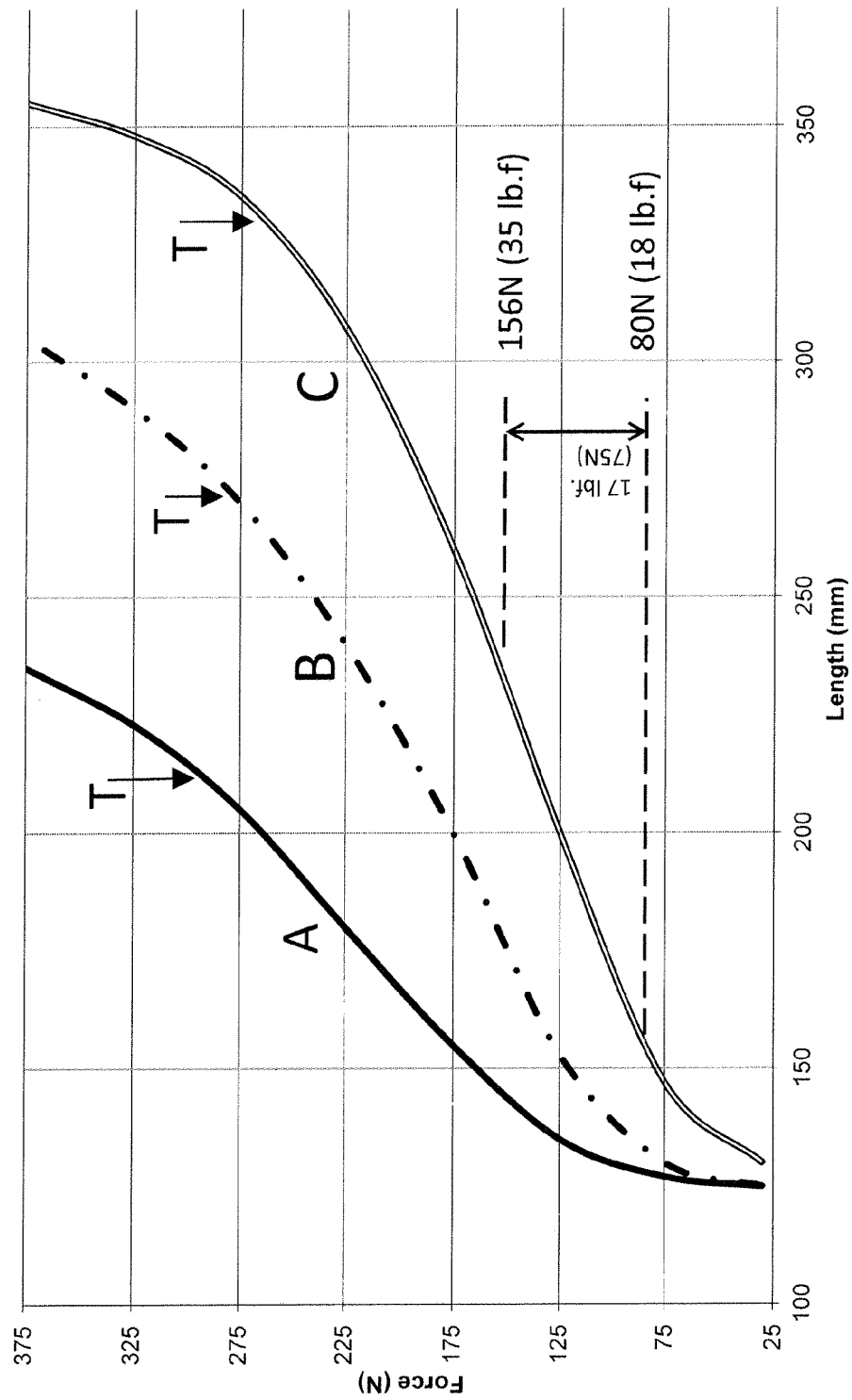
FIG. 18 is a graph of the stress-strain curves of different fabric covered elastic cords.
Figure 22A:
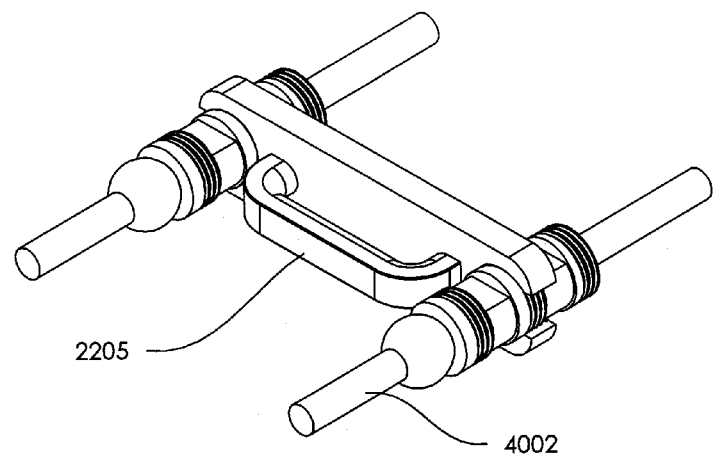
FIGS. 22A-22E are views of an adjustable screw clover bungee connector and its components.
Figure 22B:
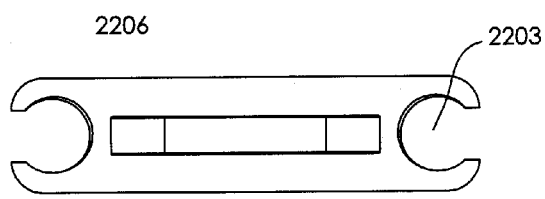
Figure 22C:
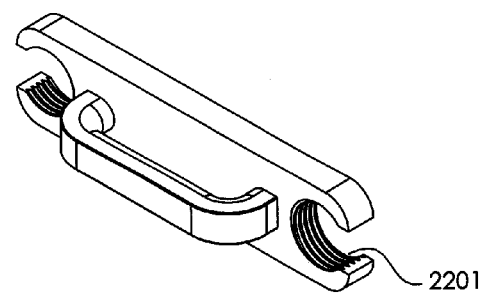
Figure 22D:
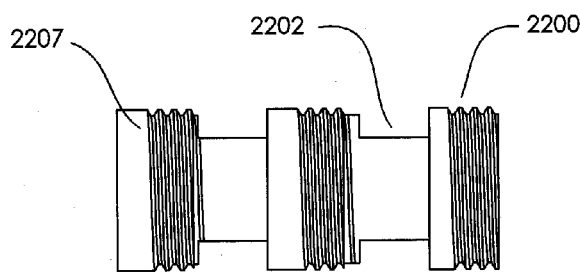
Figure 22E:
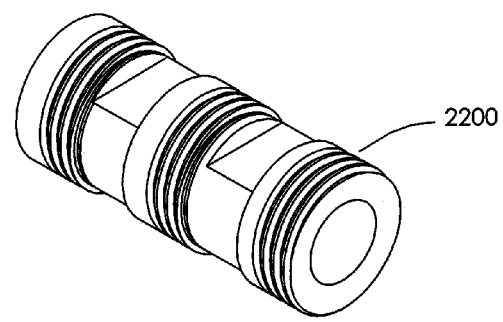

It is believed that the increase in maximum force after the 5th re-stretching is caused by reaching the effective strain limit of the fabric covering, indicated as transition point "T" in FIG. 18.

Hence, depending on the stress-strain and cyclic fatigue behavior of fabric covered elastic cords that are commercial available, it may be more preferred to deploy a large number of elastic cords that reach the "T" point, FIG. 18, at higher strain levels (about 2.6× for "C" and 2.0× for "B" in contrast to the lower level of 1.8× for "A") to provide the most opportunities for re-tensioning to extend the products useful life without replacing all the elastic cords. Accordingly, it is further preferred that the elastic cords are re-tensioned when the equilibrium force drops about 25% but more preferably by about 16%, that is from about 18 Lb-f to 13 Lb-f.

It is also preferable that the re-tensioning occur no further than when the maximum stress reaches, when the rebounding mat is fully extended, no more than about 150% or the initial value, but more preferably no more than about 125% thereof. Thus it is believed that the ultimate limit to multiple re-tensioning to extend the useful service life of elastic cords may be the means to apply additional tension, such as by typing knots to provide a shorter length or a closer end grip point or position, as well as reaching close to ultimate elongation of the covered fabric sheathing. The ultimate elongation of the fabric is not necessarily the strain that will tear the fabric, but rather a straining level at which the fabric limits the elasticity of the rubber that will induce further abrasion of the fabric threads on each other, or induce abrasion ore related deterioration of the elastic cord itself.

Other methods of adjusting elastic cords are possible, once the threshold is passed that adjustability is even warranted for rebounders. While knotting the ends of the cords has been found to be very effective, one may also connect the elastic cord to a molded rigid device that performs the actual adjustment function. FIGS. 20A-20E show an adjustable connector with a slotted clover elastic member holder, 2005. The elastic member holder, 2008, has one or more or multiple distance settings where it locks into the connector part 2007. To change settings, the elastic member holder is rotated 2008 and may be pulled out so that the slot 2000 lines up with the connector ends 2006. The elastic member holder may be removed (2008) by pulling it out of the connector 2007 in a sideways direction. Next, the elastic member holder may be reinserted 2008 at a different slot 2000 position, in order to either tighten or loosen the elastic member 2004. To lock the elastic member holder 2008 in place, it may be rotated so that the clover tabs 2003 line up with the slots in the connector 2002. Then the elastic member will 2004 pull the holder into the connector hole 2001. The connector 2007 attaches to the trampoline mat by a strap looping around the connector mat attachment 2005.

The arrangement of FIGS. 21A-21E is similar to what is shown in FIGS. 20A-20B, except instead of clover tabs, the elastic member holder 2105 interfaces with the connecter by cones. The advantage of the cones is that they provide a larger mating surface area, which decreases the stress on the parts. To install the cord or elastic member holder, 2007 it is rotated so that the elastic member holder slot 2100 aligns with the connector end 2108. It then may slide into the connector hole 2101. The elastic member or cord 2104 applies tension which pulls the elastic member holder cone 2103 against the connector cone 2102. To change tension settings, it is the same process as described for FIGS. 20A-20E, where the elastic member holder may be removed and reinserted at different tension settings. To lock the bungee holder in place, it is rotated such that the slot on the bungee holder does not align with the side opening on the connector.

22A-22E shows an adjustable screw clover bungee connector and its components. Instead of clover tabs as shown in FIGS. 20A-20E, FIGS. 22A-22E shows an elastic member holder that interfaces with the connector by threads. The elastic member holder 2207 inserts into the connector hole 2203 by aligning the desired elastic member or cord holder slot 2202 with the connector slot. Next, the elastic member elastic member holder thread 2200 screws into the connector thread 2201. The advantage of the threaded elastic member holder 2207 is that the elastic member holder is less likely to come loose during the vigorous use that occurs during rebounding. To change tension settings, the elastic member holder is unscrewed, then removed and reinserted at different tension settings. The freed or released bungee and holder is then free to be removed from the side opening in the connector; allowing for further adjustment and reinsertion, removal or replacement.

Figure 23A:
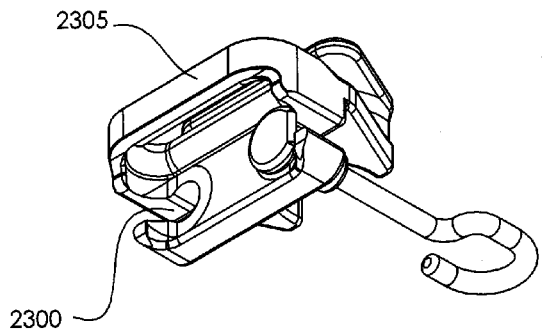
FIG. 23A is an isometric view of a connector with a rebounder bungee extender.
Figure 23B:
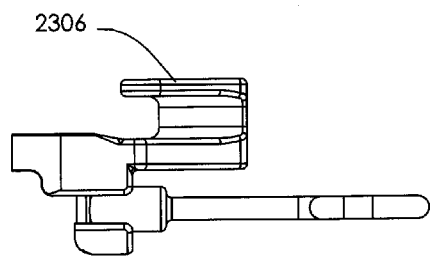
FIG. 23B is a side elevation view of the connector and rebounder bungee extender of FIG. 23A.
Figure 23C:
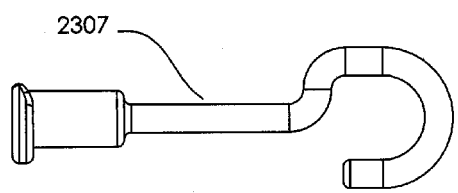
FIG. 23C is a top plan view of the rebounder extender of FIGS. 23A-23B.

FIGS. 23A-23E show another device for adjusting an elastic member. FIG. 23C shows a side view of another of such arrangement of a bungee or elastic member extender. Another arrangement could utilize an adjustable bungee extender 2307 and its connections. It is a plastic or metal part that attaches to a rebounder connector as shown 2306 showing a curvilinear surface for retaining a portion of the elastic member or cord. It has a hook 2308 at the end where the elastic member knot may be connected to the elastic member or cord 4002. This part allows the shortening of the tensioned bungee length, thereby resulting in a softer bounce. This is useful when a lighter user desires or requires a softer bounce on a rebounder than is available with its out-of-the-box elastic cords and tension settings, or a user is sharing the rebounder with a heavier user who required a stiffer spring member or bungee. The elastic member extender 2307 attaches to the connector aperture or opening 2300 by sliding the elastic member extender narrow wire section 2303 into the side of the connector. Then, either the tighter 2302 or looser 2301 portion slides into the connector aperture or opening. This part allows the tensioned elastic member length to be shortened, thereby resulting in a softer bounce.

Figure 23D:
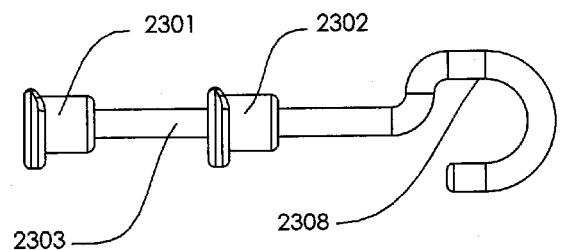
FIG. 23D is a top plan view of an adjustable rebounder extender.
Figure 23E:
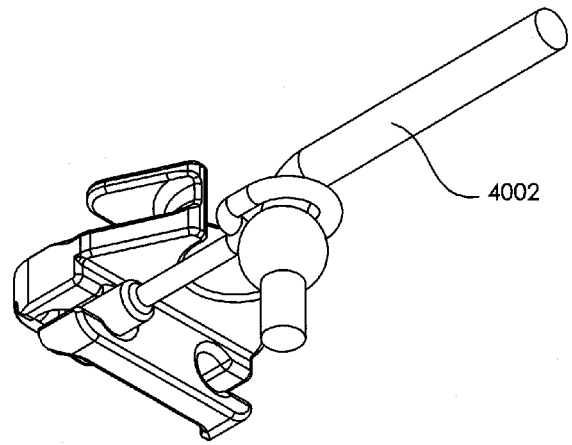
FIG. 23E is an isometric view of the connector with a rebounder bungee extender of FIGS. 23A-23B with an elastic cord.
Figure 26A:
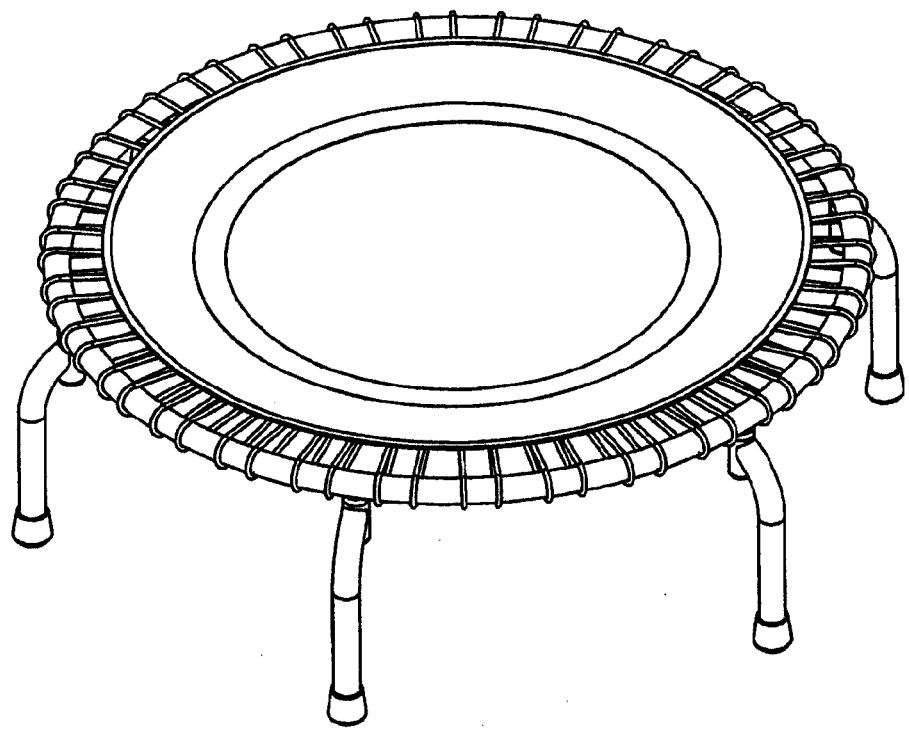
Figure 26B:
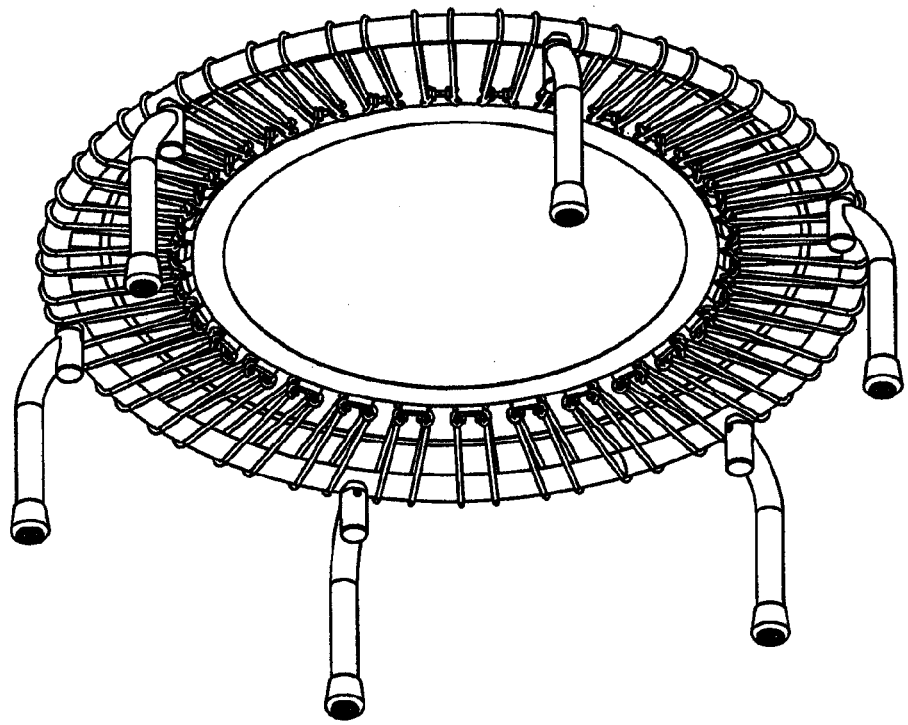

FIG. 23D shows one such connected arrangement. Another arrangement could utilize a threaded method of adjustment along the length of the extender, which allows for continuous adjustment for the length of the threading.

FIGS. 24A-24D show an adjustable connector with a clover elastic member holder 2400 and its components. It is different from FIGS. 20A-22E because there is no slot in the connector 2401. When aligned with the aperture 2403, the elastic member holder 2400 will slide freely through the aperture 2403. To lock the elastic member 4002 at a certain length, the elastic member holder 2400 is rotated about 45 degrees. At this orientation, the elastic member holder clover tabs 2402 fit into the connector blind slots 2404 so it is not able to slide all the way through the aperture 2403, which allows for the coupled unit to remain stationary during active movement through use of the rebounding unit.

The connectors shown in FIGS. 20A-24F represent embodiments perhaps less preferred because they take up additional space when compared to utilizing knotted cord ends. This is an especially significant problem unique to trampoline rebounders due to the extremely limited space between the jump surface 4001 and the frame rail 4003.

Another arrangement that allows for adjustable resilient cords or bungees is to utilize a wire-form connector in lieu of a plastic molded unit that is more common. A wire-form connector has several possible advantages such as increased strength, reduction in space required for the same functionality available with the generally larger plastic connectors; as well as the potential for lower cost construction for a part that performs within the required tolerances for safe and effective use. Additionally, the smaller size of the wire-form connector allows for a slight increase in bungee length allowable in the limited space between the jump surface and the supporting frame. FIGS. 25A-26B show one arrangement of a wire-form connector connecting bungees on a rebounder to the frame. The bungees can be double (or more) knotted such that the knots are secured against the wire-form. The bungee may be pulled through the opening in the wire-form to the various knot settings to either loosen or tighten the tension for the rebounder. A discovered downside of wire-form connectors can be the increased friction created between the metal of the wire-form, and the elastic cord during use. One way to reduce such friction against the cord is to incorporate a molded plastic insert (described, not shown) that is attached, or otherwise connected, to the metal portion of the wire-form such that it is not dislodged once attached. The central portion of the elastic cord rubs along a curvilinear surface of the plastic form and not the metal parts during use. Cord life is increased over that of a wire-form that does not utilize such an attachment.

Figure 27A:
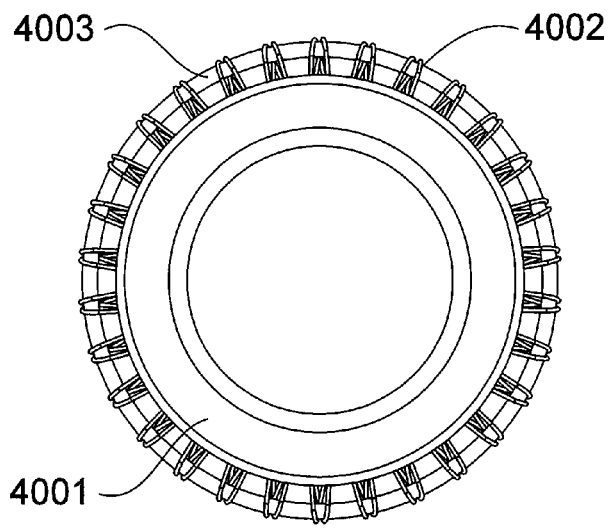
FIG. 27A is a top view of a rebounder with crossed bungees.
Figure 27B:
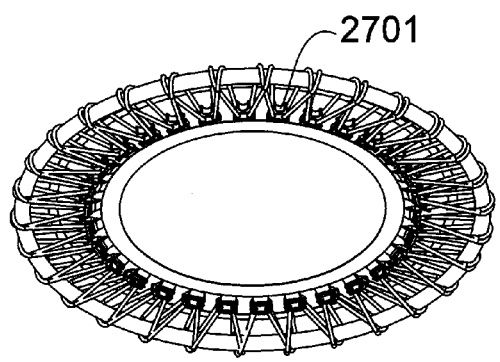
FIG. 27B is a lower isometric view of a rebounder with crossed bungees.
Figure 27C:
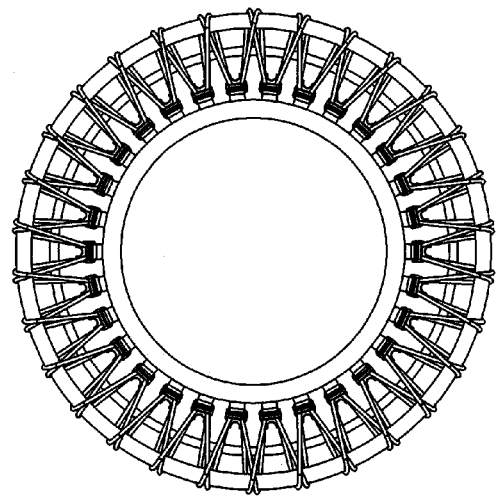
FIG. 27C is a bottom view of a rebounder with crossed bungees.
Figure 27D:
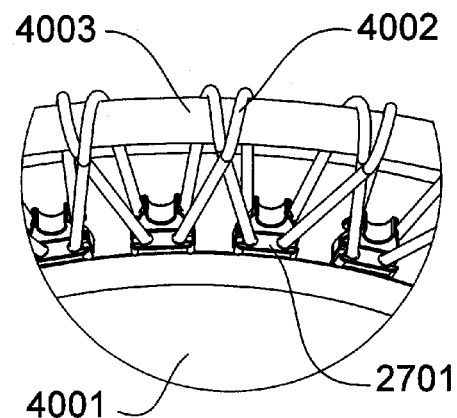
FIG. 27D is a close up lower view of a rebounder with crossed bungees.

Additionally disclosed are new cord configurations and embodiments of the type disclosed in PCT/US2010/048820. FIG. 27A is a top view of a rebounder with crossed elastic cord members 4002. Element number 2701 is the rebounder frame, 2702 is a bungee cord, and 2703 is the jumping mat. FIG. 27B is a lower isometric view of a rebounder with crossed bungees. FIG. 27C is a bottom view of a rebounder with crossed bungees. FIG. 27D is a close up lower view of a rebounder with crossed bungees. Each bungee loops around the top of a connector, and the bungee ends connect at the tensioned end of the elastic member to the two adjacent bungee connectors located on either side of the described connector.

Figure 28A:
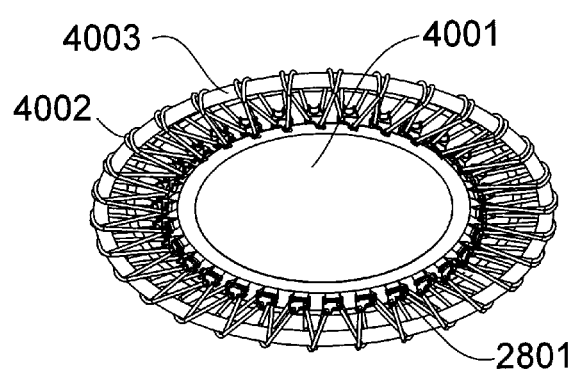
FIG. 28A is a lower isometric view of a rebounder with crossed bungees and offset connectors.
Figure 28B:
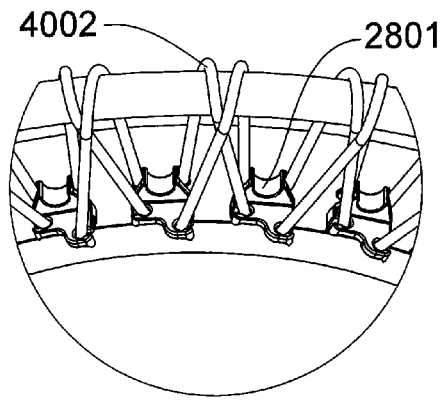
FIG. 28B is a close up lower view of a rebounder with crossed bungees and offset connectors.
Figure 28C:
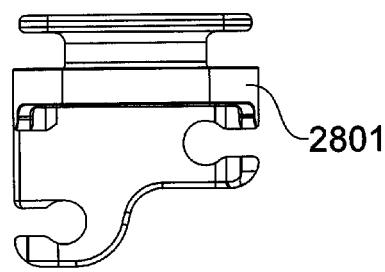
FIG. 28C is a front view of an offset connector.
Figure 28D:
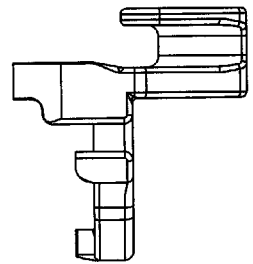
FIG. 28D is a side view of an offset connector.
Figure 28E:
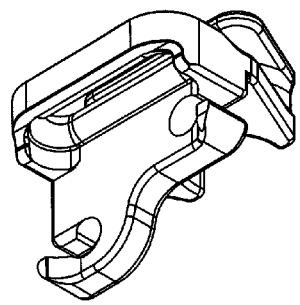
FIG. 28E is an isometric view of an offset connector.
Figure 29A:
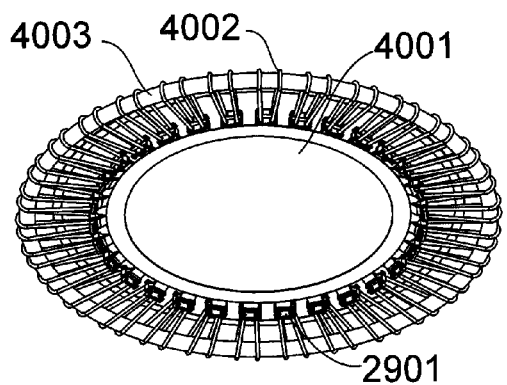
FIG. 29A is a lower isometric view of a rebounder with four point connectors.
Figure 29B:
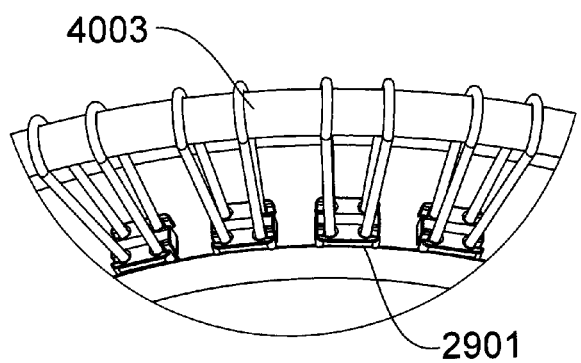
FIG. 29B is a close up lower view of a rebounder with four point connectors.
Figure 29C:
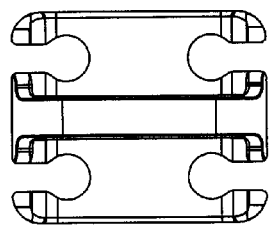
FIG. 29C is a front view of a four point connector.
Figure 29D:
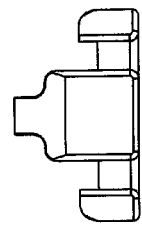
FIG. 29D is a side view of the four point connector.
Figure 29E:
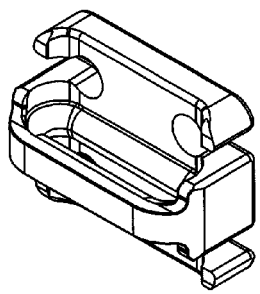
FIG. 29E is a front isometric view of a four point connector.
Figure 29F:
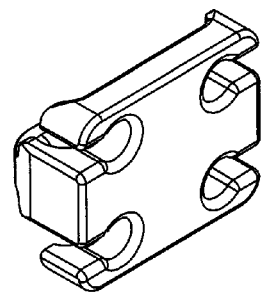
FIG. 29F is a rear isometric view of a four point connector.

FIG. 28A is a lower isometric view of a rebounder with an alternative embodiment of the crossed bungees shown in FIGS. 27A-D, but includes offset connectors 2801. The rebounder frame rail 4003, the rebounder mat 2802, bungee cord 4002, and is the offset connector 2801. FIG. 28B is closes up lower view the offset connectors 2801. FIG. 28C is a front view of an offset connector 2801. FIG. 28D is a side view of the offset connector. FIG. 28E is an isometric view of an offset connector. The offset connector, 2801 has one attachment point lower than the other. The advantage of this configuration is that it allows the elastic members or bungees, 4002, to cross each other while minimizing or avoiding friction or contact rubbing where they cross each other. Another embodiment for an elastic cord connector for a rebounding apparatus is shown in FIGS. 2A-29F. FIG. 29A is a lower isometric view of a rebounder with four point aperture connectors for the elastic cord. 4003 is the rebounder frame, 4001 is the rebounder mat, 4002 is a bungee cord, and 2904 is a four point aperture connector. FIG. 29B is a close up lower view of a rebounder with four point connectors coupled to the rebounding frame 4003. FIG. 29C is a front view of the four point aperture connector. Instead of using one bungee cord per connector as shown in previous embodiments such as that shown in FIG. 5, the four point connector uses two shorter cords, 4002. Each cord is knotted near each end so that the tensioned end fits into the four point connector at the tensioned end of the cord, 4002, and wraps around the frame, 4003. Some of the cord or a portion of a bulbous extension may reside beyond the tensioned portion; see 4A, 409, of the elastic member or cord 4002. FIG. 29D is a side view of the four point aperture connector. FIG. 29E is a front isometric view of a four point aperture connector. FIG. 29F is a rear isometric view of a four point aperture connector. This device allows for more than three adjustable connection points in contrast to the others shown. Each opening and slot may receive an adjustable end of an elastic cord. Thus, the four connection points may receive at least two individual lengths of elastic cord. While more adjustable ends are available, more individual cord segments are required than with the other shown embodiments in this configuration. Additionally, the cord segments are shorter in length and additional production and part costs may be incurred due to the need to have to double the individual cord segments in comparison to the three connection point connectors described herein. However, it can be seen that instead of two short cord segments, a single longer cord 4003 may be attached with knots or bulbous protrusions that permit a non-tensioned cord segment to extend between the aperture sides closest to the rebounding surface. This cord configuration is not shown in FIG. 29, but an example of what is being described can be seen in FIG. 46D, 4602. The non-tensioned portion of the cord 4002 extends between two upper apertures of the same connector FIG. 29C and not between two adjacent connectors as shown in FIG. 46.

FIG. 30A is a lower isometric view of a rebounder with two connection aperture connectors. 3001 is the rebounder frame, 3002 is a bungee cord, 3003 is the rebounder mat, and 3004 is a two point connector. FIG. 30B is a close up lower view of a rebounder with two point connectors. Only one elastic member or cord, 4002 attaches to each connector, 3001. FIG. 30C is a front view of a two point connector. More options as to cord stiffness and thickness of bungee cords can be envisioned. For example different diameter or stiffness of cord segments may be alternated among the connectors (not shown), or because the connectors are narrower than the larger connectors shown elsewhere, more connectors can be attached to the mat and frame around the entire diameter to modify and tailor the number of cord and connector combinations. This allows one to adjust tension or rebound stiffness for various users and jumpers. FIG. 30D is a side view of a two point connector. FIG. 30E is an isometric view of a two point connector. FIG. 30F is a front view of an alternate two point connector with curved arms encompassing the aperture openings. This alternate connector is even narrower than the first embodiment shown in FIG. 30C. This allows more connectors to be attached to the mat 4001 and frame 4003. Another difference between FIG. 30C is that the bungee cords slides into the connector from the side. This makes sure the bungee doesn't unintentionally pop out or dislodge when the user steps or jumps on the cords. FIG. 30G is a side view of an alternate two point connector. FIG. 30H is an isometric view of the alternate curved arm two point connector.

A far more significant advancement for adjustable connectors is shown in FIGS. 31A-38D. As discussed previously as to the connectors shown in FIGS. 20A-24F, space is at a premium in the space between the jump surface 4001 and the rebounder rail, 4003. Historically, tabs are stitched onto the jump surface which allow for the connector to be attached to the mat, FIG. 15D, 1506. Some length of elastic cord is required to permit a smooth rebounding action. If the cords are too short, the rebound is stiff and less resilient, causing a harder feeling bounce experience for the user. The shorter cord length causes the jump mat to stop its rebound decent more sharply than is preferable to a typical user. The harder quicker stop caused by shorter bungees or elastic cords places increased stress on the jumper's spine and body. And yet, while longer cords reduce the hard bottom rebound, the cord length is severely limited due to the jump mats proximity to the ground surface. The result is that there exists a very narrow range within which to achieve a reasonable rebounding experience while still keeping the jumper from constantly striking the ground surface. Typically, rebounders use fabric tabs stitched to the jump mat that serve as connection points for a connector. The connectors possess D-rings of the type shown in FIGS. 1A and 1B, 104. 104 shows the connection point where the tab, FIG. 15D, 1506 for example, is looped around the D-ring of the connector and sewn onto the jump mat during production. It has been typically preferred in the industry because the connector can move freely up and down and at angle to adapt to the movement of the rebound surface during use.

The connectors shown in FIGS. 31A-38D, and to a lesser degree, FIG. 39A-FIG. 39E, are much different in that they dispense with these typical tabs, seen in FIG. 15D, 1506, in favor of a new design that permits the connector to be attached directly onto the jump mat itself, while still allowing for free function during rebounding. These "compression" connectors provide several advantages over current designs. First, the usable jump surface is expanded to a significant degree considering the limited space involved. This larger jumping surface allows for safer footfalls as the room to land one's feet is greater; and a jumper can be less fearful or careful about inadvertently striking the edge of the device. Rebounders are of clearly limited dimensions; generally 44 inches or less in diameter. It has been found that this new design provides anywhere from 10 to 40 percent greater usable surface area on the jump surface for footfalls. The second advantage is that no loss in rebound performance suffered despite the significant increase in jump surface area. The cord lengths remain the same despite the increased size of the jump surface. A third advantage is gained with the shown inventions in that they provide curved and smooth upper portions on the upper portion of the connectors, 3305, that minimize felt impact or interference if a footfall were to inadvertently (or even intentionally) occur on the top of the connector attached to the upper mat surface. Finally, specialized cover attachments are shown which may add additional padding for foot strikes; as well as skirts and extensions that serve to cover the rebounding cords towards the frame rail, FIG. 43-FIG. 44. Taken together, a dramatic increase in usable surface area is gained without the need to enlarge the actual footprint of the rebounder frame and legs. Additionally, all of this is gained with no loss in bungee performance because the bungee length does not need to be shortened to account for the greater jump mat surface area.

However, it should be noted that one could actually lengthen the cords while still maintaining the original jump mat dimensions and diameter with the described connectors. In other words, instead of increasing the mat diameter, one could instead keep the mat diameter the same, but increase the overall cord length. In this case the extra space is not used to increase the jump mat surface area, but rather to increase the length of the elastic members. The result is a softer, gentler bounce. Or, the legs of the rebounder may be lengthened and elevated vertically such that the distance to the ground or floor surface is greater between the rebounding mat and the ground surface. Then the longer cords allowed by the connectors shown in FIGS. 31A-39E, permit a higher performing, better rebounder without the need to use up additional floor space around the rebounder diameter; which can be at a premium both in a home environment or in a commercial gym setting. In a commercial setting, the floor spaces occupied by rebounders are analogous to parking places for automobiles. There are only so many spaces and then the lot is full. For rebounding classes, being able to add even a couple of rebounders to the floor area increases the number of paying users and increases their chances of securing a place in a group fitness rebounder/mini trampoline classes in commercial gyms.

Such connectors more generally comprise an upper portion of the connector that is attached to the upper or top side of the rebounding mat such that a portion of the connecter overlaps the rebounding mat, and is adapted to couple with at least one portion of an elastic cordlike member, 3102, and also has lower portion of the same connector (or in separate upper and lower parts shown later) that is attachable to the opposite underside of the rebounding mat such that a portion of the connecter overlaps the rebounding mat, and is adapted to couple with at least one portion of the elastic member, 4002. The overlapped connection dispenses with the common D ring type connector in favor of mat connection location and therefore provides a greater surface area for footfalls on the rebounding mat. A "compression connector" describes how an elastic cord mounts to the connector behind where the connector attaches to the mat. FIG. 8 is actually shows a type of compression connector as well because the elastic cord travels behind the mat webbing towards the interior of the mat surface, but only beneath the mat surface and nowhere else. The unique thing about FIG. 31-FIG. 39's connectors is that the connector is situated both above and below the mat surface contiguously. The cords are moved and placed back even farther and inside the perimeter of the mat surface. This maximizes the mat area.

Another difference between FIG. 8 and those shown in FIGS. 31-38 is that those embodiments have the bungee connections spaced evenly above and below the mat surface. But, the connector shown in FIG. 8 has a tendency to rotate until it is balanced because the connector is only supported at its top portion. In contrast, the compression connectors shown in FIGS. 31-38 are already evenly balanced because these connectors have an upper and lower portion that are simultaneously attached to the mat which helps ensure that it cannot rotate in the manner likely with connectors attached to only one side of the mat surface. It should be noted that while the drawings show a curved attachment location set to receive a portion of an elastic cord, other kinds of coupling locations can be envisioned. For example, the coupling location could be one or more apertures that retain or couple the approximate end of an elastic cord member as opposed to a segment of the cord. FIG. 31A is an isometric view of a though pin compression connector. The term compression is meant to express that the position where the elastic member, 4002, attaches to the connector is now situated behind where the pin holds the connector to the mat. The connector is then squeezed or compressed by the elastic member against the connector pin.

FIG. 31B is a lower isometric view of a through pin compression connector. FIG. 31C is a side view of a through pin compression connector 3101. 3102 is where the bungee loop attaches, 3103 is the pin through hole. Apertures 3105 are provided to receive portions of an elastic cord that may be length-adjusted by changing the locations of bungee knots.

FIG. 31D is an exploded assembly view of the though pin compression connector. It is comprised of the through pin compression connector 3101, the trampoline bed 4001 with a webbing loop 3107 sewn onto it, a bolt 3108 and a nut 3109. The bolt 3108 goes through the connector through-hole 3103, through the webbing loop 3107, and then though the other side of the connector and it screws into the nut 3109. This allows the connector to be installed after the mat is sewn. The connector 3101 has an upper portion 3110 and a lower portion 3111. The upper portion 3110 has a downwardly facing surface 3120, and the lower portion 3111 has an upwardly facing surface 3122. The surfaces 3120, 3122 face each other, extend generally in parallel, and define a channel 3104 that is sized and shaped to receive the edge of a mat 4001. The mat 4001 has upper and lower surfaces 3123, 3124. Surfaces 3120, 3122 respectively face surfaces 3123, 3124 the mat 4001 is received in the channel 3104. The channel is of sufficient depth and width that that, when the mat 4001 is suspended on a frame, any vertically oriented forces asserted by the connector are widely distributed. Advantageously, cord-receiving apertures 3105 are positioned near the elevation of the mat 4001 to avoid torqueing of the mat 4001 by the connector 3101. Ideally, cord-receiving apertures are located at the same elevation as the mat.

Figure 32A:
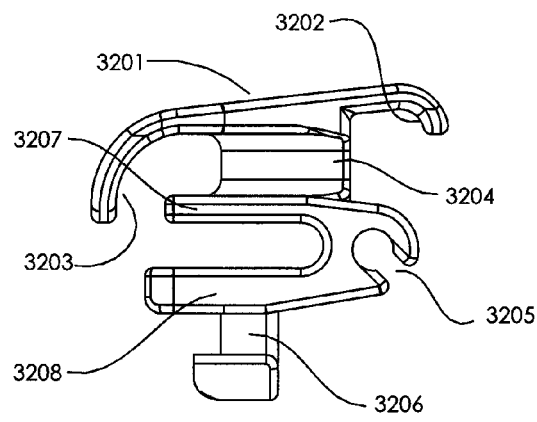
FIG. 32A is a side view of a snap pin compression connector.
Figure 32B:
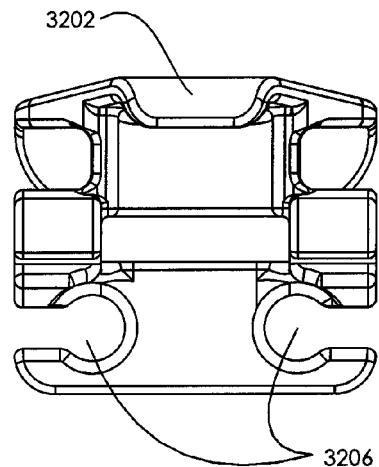
FIG. 32B is a front view of the snap pin compression connector of FIG. 32A.
Figure 32C:
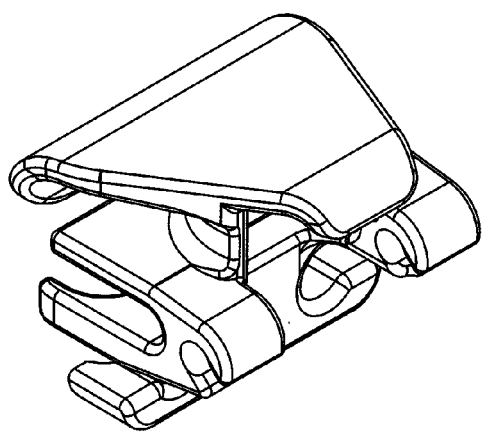
FIG. 32C is an upper isometric view of the snap pin compression connector of FIG. 32A.
Figure 32D:
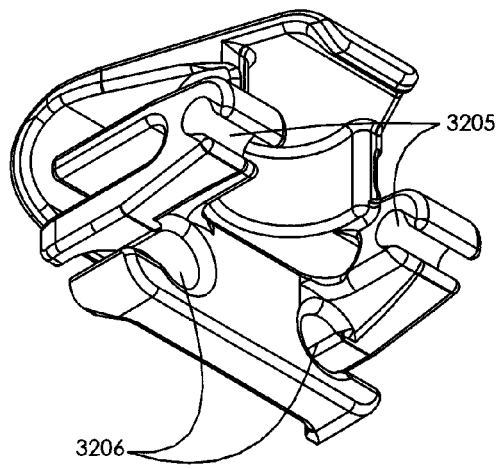
FIG. 32D is a lower isometric view of the snap pin compression connector of FIG. 32A.

FIG. 32A is a side view of a snap pin compression connector, 3201. This connector is superior to current bungee connectors because the bungee attachment location is moved inside and within the edge of the mat. This ensures the entire mat is tensioned and the mat jump surface is increased. Also this connector can be installed after the mat is sewn and produced. 3204 is the place where the bungee loop connects, and 3206 are the sockets or apertures where the bungee knots connector. 3205 is a through hole with an opening slot. This slot allows the connector to pop onto a pin instead of sliding a pin through it and retaining it with a nut. With this configuration a connecter may be "snapped" onto the pin and into place. 3203 and 3202 are hook portions of the upper connector assembly that provide an attachment for an elastic cover which can be retained, examples of which are shown in FIGS. 43-45. FIG. 32B is a front view of a snap pin compression connector. The two knot apertures or sockets, 3206 are visible. FIG. 32C is an upper isometric view of a snap pin compression connector. FIG. 3D is a lower isometric view of a snap pin compression connector.

Figure 33A:
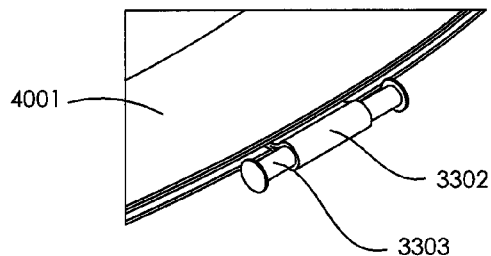
FIG. 33A is an isometric view of a dumbbell pin and webbing loop connected to a trampoline mat.
Figure 33B:
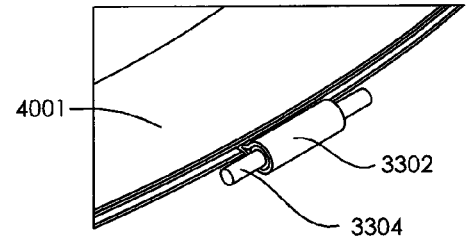
FIG. 33B is an isometric view of a rolling pin and a webbing loop connected to a trampoline mat.
Figure 33C:
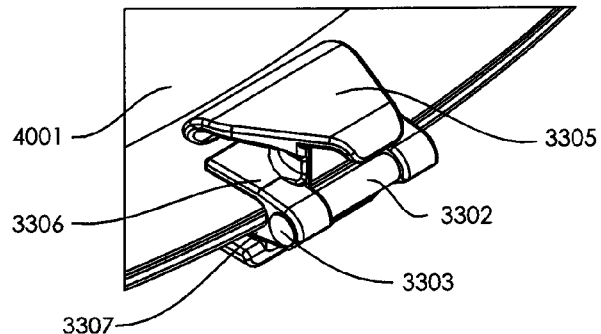
FIG. 33C is an isometric view of a snap pin compression connector attached to a trampoline mat.
Figure 33D:
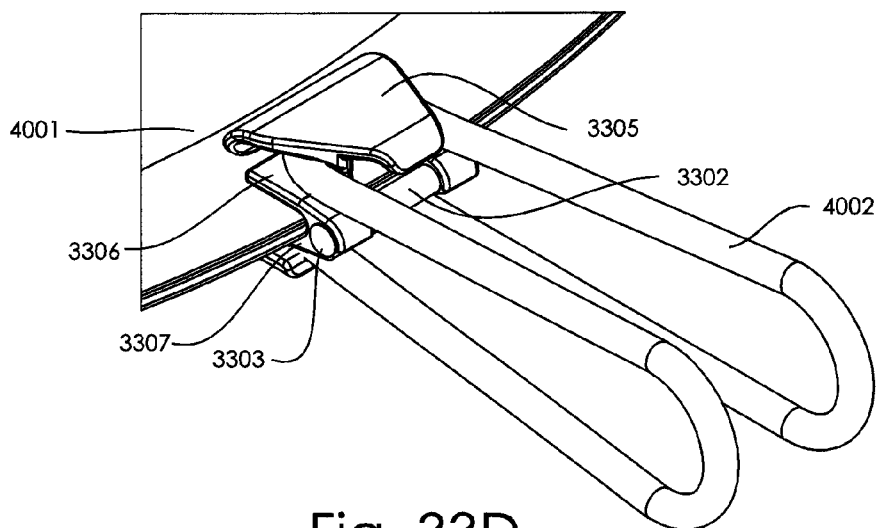
FIG. 33D is an isometric view of an installed snap pin compression connector with an elastic cord attached to it.

FIG. 33A is an isometric view of a dumbbell pin, 3303, going through a webbing loop, 3302, which is sewn onto a trampoline mat, 3301. The dumbbell pin has extensions that prevent the attached connector from sliding side to side. FIG. 33B is an isometric view of a rolling pin, 3304, going through a webbing loop, 3302, sewn onto a trampoline mat, 3301. The rolling pin does not have extension at the end. FIG. 33C is an isometric view of the snap pin compression connector, 3305, attached to a trampoline mat, 3301 via the dumbbell pin 3303. The connector attaches to the mat by snapping onto the dumbbell pin, 3303. This allows the connector to be installed after the mat is sewn which is easier than running the large connectors through the sewing machine. FIG. 33D is an isometric view of a completely installed snap pin compression connector, 3305, utilizing a dumbbell pin 3303 with a bungee cord, 4002, attached to it.

Figure 34A:
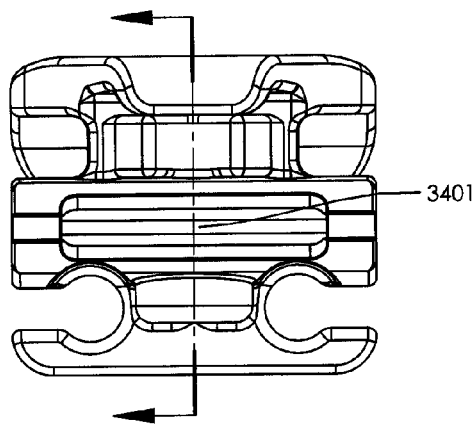
FIG. 34A is a front view of a clamping compression connector.
Figure 34B:
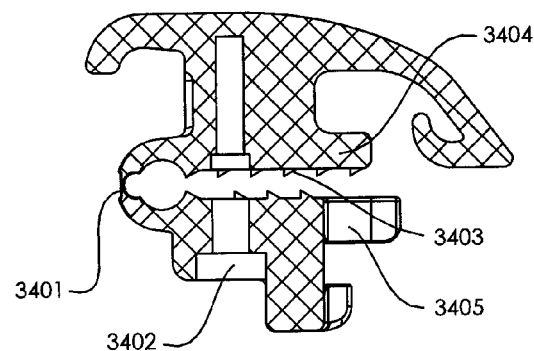
FIG. 34B is a side cross section of a clamping compression connector.
Figure 34C:
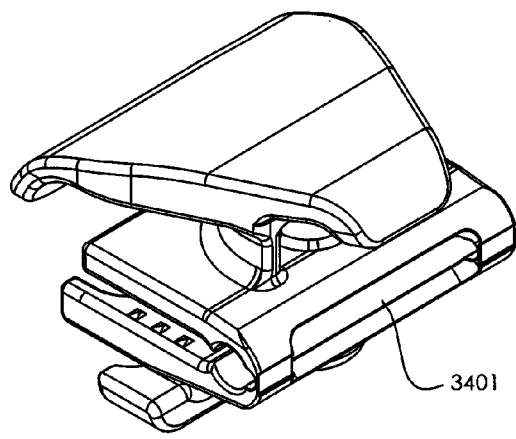
FIG. 34C is an upper isometric view of a clamping compression connector.
Figure 34D:
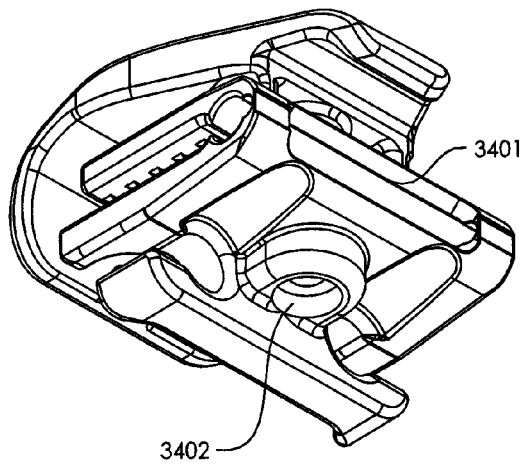
FIG. 34D is a lower isometric view of a clamping compression connector.

FIG. 34A is a front view of a clamping compression connector that serves to expand the jumping surface area by dispensing with the need for a tag and D ring configuration. FIG. 34B is a side cross section of a clamping compression connector. This connector has a plastic living or moving hinge, 3401, which allows it to open and "clamp" onto the edge of the trampoline mat. A screw is then installed from the bottom of the connector, 3402, and it goes through the mat and clamps together the two sides of the connector. Teeth or small protrusions, 3403, provide additional grip to hold the connector in place. FIG. 34C is an upper isometric view of a clamping compression connector. FIG. 34D is a lower isometric view of a clamping compression connector. 3402 is the hole that the screw goes through to be tightened and secured into the connector.

Figure 35A:
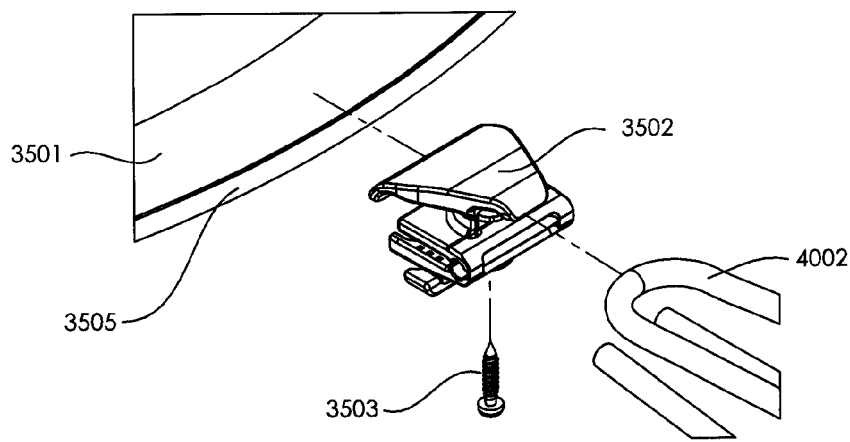
FIG. 35A is an exploded view of a clamping compression connector assembly.
Figure 35B:
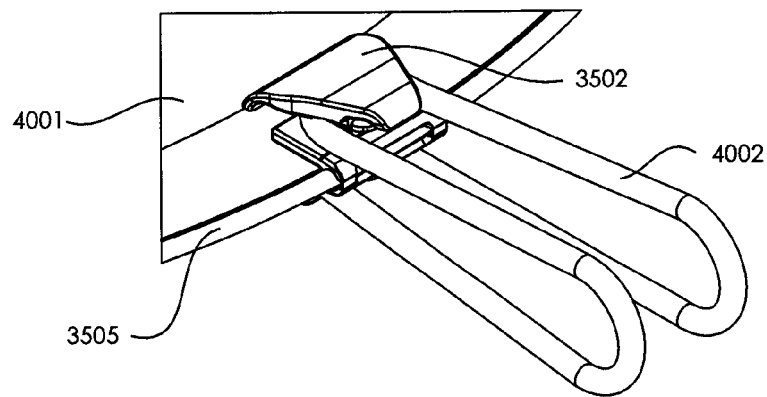
FIG. 35B is an isometric view of a clamping compression connector assembly.
Figure 35C:
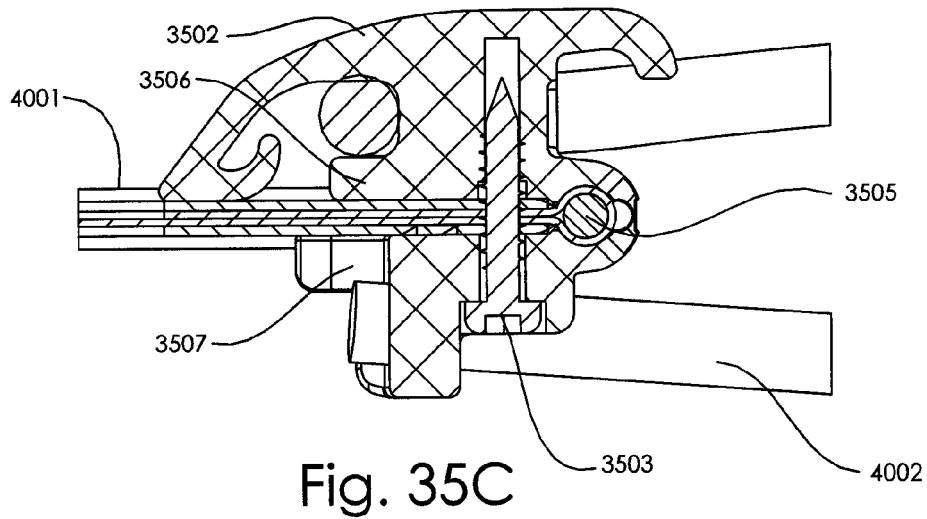
FIG. 35C is a cross section side view of a clamping compression connector assembly.

FIG. 35A is an exploded view of the clamping compression connector assembly shown in FIG. 34 now installed with the elastic member attached. It is made up of a clamping compression connector, 3502, a thread forming screw, 3503, a hemmed trampoline mat, 3501, with a rope like reinforced edge, 3505, and an elastic member or bungee cord, 3504. FIG. 35B is an isometric view of a clamping compression connector assembly. FIG. 35C is a cross section side view of a clamping compression connector assembly when fully attached with the elastic member installed. This shows the screw, 3503, going through the mat and connector portions residing above and below the mat surface, 3501, and squeezing the two sides of the connector, 3502, together. A feature that helps hold the connector in place is a rope like threading, 3505, that is sewn into the hemmed edge of the rebounder mat, 3501. The connector has a split hole through it which clamps around this rope to ensure the connector cannot be pulled off. The rope acts to create a slight elevated edging which provides additional purchase for the clamped connector on the jumping surface or mat.

Figure 36A:
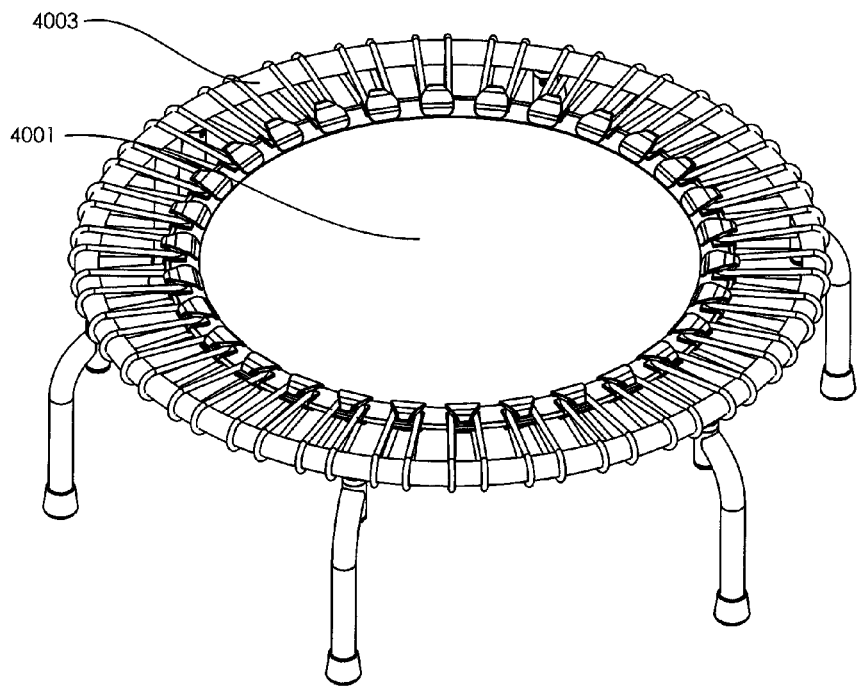
FIG. 36A is an isometric view of a rebounder frame with a mat using compression connectors.
Figures 36B, 36C:
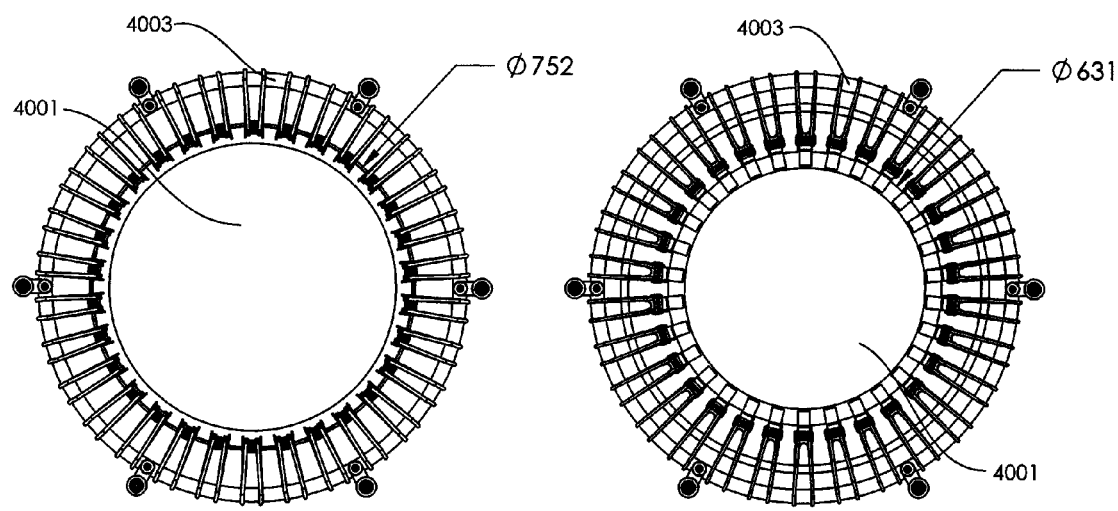
FIG. 36B is a bottom view of a rebounder frame with a mat using compression connectors enlarging the jump surface without reducing elastic cord length.
FIG. 36C is a bottom view of a rebounder frame with a mat using the same elastic cord length of FIG. 36B, with connectors that are separated from the mat reducing the usable jump surface diameter relative to FIG. 36B.

FIG. 36A is an isometric view of a rebounder frame, 3601, with a mat using installed compression connectors, 3602. FIG. 36B is a bottom view of a rebounder frame, 3601, with a mat using compression connectors, 3602. The diameter of the tensioned mat area is dimensioned at approximately 752 mm. FIG. 36C is a bottom view of a rebounder frame, 3601, with a mat using our original connectors, 3603. The diameter of the tensioned mat area is dimensioned approximately 631 mm. The bungee length needs to be the same on both, and since the compression connectors can be installed closer to the edge of the mat than the regular connectors, the compression connectors make it possible to increase the mat diameter by approximately 121 mm.

Figure 37A:
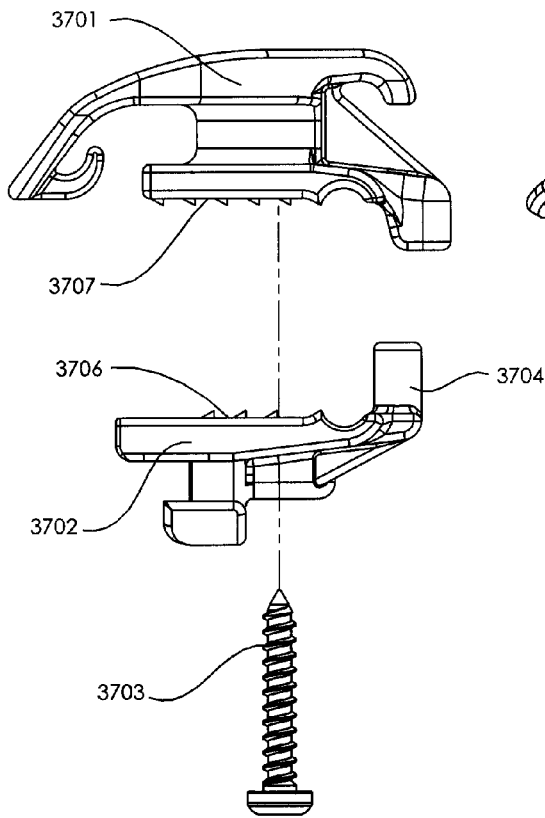
FIG. 37A is a side exploded view of a two part clamping compression connector.
Figure 37B:
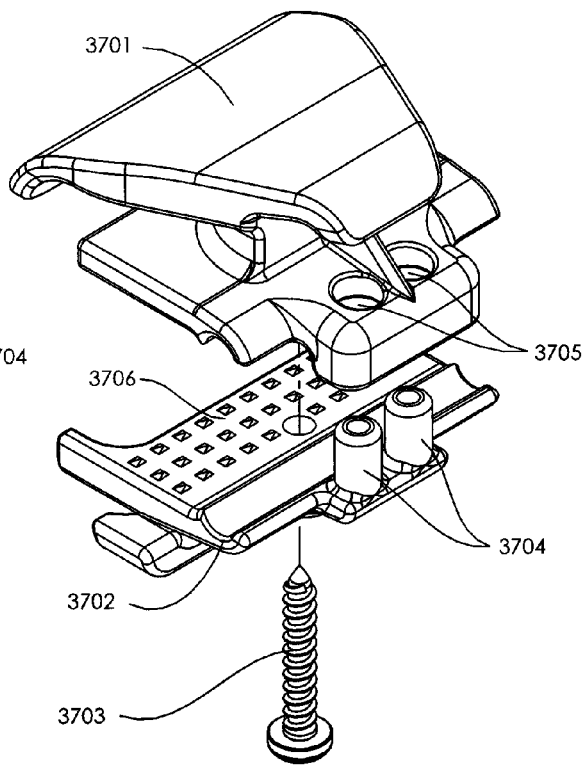
FIG. 37B is an isometric exploded view of a two part clamping compression connector.
Figure 37C:
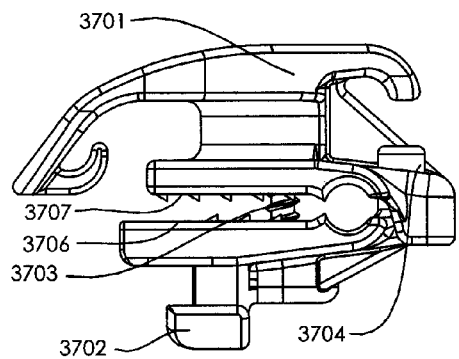
FIG. 37C is a side view of a two part clamping compression connector.
Figure 37D:
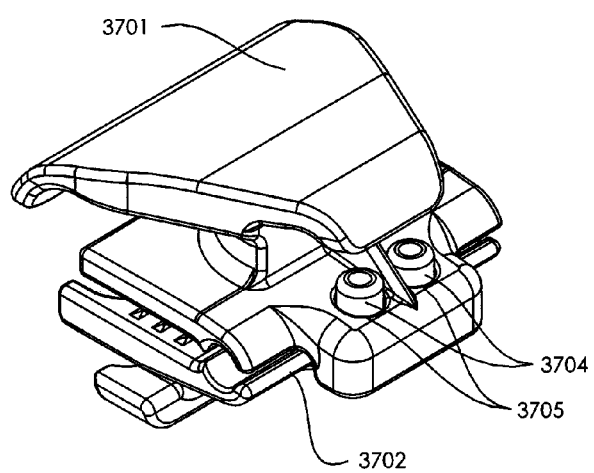
FIG. 37D is an isometric view of a two part clamping compression connector.

FIG. 37A is a side exploded view of a two part clamping compression connector. It is made up of a top part, 3701, a bottom part, 3702, and a screw, 3703. The two plastic parts, 3701 and 3702, are aligned to the screw, 3703, which is then used to clamp them together when rotated or screwed into the screw receiving hole. The advantage to having two separate parts instead of one part that bends is that it ensures the part doesn't break during bending from the jumping action against the mat surface. Also the clamping faces will be parallel. FIG. 37B is an isometric exploded view of a two part clamping compression connector. Additionally, the upper connector piece has two receiving holes 3705 which accept two matching posts 3704 when the two parts are attached together. This minimizes the flex of the two parts against that portion of the attachment providing strength and enabling a more securely functioning unit. FIG. 37C is a side view of a two part clamping compression connector. FIG. 37D is an isometric view of a two part clamping compression connector fully installed where the posts, 3705 and their receiving holes 3704 are joined.

Figure 38A:
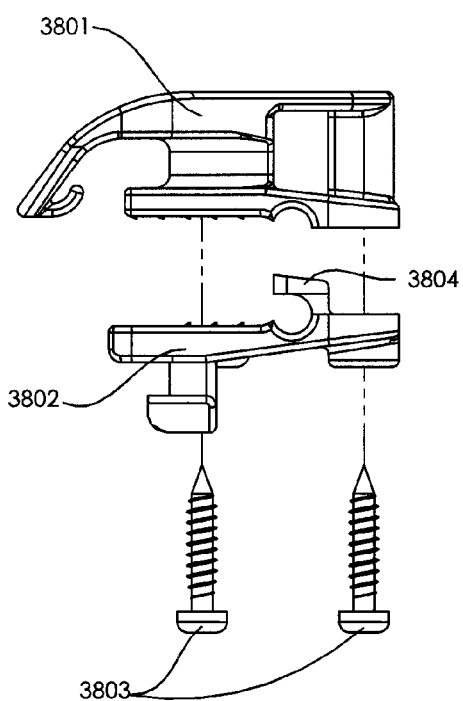
FIG. 38A is a side exploded view of a two part clamping compression connector with two screws.
Figure 38B:
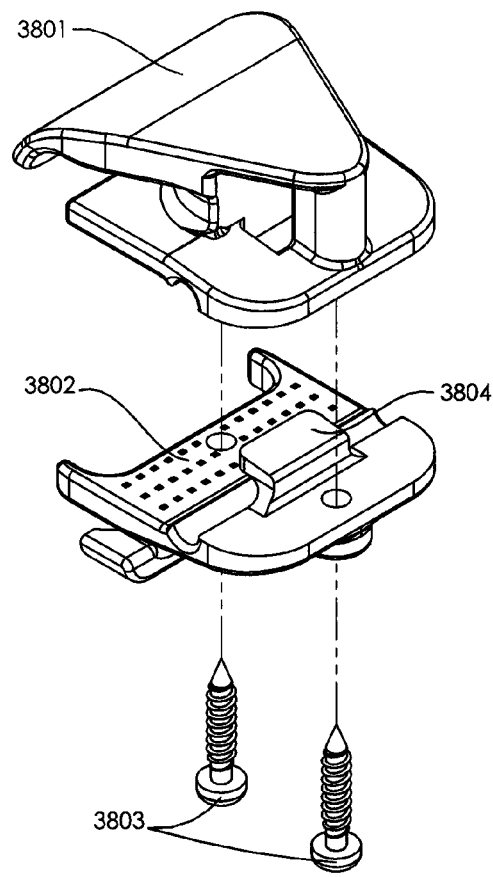
Figure 38C:
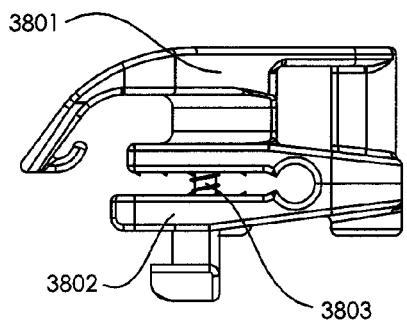
Figure 38D:
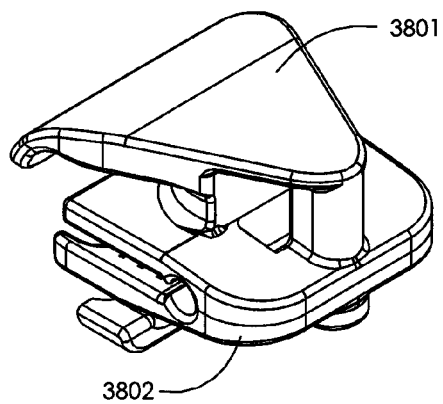

FIG. 38A is a side exploded view of a two part clamping compression connector utilizing not one, but two screws. It is made up of a top part, 3801, a bottom part, 3802, and two screws, 3803. Having two screws over in contrast to a single screw provides a more balanced clamping load. FIGS. 38B-38D show how the two parts, 3801 and 3802, are connected to each other with the two screws, 3803. This design provides an extremely strong and secure connection of the elastic members between the rail and the jump surface, while still expanding the usable jump surface without shortening the cord lengths. It should be noted that the screws, 3703 and 3803, shown may be replaced with bolts, a plastic piece that locks into place that may be tightened or locked in a various locations along its length, or prongs or tabs that function similarly to something like a female side of a zip tie. A tab can be inserted into the upper molded part, 3701, or a molded piece may be inserted that snaps into place thus securing the upper and lower portions of the device, other similar parts that serve the same function as the screws shown in the drawings.

FIG. 39A is a side view of an alternative clip in connector, 3901. FIG. 39B is a front view of a clip in connector, 3901. This plastic connector clips onto a piece of wire that is sewn to the trampoline mat. 3903 are horizontal holes for the wireform to go through, and 3902 are vertical slots for the wireform fingers. FIG. 39C is an isometric view of a clip in connector, 3901. FIG. 39D is an exploded isometric view of a clip in connector assembly. It is comprised of a clip in connector, 3901, a wire-form, 3906, an elastic spring, 3904, a trampoline mat, 3905, and mat edge webbing, 3907. FIG. 39E is an isometric view of a clip in connector assembly. The wire-form, 3906, is sewn in between the trampoline mat, 3905, and the mat edge webbing, 3907. It is held together with threads, 3908. The wire-form will have a diameter small enough so it is possible to sew into place. If the sewing needle hits it, it will be small enough so the needle will deflect to the side of the wire without breaking. The clip in connector, 3901, can be attached to the wire-form after it is sewn, and then the elastic spring, 3904, attaches to the connector.

FIG. 41A is an isometric view of a side by side pin connector, similar to the types shown in FIGS. 1A-1E except a tab and D ring mat attachment is replaced with the side by side pin attachment. This connector holds the bungee cord the same way as the side by side connector in FIG. 1, but it is held to the mat with a pin or transverse rod or bolt, 4103, which may be interchangeable terms depending on the part used. It is connected to the rebound surface itself in contrast to FIG. 1 which is attached to webbing via a D ring configuration. This allows the connector unit to mount closer to the edge of the mat. An advantage of this configuration is that is makes sewing the mat easier in production and manufacture. A second advantage is as previously described; a slight increase in the total area of the jump surface area is achieved. A third advantage is that the resulting connection is very strong and secure. FIG. 41B is a rear isometric view of a side by side pin connector. FIG. 41C is a side view of a side by side pin connector. FIG. 41D is an exploded assembly view of a side by side pin connector. 4105 is the trampoline mat, 4104 is the pin webbing, and 4103 is the connector bolt. 4102 is a nut which secures the side by side pin connector to the mat. A pin or a bolt can be used to hold the connector. While a nut, 4102, is shown to secure the rod from slippage, other methods may be used to achieve the same result.

FIG. 42A is an isometric view of a reinforced side by side connector similar to that shown in FIGS. 1A-1E and FIGS. 41A-41D. This connector incorporates a screw member which adds an additional reinforcement between two portions of the connector. 4201 is the connector, and 4202 is the screw. 4203 is the threaded receiver for the terminal end of the screw which is composed of the same material as the connector itself. FIG. 42B is a lower isometric view of a reinforced side by side connector. FIG. 42C is a side view of a reinforced side by side connector. FIG. 42D is an exploded isometric view of a reinforced side by side connector. This configuration allows the elastic cord member to be installed first, and the screw is then installed after, in order to assist in supporting the bending load. This reinforcement allows the plastic part to be thinner and lighter resulting in a less expensive part to fabricate while still creating a very strong and secure attachment Another aspect of the adjustable tension cord devices that were shown in FIGS. 31A-38D is that of integrated covers which serve to protect the spring members, and to further expand the jump surface area for footfalls. These covers and their coupling are shown in FIGS. 43A-45C. These devices add a protective barrier for the spring members and also permit an additional increase in the surface area of the rebounding matt, without a corresponding loss in cord length between the rail and the matt. The devices shown in FIGS. 31A-38D already possess additional utility by expanding the usable jump surface; which benefit is increased by the addition of the covers.

FIG. 43A is a compression connector mat with a connector cover installed. 4001 is the trampoline mat, 4002 is a bungee cord, 4003 is the trampoline frame, and 4301 is the connector cover. FIG. 43B is a side section view of the compression connector mat assembly. FIG. 43C is a close up side section view of the compression connector mat assembly. The connector cover, 4301, is made out of an elastic fabric with elastic cords sewn onto the edges. The connector cover edges are hooked onto the receiving features on the compression connectors, 4302. The connector covers can be customized for the users because they are easy to install and can be attached after manufacturing the trampoline mat.

FIG. 44A is a compression connector mat with a connector petal cover installed. 4001 is the trampoline mat, 4002 is a bungee cord, 4003 is the trampoline frame, and 4401 is the connector petal cover of the type described in WO2011032173A2, which is incorporated by reference. FIG. 44B is a side section view of the compression connector mat assembly. FIG. 44C is a close up side section view of the compression connector mat assembly. The connector petal cover, 4401, is made out of an elastic fabric with elastic cords sewn onto the edges. Padded petal sections, 4402, are sewn onto the connector cover, 4401. The cover attaches the same way as cover described in FIG. 43, but now the padded petals provide additional area to jump, and it covers the bungee cords, 4002, for an appealing appearance.

FIG. 45A is a compression connector mat with a padded connector cover installed. This device adds additional padding coverage over the molded compression connectors themselves. 4001 is the trampoline mat, 4002 is an elastic member or bungee cord, 4003 is the trampoline frame, and 4501 is the padded connector cover. FIG. 45B is a side section view of the compression connector mat assembly. FIG. 45C is a close up side section view of the compression connector mat assembly. The padded connector cover, 4501, is made out of an elastic fabric with elastic cords sewn onto the edges. The connector cover has pockets sewn into it for holding pads, 4502. The pads, 4502, slide into the connector cover pockets, 4501, and cover the connectors. This provides a softer feel if users' footfalls land where the plastic connectors are located on the jumping surface.

Another type of connector is shown in FIGS. 46A-46D. Here is described a way of utilizing a single elastic cord segment to couple to and with two adjacent connectors. In the example shown in FIG. 46, the connector is similar to that shown in FIG. 5A-5C. The connectors are not limited, however, to the configuration shown but may be of different designs. For example, the same cord configuration may be adapted to the connectors shown in FIGS. 1A-3D, FIGS. 5A-14E, FIGS. 20A-22E, FIGS. 24A-26B, FIGS. 29-39E, and FIGS. 41A-42D. But, in each case, a single cord segment is joined to two adjacent connectors. FIG. 46A is a front view diagram of a connected cord on a rebounding apparatus with a plurality of connectors where a single connected elastic cord is attached to two adjacent connectors. FIG. 46B is a lower view of the rebounder connections diagramed in FIG. 46A where a single elastic cord is attached to two adjacent connectors. FIG. 46C is a close up lower outside view of attached connected elastic cords. FIG. 46D is a close up lower inside view of attached connected elastic cords. The advantage of utilizing one cord segment for each of two connectors is that fewer cord segments are required to circumvent the rebounder opening along the perimeter. This reduces manufacturer and parts costs and can simplify assembly. Another advantage, is that this unique configuration creates a rebounder that functions like one where each connector is dedicated to only one cord segment because the segment of the cord spanning the gap between the two adjacent connectors is no under tension when the rebounder is at rest and not in use; and under little to no tension even when the rebounder is in use. All that is required is to space apart the knots or bulbous protrusions along the cord length such that the rebounder functions similarly to how it would if one cord segment was dedicated to only one connector.

It should also be apparent that one cord segment could attach to more than two connectors. For example, one cord could connect 3 connectors in a group, or 4 or 5 or more. Also, groupings of connectors linked by a single elastic member or cord can be envisioned so the groupings of 2, 3, 4, or more may be distributed around the rebounder surface. Finally, it should be apparent that each cord may be moved or migrated during the movement of knots so that un tensioned segments become tensioned segments because they've been shifted or migrated during one or more adjustment events to a place where they are under tension.

FIG. 47A is a top section view of a post connector with an overhang that creates an indentation below where an elastic cord may be coupled. FIG. 47B is an upper isometric view of a post connector. FIG. 47C is a side view of a post connector. FIG. 47D is a rear isometric view of a post connector. FIG. 47E is a top view of a post connector. In these drawings, the post's overhang serves as a hook to retain the cord segment and to keep it from slipping out. However, other indentations are possible in addition to the post hook configuration shown. For example, the post may have a simple notch or opening created by removing material from the post itself. In such a design, an overhang is not required. The post could have a locking mechanism of any various designs to secure the elastic cord from slipping out of the indentation. Or, a rounded hook shape may be substituted for the post shown. Also, the post can be repositioned and moved such that the upper coupling location is directly above the lower coupling locations; or, the post may be shifted such that the upper coupling location is not directly above the lower coupling locations. It should also be apparent that instead of a D ring, 4701, a different mat attachment can be employed of the kinds shown in FIGS. 31-39, simply by replacing the D ring portion 4701 with an attachment point adapted to those used in FIGS. 31-39.

The current invention and the various embodiments described herein are not limited to a conventional trampoline frame that may comprise a closed rail supported by a plurality of legs. All that is required is a frame that defines a central opening that supports a flat or planar rebounding mat or jumping surface that is elastically suspended within the central opening. At least one or more of elastic spring members couple the rebounding mat to the frame in elastic suspension.

The spring members each have an elongated body that extends between the jumping mat and the frame. The frame can be of several configurations and is not limited by shape in any dimension beyond its need to support a flat rebounding surface at any angle. FIG. 48 shows a frame that adheres to this definition, but does not constitute the common closed rail attached to a plurality of legs configuration. However, regardless of the frame design, the rebounding surface or mat is still situated in a planar orientation. The angle may differ as well in other embodiments, but the rebounding surface remains flat so that it may perform the rebounding function for either thrown objects or for a jumping person. FIG. 48A is a front view of a V frame rebounder that meets this same definition as the more conventional known frames. FIG. 48B is an upper isometric view of a V frame rebounder. From the forgoing it should be appreciated that numerous variations are possible, and thus the invention is not intended to be limited to the specific arrangements shown in the drawings. For example, the types of connectors may be mixed and matched in concert with each other on a single jumping apparatus. For example FIG. 32's connector may be interspersed with the connectors shown in FIGS. 29 and 30. Other combinations and configurations are possible and the possibilities are very large. Or, entirely different types of spring members may be employed in alternating fashion. For example, one could have a rebounding apparatus that employs metal spring coils interspersed with elastic cord members and their connectors in various configurations. Such configurations would be employed to adapt the apparatus for different users and for different uses in order to optimize and tailor the apparatuses performance. While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

APPENDIX A

Cord and Knot Tests

Here is a table summarizing the testing conducted for a rebounder configuration. The knot lengths were changed for the 9 mm cord for test 104. The test numbers reflect those test related only to this specific data. The knot lengths were shortened to tighten the 9 mm cord. Also, it was intended to have the loosest 9 mm knot position be closer to the tightest 8 mm knot position. The chart attached compares the 8 mm cord and 9 mm cord once the 9 mm cord knot lengths were changed.

Static Pull Test to Match Knot Lengths

The chart of FIG. 49 shows the force against the elastic member for a distance shift of approximately 4 inches.

Test Setup:
Put bungee on test machine at specified knot setting
Ran machine for a number of cycles at 60 rpm
Stroke set to pull installed bungee 4 inches
Load cell measured average max force
Common Elastic Member or Cord Specifications
Below is a table of common bungee specifications used in testing, and a description of selection criteria: The knot lengths were set to achieve target tension in the elastic cord tension range when stretched 3 inches. Elastic cords were then installed on a test machine with the same initial stretch as the actual rebounding apparatus. The machine stretched the cords at a fixed stroke. The range of stretch strokes we tested was between 3-7 inches. The bungee tension would degrade over time, and once the minimum force dropped below 15 pounds, the cord was tightened to the next knot. This procedure continued until there were no more knots. The number of cycles required to complete the test were compared among the various cords, and the cord that lasted the longest was selected. Other causes of failure included too much abrasion and wear on the frame tube, a decrease in aesthetic appearance of the bungee cord, and a maximum force that exceeded the stretched bungee tension range.

| | |
|---|---|
| Bungee cord stiffness range | 9-20 lb/in |
| Range of bungee diameter | 8-10 mm |
| Bungee elastic material | Natural Latex Rubber |
| Bungee sheathing material | Polyester |
| Range of number of elastic strands | 70-140 |
| Range of bungee sheathings | 24 × 24, 24 × 16, 24 single braid, 16 single braid |
| Knot spacing | .7-1.25 inches |
| Range of knot lengths | 17.5-23.5 inches |
| Minimum Bungee Low Tension | 15 pounds |
| Bungee Tension range when stretched 3 inches | 30-60 pounds |

The invention claimed is:
1. A rebounding apparatus comprising:
a frame that defines a central opening;
a rebounding mat that is elastically suspended within the central opening;
at least one cordlike elastic member that couples the rebounding mat to the frame so that the mat is in elastic suspension, the member having an elongated body extending between a first end and a second end; and

| Test Number | Bungee Diameter [mm] | Stroke [in] | Knot Lengths [in] | 1st knot change | 2nd knot change | 3rd knot change | Total Number of Cycles |
|---|---|---|---|---|---|---|---|
| 69 | 8 | 3 | 19-20-21 | 1,025,300 | 3,846,700 | 6,351,450 | 8,997,440 |
| 75 | 9 | 3 | 21.5-22.5-23.5 | | | | 6,351,329 |
| 93 | 8 | 4 | 19-20-21 | 690,500 | 1,029,100 | | 1,300,000 |
| 94 | 10 | 4 | 19-20-21 | 58,800 | 239,050 | | 420,000 |
| 95 | 10 | 4 | 19-20-21 | 18,200 | 180,062 | | 430,000 |
| 97 | 10 | 3 | 21.5-22.5-23.5 | 436,200 | 943,400 | | 848,700 |
| 98 | 8 | 3 | 19-20-21 | 1,187,000 | | | 5,460,000 |
| 99 | 10 | 3 | 19-20-21 | 424,300 | 935,100 | | 1,091,100 |
| 100 | 9 | 3 | 21.5-22.5-23.5 | | | | 4,111,000 |
| 104 | 9 | 3 | 19.5-20.5-21.5 | 3,427,422 | 6,922,650 | | 8,250,000 |
| 105 | 8 | 4 | 19-20-21 | 612,300 | 1,202,220 | | 1,400,000 |
| 106 | 8 | 4 | 19-20-21 | 612,300 | 1,099,448 | | 1,231,200 | a plurality of connectors attached to the rebounding mat, each connector coupling one or more elastic members to the rebounding mat, wherein at least one of the connectors is adapted to receive and secure at least two portions of the elongated body at two separate spaced apart locations on the connector, wherein at least one cordlike elastic member has a tensioned portion, the tensioned portion having a tension and extending between two spaced-apart positions along the body of the elastic member, the elastic member being secured to the at least one of the connectors at each of the positions, and wherein at least one of the at least one cordlike elastic member and the at least one of the connectors is adapted to dispose at least one of the first and second ends of the at least one cordlike elastic member at two alternative positions to provide at least two alternative levels of tension to the rebounding mat.

2. The rebounding apparatus of claim 1 wherein at least one of the connectors couples the at least one cordlike elastic member in a manner that the tension of the tensioned portion of the elastic member can be adjusted by moving a portion of the body of the elastic member relative to the connector.

3. A rebounding apparatus according to claim 1 wherein at least one of the connectors engages a cordlike elastic member at three or more separate locations on the connector.

4. A rebounding apparatus according to claim 3 wherein the at least one of the connectors has an indentation located to receive and engage the cordlike elastic member.

5. A rebounding apparatus according to claim 4, wherein the indentation comprises a curvilinear surface.

6. A rebounding apparatus according to claim 3 wherein:
the at least one of the connectors has an indentation located to receive and engage the cordlike elastic member and the at least one of the connectors engages a cordlike elastic member at three or more separate locations on the connector including
a first location,
a second location, and
a third location where a portion of the cordlike elastic member is received in the indentation.

7. A rebounding apparatus according to claim 6 wherein the indentation is defined by a curvilinear surface.

8. A rebounding apparatus according to claim 1 wherein at least one connector is engaged with only one member.

9. A rebounding apparatus according to claim 1 wherein:
the mat has a central portion defined by a perimeter; and
the plurality of connectors comprises a plurality of first connectors and a plurality of second connectors,
wherein each of the first and second connectors is attached to the mat at the perimeter of the central portion, and each of the first connectors is located between two second connectors that are adjacent, and
wherein a plurality of cordlike elastic members extends between the connectors with a central portion of each cordlike elastic member wrapped around a first connector, each of two outer portions of each cordlike elastic member wrapping around an adjacent portion of the frame, and each of two outer portions of each cordlike elastic member connecting to one of a pair of second connectors that are adjacent to the first connector.

10. A rebounding apparatus according to claim 3 wherein each of the first and second ends of each cordlike elastic member connects to the same connector that engages the elongated body of the cordlike elastic member.

11. A rebounding apparatus comprising:
a frame that defines a central opening;
a rebounding mat that is elastically suspended within the central opening;
at least one cordlike elastic member that couples the rebounding mat to the frame so that the mat is in elastic suspension, the member having an elongated body extending between a first end and a second end; and
a plurality of connectors attached to the rebounding mat, each connector coupling one or more elastic members to the rebounding mat,
wherein at least one of the connectors engages a cordlike elastic member at three or more separate locations on the connector and has at least one aperture through which a cordlike elastic member extends; and
each cordlike elastic member has a bulbous protrusion at or near at least one of the first and second ends, the dimensions of the bulbous protrusion being greater than those of the aperture such that the bulbous protrusion acts as a stop that limits movement of the cordlike elastic member through the aperture.

12. A rebounding apparatus according to claim 11 wherein:
the cordlike elastic member has a tensioned portion, the tensioned portion having a tension;
the cordlike elastic member has a plurality of spaced-apart bulbous protrusions at or near at least one of the first and second ends; and
the connector is configured to allow the cordlike elastic member to be repositioned so that any one of the bulbous protrusions can be selected to serve as the stop whereby the cordlike elastic member can be moved to adjust the tension of the tensioned portion of the cordlike elastic member.

13. A rebounding apparatus according to claim 11 wherein the bulbous protrusions are knots in the cordlike elastic member.

14. A rebounding apparatus according to claim 11 wherein the bulbous protrusions are molded material connected to the cordlike elastic member.

15. A rebounding apparatus according to claim 1 wherein:
the connector defines two apertures; and
the cordlike elastic member has a central portion that wraps around the frame and has two outer portions, each of the outer portions being connected respectively to each of the apertures.

16. A rebounding apparatus comprising:
a frame that defines a central opening;
a rebounding mat that is elastically suspended within the central opening;
at least one cordlike elastic member that couples the rebounding mat to the frame so that the mat is in elastic suspension, the member having an elongated body extending between a first end and a second end; and
a plurality of connectors attached to the rebounding mat, each connector coupling one or more elastic members to the rebounding mat,
wherein at least one of the connectors has a surface that provides a curved path for engaging a central portion of the cordlike elastic member and at least two apertures for receiving outer portions of the cordlike elastic member, and
wherein the at least one cordlike elastic member has a central portion, an outer portion on either side of the central portion, and a bulbous protrusion at or near at least one of the first and second ends, the dimensions of the bulbous protrusion being greater than those of each aperture such that the bulbous protrusion acts as a stop that limits movement of the cordlike elastic member through each aperture.

17. A rebounding apparatus according to claim 16 wherein the at least two apertures of the connector are located on opposite sides of the curved path.

18. A rebounding apparatus according to claim 11 wherein:
the connector has a first central portion that receives the elongated body of the cordlike elastic member; and
the at least one aperture of the connector comprises two apertures located on opposite sides of and under the first central portion.

19. A rebounding apparatus according to claim 11 wherein:
the connector has a central portion that receives the elongated body of the cordlike elastic member;
the connector has two apertures that are disposed below the central portion; and
the first and second opposing ends of each cordlike elastic member engage the respective apertures of the connectors that are immediately adjacent and on opposing sides of the connector that engages the central looped portion thereof.

20. A rebounding apparatus according to claim 5 wherein the at least one of the connectors has a downward extending post for wrapping the cordlike elastic member one or more times for varying the tension.

21. A rebounding apparatus according to claim 18 wherein the at least one of the connectors further comprising a nesting spacer for insertion between an end portion of the at least one cordlike elastic member and the two apertures, the nested connector having substantially the same shape as the apertures on a side that engages the at least one cordlike elastic member and a complimentary shape on an opposite side that engages the apertures when the nested spacer is inserted to increase the tension on the at least one cordlike elastic member.

22. A rebounding apparatus according to claim 1 wherein each connector has two apertures and each connector is disposed on a body that is capable of being radially displaced with respect to the center of the rebounding mat on a portion of the connector that engages the center of the cordlike elastic member.

23. A rebounding apparatus according to claim 1 wherein:
the at least one of the connectors has a curvilinear retaining indentation; and
the rebounding apparatus further comprises a looped strap that extends through the curvilinear retaining indentation and connects the at least one of the connectors to the rebounding mat.

24. A rebounding apparatus according to claim 1 wherein the at least one connector has a shaped indentation for engaging a metal ring that is attached to the periphery of the rebounding mat.

25. A rebounding apparatus comprising:
a frame that defines a central opening;
a rebounding mat that is elastically suspended within the central opening;
at least one cordlike elastic member that couples the rebounding mat to the frame so that the mat is in elastic suspension, the member having an elongated body extending between a first end and a second end; and
a plurality of connectors attached to the rebounding mat, each connector coupling one or more elastic members to the rebounding mat,
wherein at least one of the connectors is adapted to receive and secure at least two portions of the elongated body at two separate spaced apart locations on the connector, and wherein the at least one of the connectors comprises:
a first coupling position having a curved path for seating and retaining a cordlike elastic member;
a second coupling position having means to grasp opposing ends of a cordlike elastic member; and
a third coupling position having means to grasp opposing ends of a cordlike elastic member.

26. A rebounding apparatus according to claim 25 wherein:
the cordlike member has at least one protrusion; and
the at least one connector has at least two apertures, including an aperture located at each of the second coupling position and the third coupling position, to matingly engage the protrusion.

27. A rebounding apparatus according to claim 1 further comprising at least one elastic member length and tension adjustment device, the device being attached to the at least one cordlike elastic member and comprising an adjustable slotted clover elastic member connector and a rigid elastic member holder adapted to adjustably engage the slotted clover elastic member connector such that an elastic member length and tension can be modified.

28. A rebounding apparatus according to claim 27 wherein the device is attached to the at least one cordlike elastic member and comprising an adjustable cone clover bungee connector.

29. A rebounding apparatus according to claim 27 wherein the device is attached to the at least one cordlike elastic member and comprising an adjustable screw clover bungee connector.

30. A rebounding apparatus according to claim 27 wherein the device is attached to the at least one cordlike elastic member and comprising an elastic member extender which attaches to a rebounder connector with a hook at an end where the at least one cordlike elastic member may be connected.

31. A rebounding apparatus according to claim 1 wherein:
the first end of the at least one cordlike elastic member has plural spaced-apart adjustment positions; and
the at least one of the connectors is adapted to connect to the at least one cordlike elastic member at any of the plural adjustment positions.

32. A rebounding apparatus according to claim 31 wherein the first end of the at least one cordlike elastic member has a bulbous protrusion at each of the adjustment positions.

33. A rebounding apparatus according to claim 31 wherein the second end of the at least one cordlike elastic member has plural adjustment positions.

* * * * *